US011822300B2

(12) United States Patent
Potucek et al.

(10) Patent No.: US 11,822,300 B2
(45) Date of Patent: Nov. 21, 2023

(54) MODULAR POOL/SPA CONTROL SYSTEM

(71) Applicant: Hayward Industries, Inc., Berkeley Heights, NJ (US)

(72) Inventors: Kevin Potucek, Naples, FL (US); Gregory Fournier, West Kingston, RI (US); James Murdock, Wakefield, RI (US); Robert Heon, Warwick, RI (US); David Blaine, North Kingston, RI (US); Craig Horrocks, North Kingstown, RI (US); Kenneth White, Jr., East Dennis, MA (US); Murat Dymov, Richmond, RI (US); Michael Nilsson, Attleboro, MA (US); Thomas-Eric Béliveau, Montreal (CA); Deyin Xu, Lexington, MA (US); Patrick Mainville, Montreal (CA); Qiwei Huang, Jamestown, RI (US); Linnette Rivera, Tyngsborough, MA (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 28 days.

(21) Appl. No.: 16/134,359

(22) Filed: Sep. 18, 2018

(65) Prior Publication Data

US 2019/0018377 A1 Jan. 17, 2019

Related U.S. Application Data

(63) Continuation of application No. 14/211,461, filed on Mar. 14, 2014.

(Continued)

(51) Int. Cl.
*G05B 15/02* (2006.01)
*A61H 33/00* (2006.01)
(Continued)

(52) U.S. Cl.
CPC ........... *G05B 15/02* (2013.01); *A61H 33/005* (2013.01); *E04H 4/14* (2013.01); *G05B 19/0421* (2013.01);
(Continued)

(58) Field of Classification Search
None
See application file for complete search history.

(56) References Cited

U.S. PATENT DOCUMENTS 1,874,513 A   8/1932  Hall
1,991,775 A   2/1935  Spencer
(Continued)

FOREIGN PATENT DOCUMENTS

AU   2002356357 B2   5/2007
AU   2013100126 B4   6/2013
(Continued)

OTHER PUBLICATIONS

Pentair IntelliBrite Underwater Color-Changing Lights, product description (2006) (4 pages).
(Continued)

*Primary Examiner* — Jason Lin
(74) *Attorney, Agent, or Firm* — McCarter & English, LLP

(57) ABSTRACT

Disclosed is a system for controlling pool/spa components. More particularly, disclosed is a system for controlling pool/spa components including a display screen and one or more processors presenting a control user interface for display on the display screen, wherein the control user interface includes a home screen comprising a first portion containing a first plurality of buttons and/or controls for controlling a first group of the plurality of pool/spa components associated with a first body of water, and a second portion containing a second plurality of buttons and/or
(Continued)

controls for controlling a second group of the plurality of pool/spa components associated with a second body of water.

17 Claims, 29 Drawing Sheets

Related U.S. Application Data

(60) Provisional application No. 61/790,496, filed on Mar. 15, 2013, provisional application No. 61/787,809, filed on Mar. 15, 2013.

(51) Int. Cl.
    *G05B 19/042*     (2006.01)
    *H04L 61/50*     (2022.01)
    *H04L 61/5038*     (2022.01)
    *H04L 47/70*     (2022.01)
    *E04H 4/14*     (2006.01)

(52) U.S. Cl.
    CPC .............. *H04L 47/70* (2013.01); *H04L 61/50* (2022.05); *H04L 61/5038* (2022.05); *A61H 2033/0079* (2013.01); *A61H 2033/0083* (2013.01); *A61H 2201/501* (2013.01); *A61H 2201/5012* (2013.01); *A61H 2201/5015* (2013.01); *A61H 2201/5082* (2013.01); *A61H 2201/5084* (2013.01); *A61H 2201/5087* (2013.01); *A61H 2201/5092* (2013.01); *A61H 2201/5097* (2013.01); *G05B 2219/21092* (2013.01)

(56) References Cited

U.S. PATENT DOCUMENTS

| | | |
|---|---|---|
| 2,057,186 A | 10/1936 | Freeberg |
| 2,096,595 A | 10/1937 | Sanford |
| 2,250,021 A | 7/1941 | Hofer |
| 2,323,793 A | 7/1943 | Clark |
| 2,355,607 A | 8/1944 | Shepherd |
| 2,498,818 A | 2/1950 | Nogle |
| 2,509,031 A | 5/1950 | Bockmeyer |
| 2,572,263 A | 10/1951 | Hofer |
| 2,603,234 A | 7/1952 | Hofer |
| 2,644,400 A | 7/1953 | Hofer |
| 2,680,168 A | 6/1954 | Murphy |
| 2,767,277 A | 10/1956 | Wirth |
| 2,881,409 A | 4/1959 | Cook |
| 2,889,779 A | 6/1959 | Hofer |
| 2,903,674 A | 9/1959 | Schwab |
| 3,020,522 A | 2/1962 | Lesher |
| 3,086,715 A | 4/1963 | Mineau et al. |
| 3,114,127 A | 12/1963 | Ramsey |
| 3,145,724 A | 8/1964 | Pelzer |
| 3,195,556 A | 7/1965 | Norstrud et al. |
| 3,213,377 A | 10/1965 | Neale |
| 3,252,479 A | 5/1966 | Klock, Jr. |
| 3,255,433 A | 6/1966 | Lesher |
| 3,257,641 A | 6/1966 | Campana et al. |
| 3,271,734 A | 9/1966 | Cabe et al. |
| 3,320,160 A | 5/1967 | Welles, Jr. et al. |
| 3,416,729 A | 12/1968 | Ravitts et al. |
| 3,424,090 A | 1/1969 | Hyde |
| 3,435,213 A | 3/1969 | Colbow et al. |
| 3,497,185 A | 2/1970 | Dively |
| 3,515,375 A | 6/1970 | Roos |
| 3,524,629 A | 8/1970 | Culwell |
| 3,528,548 A | 9/1970 | Sheckler |
| 3,572,658 A | 3/1971 | Ravitts |
| 3,584,261 A * | 6/1971 | Anderson, Jr. .......... H02H 3/08 361/205 |
| 3,594,720 A | 7/1971 | Cane |
| 3,735,926 A | 5/1973 | Ravitts |
| 3,739,986 A | 6/1973 | Ravitts |
| 3,771,724 A | 11/1973 | Rose et al. |
| 3,781,925 A | 1/1974 | Curtis et al. |
| 3,804,049 A | 4/1974 | Greer |
| 3,809,116 A | 5/1974 | Sanner |
| 3,823,767 A | 7/1974 | McLaughlin |
| 3,837,016 A | 9/1974 | Schindler et al. |
| 3,926,008 A | 12/1975 | Webber |
| 3,949,782 A | 4/1976 | Athey et al. |
| 3,953,551 A | 4/1976 | Dorall |
| 3,957,395 A | 5/1976 | Ensign |
| 3,966,358 A | 6/1976 | Heimes et al. |
| 3,970,069 A | 7/1976 | Pickett |
| 4,053,758 A | 10/1977 | Shaw |
| 4,107,492 A | 8/1978 | Moon, Jr. et al. |
| 4,115,878 A | 9/1978 | Johnson et al. |
| 4,116,577 A | 9/1978 | Lauck |
| 4,135,144 A | 1/1979 | Elmasian |
| 4,153,955 A | 5/1979 | Hinterberger |
| 4,180,374 A | 12/1979 | Bristow |
| 4,189,791 A | 2/1980 | Dundas |
| 4,226,815 A | 10/1980 | Cockman |
| 4,233,694 A | 11/1980 | Janosko et al. |
| 4,278,403 A | 7/1981 | Shafer |
| 4,286,303 A | 8/1981 | Genheimer et al. |
| 4,298,868 A | 11/1981 | Spurgeon |
| 4,322,297 A | 3/1982 | Bajka |
| 4,329,120 A | 5/1982 | Walters |
| 4,350,589 A | 9/1982 | Stog |
| 4,368,549 A | 1/1983 | Ramey |
| 4,381,031 A | 4/1983 | Whitaker et al. |
| 4,385,724 A | 5/1983 | Ramsauer et al. |
| 4,392,187 A | 7/1983 | Bornhorst |
| 4,393,527 A | 7/1983 | Ramey |
| 4,402,094 A | 9/1983 | Sanders |
| 4,404,697 A | 9/1983 | Hatcher |
| 4,409,694 A | 10/1983 | Barrett, Sr. et al. |
| 4,421,643 A | 12/1983 | Frederick |
| 4,424,438 A | 1/1984 | Antelman et al. |
| 4,444,546 A | 4/1984 | Pazemenas |
| 4,456,432 A | 6/1984 | Mannino |
| 4,467,183 A | 8/1984 | Ishima |
| 4,505,643 A | 3/1985 | Millis et al. |
| 4,525,125 A | 6/1985 | Matsumoto et al. |
| 4,541,029 A | 9/1985 | Ohyama |
| 4,541,413 A | 9/1985 | Cannaux et al. |
| 4,556,807 A | 12/1985 | Kamada et al. |
| 4,558,238 A | 12/1985 | Kamada et al. |
| 4,563,780 A | 1/1986 | Pollack |
| 4,564,141 A | 1/1986 | Montgomery et al. |
| 4,593,177 A | 6/1986 | Trostler |
| 4,602,391 A | 7/1986 | Shepherd |
| 4,616,215 A | 10/1986 | Maddalena |
| 4,620,835 A | 11/1986 | Bell |
| 4,621,613 A | 11/1986 | Krumhansl |
| 4,636,036 A | 1/1987 | Pasquali |
| 4,647,825 A | 3/1987 | Profio et al. |
| 4,659,235 A | 4/1987 | Gilmore, Jr. et al. |
| 4,663,613 A | 5/1987 | Raleigh et al. |
| 4,676,914 A | 6/1987 | Mills et al. |
| 4,686,439 A | 8/1987 | Cunningham et al. |
| 4,703,387 A | 10/1987 | Miller |
| 4,724,074 A | 2/1988 | Schaupp |
| 4,732,712 A | 3/1988 | Burnham et al. |
| 4,742,456 A | 5/1988 | Kamena |
| 4,749,377 A | 6/1988 | Mendizabal et al. |
| 4,780,917 A | 11/1988 | Hancock |
| 4,781,536 A | 11/1988 | Hicks |
| 4,797,958 A | 1/1989 | Guzzini |
| 4,799,048 A | 1/1989 | Goshima et al. |
| 4,814,800 A | 3/1989 | Lavinsky et al. |
| 4,861,231 A | 8/1989 | Howard |
| 4,867,645 A | 9/1989 | Foster |
| 4,890,208 A | 12/1989 | Izenour |
| 4,913,625 A | 4/1990 | Gerlowski |
| 4,920,465 A | 4/1990 | Sargent |
| 4,930,229 A | 6/1990 | Moser |
| 4,936,506 A | 6/1990 | Ryan |

(56) References Cited

U.S. PATENT DOCUMENTS

| | | | |
|---|---|---|---|
| 4,974,133 A | 11/1990 | Fujiki | |
| 5,006,044 A | 4/1991 | Walker, Sr. et al. | |
| 5,045,983 A | 9/1991 | Shields | |
| 5,064,347 A | 11/1991 | LaValley, Sr. | |
| 5,076,761 A | 12/1991 | Krohn et al. | |
| 5,076,763 A | 12/1991 | Anastos et al. | |
| 5,086,385 A | 2/1992 | Launey et al. | |
| 5,120,198 A | 6/1992 | Clark | |
| 5,146,943 A | 9/1992 | Bert | |
| 5,158,436 A | 10/1992 | Jensen et al. | |
| 5,167,041 A | 12/1992 | Burkitt, III | |
| 5,184,472 A | 2/1993 | Guilbault et al. | |
| 5,190,442 A | 3/1993 | Jorritsma | |
| 5,220,464 A | 6/1993 | Lin | |
| 5,221,189 A | 6/1993 | Henningsen | |
| 5,240,379 A | 8/1993 | Takashi et al. | |
| 5,244,351 A | 9/1993 | Arnette | |
| 5,245,221 A * | 9/1993 | Schmidt | A61H 33/005 307/112 |
| 5,256,948 A | 10/1993 | Boldin et al. | |
| 5,259,733 A | 11/1993 | Gigliotti et al. | |
| 5,278,455 A | 1/1994 | Hamos | |
| 5,347,664 A | 9/1994 | Hamza et al. | |
| 5,361,215 A | 11/1994 | Tompkins et al. | |
| 5,365,964 A | 11/1994 | Sorensen | |
| 5,408,222 A | 4/1995 | Yaffe et al. | |
| 5,410,150 A | 4/1995 | Teran et al. | |
| 5,415,221 A | 5/1995 | Zakryk | |
| 5,422,014 A | 6/1995 | Allen et al. | |
| 5,435,031 A | 7/1995 | Minami et al. | |
| 5,450,334 A | 9/1995 | Pulizzi et al. | |
| 5,464,327 A | 11/1995 | Horwitz | |
| 5,475,619 A | 12/1995 | Sugano et al. | |
| 5,477,111 A | 12/1995 | Steely et al. | |
| 5,499,406 A | 3/1996 | Chalberg et al. | |
| 5,526,538 A | 6/1996 | Rainwater | |
| 5,540,555 A | 7/1996 | Corso et al. | |
| 5,545,012 A | 8/1996 | Anastos et al. | |
| 5,550,753 A | 8/1996 | Tompkins et al. | |
| 5,559,720 A | 9/1996 | Tompkins et al. | |
| 5,560,210 A | 10/1996 | Bronicki | |
| 5,570,481 A | 11/1996 | Mathis et al. | |
| 5,572,438 A | 11/1996 | Ehlers et al. | |
| 5,580,221 A | 12/1996 | Triezenberg | |
| 5,582,509 A | 12/1996 | Quilty et al. | |
| 5,585,025 A | 12/1996 | Idland | |
| 5,589,068 A | 12/1996 | Nielsen | |
| 5,601,413 A | 2/1997 | Langley et al. | |
| 5,602,670 A | 2/1997 | Keegan | |
| 5,616,239 A | 4/1997 | Wendell et al. | |
| 5,624,237 A | 4/1997 | Prescott et al. | |
| 5,649,242 A | 7/1997 | O'Brien et al. | |
| 5,658,131 A | 8/1997 | Aoki et al. | |
| 5,672,049 A | 9/1997 | Ciurlo | |
| 5,672,050 A | 9/1997 | Webber et al. | |
| 5,682,624 A | 11/1997 | Ciochetti | |
| 5,682,684 A | 11/1997 | Wentzlaff et al. | |
| 5,690,476 A | 11/1997 | Miller | |
| 5,706,191 A | 1/1998 | Bassett et al. | |
| 5,706,539 A | 1/1998 | Fukuda | |
| 5,707,211 A | 1/1998 | Kochan, Sr. | |
| 5,708,548 A | 1/1998 | Greeve et al. | |
| 5,725,359 A | 3/1998 | Dongo et al. | |
| 5,730,861 A | 3/1998 | Sterghos et al. | |
| 5,759,414 A | 6/1998 | Wilkes et al. | |
| 5,772,403 A | 6/1998 | Allison et al. | |
| 5,787,519 A | 8/1998 | Smith | |
| 5,795,328 A | 8/1998 | Barnitz et al. | |
| 5,796,184 A | 8/1998 | Kuhnl et al. | |
| 5,809,796 A | 9/1998 | Zakryk | |
| 5,822,807 A | 10/1998 | Gallagher et al. | |
| 5,828,200 A | 10/1998 | Ligman et al. | |
| 5,842,771 A | 12/1998 | Thrasher et al. | |
| 5,846,056 A | 12/1998 | Dhindsa et al. | |
| 5,865,601 A | 2/1999 | Miller | |
| 5,889,684 A | 3/1999 | Ben-David et al. | |
| 5,893,626 A | 4/1999 | Poling | |
| 5,894,609 A | 4/1999 | Barnett | |
| 5,895,565 A | 4/1999 | Steininger et al. | |
| 5,898,958 A | 5/1999 | Hall | |
| 5,932,127 A | 8/1999 | Maddox | |
| 5,947,689 A | 9/1999 | Schick | |
| 5,947,700 A | 9/1999 | McKain et al. | |
| 5,971,712 A | 10/1999 | Kann | |
| 5,984,513 A | 11/1999 | Baldwin | |
| 5,985,155 A | 11/1999 | Maitland | |
| 5,988,516 A | 11/1999 | Gilmour | |
| 5,991,939 A | 11/1999 | Mulvey | |
| 5,996,977 A | 12/1999 | Burgess | |
| 6,002,216 A | 12/1999 | Mateescu | |
| 6,003,164 A | 12/1999 | Leaders | |
| 6,003,165 A | 12/1999 | Loyd | |
| 6,016,038 A | 1/2000 | Mueller et al. | |
| 6,038,712 A | 3/2000 | Chalberg et al. | |
| 6,039,543 A | 3/2000 | Littleton | |
| 6,041,801 A | 3/2000 | Gray et al. | |
| 6,044,901 A | 4/2000 | Basala | |
| 6,045,331 A | 4/2000 | Gehm et al. | |
| 6,053,193 A | 4/2000 | Baker, Jr. | |
| 6,059,536 A | 5/2000 | Stingl | |
| 6,065,941 A | 5/2000 | Gray et al. | |
| 6,079,950 A | 6/2000 | Seneff | |
| 6,080,927 A | 6/2000 | Johnson | |
| 6,081,191 A | 6/2000 | Green et al. | |
| RE36,790 E | 7/2000 | Jincks et al. | |
| 6,081,944 A | 7/2000 | Edwards | |
| 6,084,218 A | 7/2000 | McDonough | |
| 6,090,484 A | 7/2000 | Bergerson | |
| 6,098,648 A | 8/2000 | Bertoia | |
| 6,098,654 A | 8/2000 | Cohen et al. | |
| 6,099,264 A | 8/2000 | Du | |
| 6,100,791 A | 8/2000 | Bader et al. | |
| 6,109,050 A | 8/2000 | Zakryk | |
| 6,116,040 A | 9/2000 | Stark | |
| 6,123,510 A | 9/2000 | Greer et al. | |
| 6,125,481 A | 10/2000 | Sicilano | |
| 6,137,776 A | 10/2000 | Bauerschmidt et al. | |
| 6,140,987 A | 10/2000 | Stein et al. | |
| 6,145,139 A | 11/2000 | Bonn | |
| 6,152,577 A | 11/2000 | Rizkin et al. | |
| 6,157,093 A | 12/2000 | Giannopoulos et al. | |
| 6,166,496 A | 12/2000 | Lys et al. | |
| 6,171,073 B1 | 1/2001 | McKain et al. | |
| 6,175,354 B1 | 1/2001 | Blissett et al. | |
| 6,184,628 B1 | 2/2001 | Ruthenberg | |
| 6,186,167 B1 | 2/2001 | Grumstrup et al. | |
| 6,190,544 B1 | 2/2001 | Edwards | |
| 6,192,282 B1 * | 2/2001 | Smith | G05B 15/02 340/12.53 |
| 6,196,471 B1 | 3/2001 | Ruthenberg | |
| 6,197,219 B1 | 3/2001 | Foulger | |
| 6,211,626 B1 | 4/2001 | Lys et al. | |
| 6,227,808 B1 | 5/2001 | McDonough | |
| 6,241,361 B1 | 6/2001 | Thrasher et al. | |
| 6,241,362 B1 | 6/2001 | Morrison | |
| 6,249,435 B1 | 6/2001 | Vicente et al. | |
| 6,251,285 B1 | 6/2001 | Ciochetti | |
| 6,253,121 B1 | 6/2001 | Cline et al. | |
| 6,253,227 B1 | 6/2001 | Tompkins et al. | |
| 6,253,391 B1 | 7/2001 | Watanabe et al. | |
| 6,259,978 B1 | 7/2001 | Feely | |
| 6,260,004 B1 | 7/2001 | Hays et al. | |
| 6,261,065 B1 | 7/2001 | Nayak et al. | |
| 6,269,493 B2 | 8/2001 | Sorensen | |
| 6,273,686 B1 | 8/2001 | Kroell et al. | |
| 6,282,370 B1 | 8/2001 | Cline et al. | |
| 6,285,140 B1 | 9/2001 | Ruxton | |
| 6,292,901 B1 | 9/2001 | Lys et al. | |
| 6,295,661 B1 | 10/2001 | Bromley | |
| 6,295,662 B1 | 10/2001 | Idland et al. | |
| 6,330,525 B1 | 12/2001 | Hays et al. | |
| 6,332,110 B1 | 12/2001 | Wolfe | |
| 6,341,387 B1 | 1/2002 | Zars | |
| 6,342,841 B1 | 1/2002 | Stingl | |

(56) References Cited

U.S. PATENT DOCUMENTS

| | | |
|---|---|---|
| 6,348,766 B1 | 2/2002 | Ohishi et al. |
| 6,351,079 B1 | 2/2002 | Willis |
| 6,354,573 B1 | 3/2002 | Morando |
| 6,357,889 B1 | 3/2002 | Duggal et al. |
| 6,367,541 B2 | 4/2002 | McCullough |
| 6,374,854 B1 | 4/2002 | Acosta |
| 6,379,025 B1 | 4/2002 | Mateescu et al. |
| 6,390,781 B1 | 5/2002 | McDonough |
| 6,407,469 B1 | 6/2002 | Cline et al. |
| 6,435,691 B1 | 8/2002 | Macey et al. |
| 6,441,558 B1 | 8/2002 | Muthu et al. |
| 6,444,129 B1 | 9/2002 | Collins |
| 6,459,919 B1 | 10/2002 | Lys et al. |
| 6,461,113 B1 | 10/2002 | Gaudet et al. |
| 6,464,464 B2 | 10/2002 | Sabini et al. |
| 6,468,052 B2 | 10/2002 | McKain et al. |
| 6,481,973 B1 | 11/2002 | Struthers |
| 6,487,073 B2 | 11/2002 | McCullough et al. |
| 6,488,408 B1 | 12/2002 | Laflamme et al. |
| 6,497,554 B2 | 12/2002 | Yang et al. |
| 6,528,954 B1 | 3/2003 | Lys et al. |
| 6,547,529 B2 | 4/2003 | Gross |
| 6,548,967 B1 | 4/2003 | Dowling et al. |
| 6,549,855 B2 | 4/2003 | Babel et al. |
| 6,554,454 B1 | 4/2003 | Kitano |
| 6,560,543 B2 | 5/2003 | Wolfe et al. |
| 6,568,416 B2 | 5/2003 | Tucker et al. |
| 6,570,493 B1 | 5/2003 | Rotem |
| 6,574,581 B1 | 6/2003 | Bohrer et al. |
| 6,577,080 B2 | 6/2003 | Lys et al. |
| 6,585,399 B2 | 7/2003 | Kreutzer et al. |
| 6,590,188 B2 | 7/2003 | Cline et al. |
| 6,591,863 B2 | 7/2003 | Ruschell et al. |
| 6,592,752 B2 | 7/2003 | Mathews |
| 6,603,488 B2 * | 8/2003 | Humpleman ....... H04L 12/2803 345/169 |
| 6,608,453 B2 | 8/2003 | Morgan et al. |
| 6,615,594 B2 | 9/2003 | Jayanth et al. |
| 6,616,291 B1 | 9/2003 | Love |
| 6,622,053 B1 | 9/2003 | Hewlett et al. |
| 6,622,115 B1 | 9/2003 | Brown et al. |
| 6,623,245 B2 | 9/2003 | Meza et al. |
| 6,624,597 B2 | 9/2003 | Dowling et al. |
| 6,627,858 B2 | 9/2003 | Nomura et al. |
| 6,629,021 B2 | 9/2003 | Cline et al. |
| 6,636,808 B1 | 10/2003 | Brown et al. |
| 6,643,108 B2 | 11/2003 | Cline et al. |
| 6,657,546 B2 | 12/2003 | Navarro et al. |
| 6,659,980 B2 | 12/2003 | Moberg et al. |
| 6,663,349 B1 | 12/2003 | Discenzo et al. |
| 6,670,584 B1 | 12/2003 | Azizeh |
| 6,672,386 B2 | 1/2004 | Krueger et al. |
| 6,676,382 B2 | 1/2004 | Leighton et al. |
| 6,676,831 B2 | 1/2004 | Wolfe |
| 6,687,923 B2 | 2/2004 | Dick et al. |
| 6,709,241 B2 | 3/2004 | Sabini et al. |
| 6,717,376 B2 | 4/2004 | Lys et al. |
| 6,718,213 B1 | 4/2004 | Enberg |
| 6,720,745 B2 | 4/2004 | Lys et al. |
| 6,744,223 B2 | 6/2004 | Laflamme et al. |
| 6,747,367 B2 | 6/2004 | Cline et al. |
| 6,774,584 B2 | 8/2004 | Lys et al. |
| 6,777,891 B2 | 8/2004 | Lys et al. |
| 6,779,205 B2 | 8/2004 | Mulvey et al. |
| 6,781,329 B2 | 8/2004 | Mueller et al. |
| 6,782,294 B2 | 8/2004 | Reich et al. |
| 6,782,309 B2 | 8/2004 | Laflamme et al. |
| 6,783,328 B2 | 8/2004 | Lucke et al. |
| 6,788,011 B2 | 9/2004 | Mueller et al. |
| 6,796,776 B2 | 9/2004 | Jolley et al. |
| 6,799,950 B2 | 10/2004 | Meier et al. |
| 6,801,003 B2 | 10/2004 | Schanberger et al. |
| 6,810,915 B2 | 11/2004 | Umetsu et al. |
| 6,811,286 B2 | 11/2004 | Mateescu et al. |
| 6,827,464 B2 | 12/2004 | Koren et al. |
| 6,831,679 B1 | 12/2004 | Olsson et al. |
| 6,837,688 B2 | 1/2005 | Kimberlin et al. |
| 6,853,867 B1 | 2/2005 | Klindt et al. |
| 6,868,295 B2 | 3/2005 | Huang |
| 6,869,204 B2 | 3/2005 | Morgan et al. |
| 6,875,961 B1 | 4/2005 | Collins |
| 6,883,929 B2 | 4/2005 | Dowling |
| 6,886,625 B1 | 5/2005 | Sagal et al. |
| 6,888,322 B2 | 5/2005 | Dowling et al. |
| 6,895,307 B2 | 5/2005 | Gardner, Jr. |
| 6,896,045 B2 | 5/2005 | Panek |
| 6,896,204 B1 | 5/2005 | Greene et al. |
| 6,897,624 B2 | 5/2005 | Lys et al. |
| 6,900,742 B2 | 5/2005 | Chesney, II |
| 6,902,378 B2 | 6/2005 | Gaudet et al. |
| 6,918,692 B2 | 7/2005 | Yang |
| 6,936,978 B2 | 8/2005 | Morgan et al. |
| 6,939,109 B2 | 9/2005 | Takahashi et al. |
| 6,943,325 B2 | 9/2005 | Pittman et al. |
| 6,943,654 B2 | 9/2005 | Zhou et al. |
| 6,949,894 B1 | 9/2005 | Sullivan et al. |
| 6,950,725 B2 | 9/2005 | von Kannewurff et al. |
| 6,954,701 B2 | 10/2005 | Wolfe |
| 6,957,742 B1 | 10/2005 | Pillart |
| 6,965,205 B2 | 11/2005 | Piepgras et al. |
| 6,965,815 B1 | 11/2005 | Tompkins et al. |
| 6,967,448 B2 | 11/2005 | Morgan et al. |
| 6,969,954 B2 | 11/2005 | Lys |
| 6,971,760 B2 | 12/2005 | Archer et al. |
| 6,975,079 B2 | 12/2005 | Lys et al. |
| 6,976,052 B2 | 12/2005 | Tompkins et al. |
| 6,981,805 B2 | 1/2006 | Miller et al. |
| 6,993,415 B2 | 1/2006 | Bauer et al. |
| 7,010,363 B2 | 3/2006 | Donnelly et al. |
| 7,023,147 B2 | 4/2006 | Colby et al. |
| 7,030,343 B2 | 4/2006 | Tran |
| 7,030,565 B2 | 4/2006 | Hollaway |
| 7,031,920 B2 | 4/2006 | Dowling et al. |
| 7,038,398 B1 | 5/2006 | Lys et al. |
| 7,038,399 B2 | 5/2006 | Lys et al. |
| 7,055,988 B2 | 6/2006 | Mateescu et al. |
| 7,057,140 B2 | 6/2006 | Pittman |
| 7,064,498 B2 | 6/2006 | Dowling et al. |
| 7,076,813 B2 | 7/2006 | Stetson |
| 7,097,329 B2 | 8/2006 | Mateescu et al. |
| 7,110,832 B2 | 9/2006 | Ghent |
| 7,112,768 B2 | 9/2006 | Brochu et al. |
| 7,113,541 B1 | 9/2006 | Lys et al. |
| 7,114,581 B2 | 10/2006 | Aronstam et al. |
| 7,124,819 B2 | 10/2006 | Ciglenec et al. |
| 7,128,440 B2 | 10/2006 | Mateescu et al. |
| 7,132,635 B2 | 11/2006 | Dowling |
| 7,132,785 B2 | 11/2006 | Ducharme |
| 7,132,954 B2 | 11/2006 | Shebek et al. |
| 7,135,824 B2 | 11/2006 | Lys et al. |
| 7,139,617 B1 | 11/2006 | Morgan et al. |
| 7,142,128 B2 | 11/2006 | Kobayashi |
| 7,146,408 B1 | 12/2006 | Crater et al. |
| 7,158,909 B2 | 1/2007 | Tarpo et al. |
| 7,161,311 B2 | 1/2007 | Mueller et al. |
| 7,161,556 B2 | 1/2007 | Morgan et al. |
| 7,167,087 B2 | 1/2007 | Corrington et al. |
| 7,178,392 B2 | 2/2007 | Dhruva et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,613 B2 | 4/2007 | Morgan et al. |
| 7,204,602 B2 | 4/2007 | Archer |
| 7,204,622 B2 | 4/2007 | Dowling et al. |
| 7,216,188 B2 | 5/2007 | Reid et al. |
| 7,225,058 B1 * | 5/2007 | Porter .................. A01G 25/165 137/624.11 |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,234,521 B2 | 6/2007 | Shammai et al. |
| 7,236,692 B2 | 6/2007 | Tran |
| 7,242,152 B2 | 7/2007 | Dowling et al. |

(56) References Cited

U.S. PATENT DOCUMENTS

| | | |
|---|---|---|
| 7,248,239 B2 | 7/2007 | Dowling et al. |
| 7,253,566 B2 | 8/2007 | Lys et al. |
| 7,255,457 B2 | 8/2007 | Ducharme et al. |
| 7,256,554 B2 | 8/2007 | Lys |
| 7,258,463 B2 | 8/2007 | Sloan et al. |
| 7,266,983 B2 | 9/2007 | Krueger et al. |
| 7,278,762 B2 | 10/2007 | Schottland et al. |
| 7,289,343 B2 | 10/2007 | Rodriguez et al. |
| 7,292,898 B2 | 11/2007 | Clark et al. |
| 7,300,192 B2 | 11/2007 | Mueller et al. |
| 7,303,300 B2 | 12/2007 | Dowling et al. |
| 7,303,301 B2 | 12/2007 | Koren et al. |
| 7,309,216 B1 | 12/2007 | Spadola, Jr. et al. |
| 7,309,965 B2 | 12/2007 | Dowling et al. |
| 7,317,264 B2 | 1/2008 | Kinsella et al. |
| 7,332,093 B2 | 2/2008 | Rosen et al. |
| 7,352,339 B2 | 4/2008 | Morgan et al. |
| 7,353,071 B2 | 4/2008 | Blackwell et al. |
| 7,356,011 B1 | 4/2008 | Waters et al. |
| 7,357,525 B2 | 4/2008 | Doyle |
| 7,358,679 B2 | 4/2008 | Lys et al. |
| 7,358,706 B2 | 4/2008 | Lys |
| 7,358,929 B2 | 4/2008 | Mueller et al. |
| 7,358,961 B2 | 4/2008 | Zwanenburg |
| 7,364,488 B2 | 4/2008 | Mueller et al. |
| 7,393,450 B2 | 7/2008 | Silveri |
| 7,396,139 B2 | 7/2008 | Savage |
| 7,397,360 B2 | 7/2008 | Corrington et al. |
| 7,398,138 B2 | 7/2008 | Emery et al. |
| 7,410,268 B2 | 8/2008 | Koren et al. |
| 7,417,834 B2 | 8/2008 | Cline et al. |
| 7,419,406 B2 | 9/2008 | Brochu et al. |
| 7,427,840 B2 | 9/2008 | Morgan et al. |
| 7,427,923 B2 | 9/2008 | Durand |
| 7,440,820 B2 | 10/2008 | Gougerot et al. |
| 7,440,864 B2 | 10/2008 | Otto |
| 7,449,847 B2 | 11/2008 | Schanberger et al. |
| 7,482,764 B2 | 1/2009 | Morgan et al. |
| 7,484,938 B2 | 2/2009 | Allen |
| 7,488,084 B2 | 2/2009 | Potucek et al. |
| 7,489,986 B1 | 2/2009 | Laflamme et al. |
| 7,497,595 B2 | 3/2009 | Mateescu et al. |
| 7,514,884 B2 | 4/2009 | Potucek et al. |
| 7,520,628 B1 | 4/2009 | Sloan et al. |
| 7,521,872 B2 | 4/2009 | Bruning |
| 7,542,251 B2 | 6/2009 | Ivankovic |
| 7,550,935 B2 | 6/2009 | Lys et al. |
| 7,553,040 B2 | 6/2009 | Boothe et al. |
| 7,569,150 B2 | 8/2009 | Kilawee et al. |
| 7,584,897 B2 | 9/2009 | Schultz et al. |
| 7,598,681 B2 | 10/2009 | Lys et al. |
| 7,606,639 B2 | 10/2009 | Miyaji |
| 7,619,181 B2 | 11/2009 | Authier |
| 7,626,789 B2 | 12/2009 | Cline et al. |
| 7,628,512 B2 | 12/2009 | Netzel, Sr. et al. |
| 7,632,402 B2 | 12/2009 | King et al. |
| 7,636,615 B2 | 12/2009 | Pfingsten et al. |
| 7,643,823 B2 | 1/2010 | Shamoon et al. |
| 7,652,395 B2 | 1/2010 | Von Arx et al. |
| 7,653,443 B2 | 1/2010 | Flohr |
| 7,686,587 B2 | 3/2010 | Koehl |
| 7,686,589 B2 | 3/2010 | Stiles, Jr. et al. |
| 7,705,240 B2 | 4/2010 | Armstrong et al. |
| 7,722,216 B2 | 5/2010 | Amor et al. |
| 7,723,868 B2 | 5/2010 | Yoshimura |
| 7,726,869 B2 | 6/2010 | Chien |
| 7,744,237 B2 | 6/2010 | Potucek et al. |
| 7,745,959 B2 | 6/2010 | King, Jr. et al. |
| 7,756,556 B2 | 7/2010 | Patel et al. |
| 7,781,910 B2 | 8/2010 | Donnell et al. |
| 7,815,420 B2 | 10/2010 | Koehl |
| 7,831,756 B1 * | 11/2010 | Fils ................ H04B 1/082 |
| | | 710/303 |
| 7,838,803 B1 | 11/2010 | Rosen |
| 7,843,357 B2 | 11/2010 | Brochu et al. |
| 7,845,823 B2 | 12/2010 | Mueller et al. |
| 7,845,913 B2 | 12/2010 | Stiles, Jr. et al. |
| 7,847,486 B2 | 12/2010 | Ng |
| 7,854,597 B2 | 12/2010 | Stiles, Jr. et al. |
| 7,874,808 B2 | 1/2011 | Stiles |
| 7,895,532 B2 | 2/2011 | Scott et al. |
| 7,931,447 B2 | 4/2011 | Levin et al. |
| 7,949,615 B2 | 5/2011 | Ehlers et al. |
| 7,953,518 B2 | 5/2011 | Kansal et al. |
| 7,982,625 B2 | 7/2011 | Brochu et al. |
| 7,991,513 B2 | 8/2011 | Pitt |
| 3,014,902 A1 | 9/2011 | Kates |
| 8,019,479 B2 | 9/2011 | Stiles et al. |
| 8,043,070 B2 | 10/2011 | Stiles, Jr. et al. |
| 8,112,164 B2 | 2/2012 | Hollaway |
| 8,121,737 B2 | 2/2012 | West et al. |
| 8,143,811 B2 | 3/2012 | Shloush et al. |
| 8,145,357 B2 * | 3/2012 | Nibler ................ G05B 19/106 |
| | | 340/505 |
| 8,148,357 B2 | 4/2012 | Okumura |
| 8,160,752 B2 | 4/2012 | Weaver et al. |
| 8,178,997 B2 | 5/2012 | Talkin et al. |
| 8,200,373 B2 | 6/2012 | Stiles, Jr. et al. |
| 8,209,794 B1 | 7/2012 | Harrison |
| 8,239,073 B2 | 8/2012 | Fausak et al. |
| 8,246,189 B2 | 8/2012 | Muller et al. |
| 8,255,090 B2 | 8/2012 | Frader-Thompson et al. |
| 8,259,456 B2 | 9/2012 | Rosenau et al. |
| 8,280,535 B2 | 10/2012 | Hsieh |
| 8,295,990 B2 | 10/2012 | Venkatakrishnan et al. |
| 8,332,055 B2 | 12/2012 | Veillette |
| 8,335,842 B2 | 12/2012 | Raji et al. |
| 8,367,007 B2 | 2/2013 | Otero et al. |
| 8,467,908 B2 | 6/2013 | Broniak et al. |
| 8,468,165 B2 | 6/2013 | Walker |
| 8,600,566 B1 | 12/2013 | Longo et al. |
| 8,649,908 B2 * | 2/2014 | Nibler ................ G05B 19/106 |
| | | 700/19 |
| 8,649,909 B1 | 2/2014 | Phillips |
| 8,682,458 B2 | 3/2014 | Hollaway |
| 8,688,280 B2 | 4/2014 | Macey |
| 8,699,462 B2 | 4/2014 | Spinelli et al. |
| 8,725,202 B2 | 5/2014 | Wasily |
| 8,736,193 B2 | 5/2014 | Gallo |
| 8,746,583 B2 | 6/2014 | Simon et al. |
| 8,785,771 B2 * | 7/2014 | Dunkleberger ..... H04L 12/2829 |
| | | 361/728 |
| 8,818,530 B2 | 8/2014 | Netzel, Sr. et al. |
| 8,838,280 B2 | 9/2014 | Macey |
| 8,953,117 B2 | 2/2015 | Rosenau et al. |
| 9,007,186 B1 | 4/2015 | Krummey et al. |
| 9,031,702 B2 | 5/2015 | Pruchniewski et al. |
| 9,058,027 B2 | 6/2015 | Macey |
| 9,069,201 B2 | 6/2015 | Pipitone et al. |
| 9,084,314 B2 | 7/2015 | Conover et al. |
| 9,285,790 B2 | 3/2016 | Pruchniewski et al. |
| 9,501,072 B2 | 11/2016 | Potucek et al. |
| 9,655,810 B2 | 5/2017 | Macey |
| 9,858,792 B2 | 1/2018 | Fernandes et al. |
| 9,971,348 B1 | 5/2018 | Canavor et al. |
| 10,037,675 B2 | 7/2018 | Uy |
| 10,102,585 B1 | 10/2018 | Bryant et al. |
| 10,127,362 B2 | 11/2018 | Bennett et al. |
| 10,159,624 B2 | 12/2018 | Laflamme et al. |
| 10,255,784 B2 | 4/2019 | Uy |
| 10,375,543 B2 | 8/2019 | McQueen et al. |
| 10,394,933 B2 | 8/2019 | Putrevu et al. |
| 10,560,820 B2 | 2/2020 | McQueen et al. |
| 10,618,136 B2 | 4/2020 | Bauckman et al. |
| 10,621,848 B2 | 4/2020 | Uy |
| 10,624,812 B2 | 4/2020 | Laflamme et al. |
| 10,638,292 B2 | 4/2020 | Karp et al. |
| 10,764,235 B2 | 9/2020 | Chu et al. |
| 10,909,834 B2 | 2/2021 | Uy |
| 10,931,472 B2 | 2/2021 | Khalid et al. |
| 10,951,433 B2 | 3/2021 | Khalid et al. |
| 10,996,702 B2 | 5/2021 | Imes et al. |
| 11,025,448 B2 | 6/2021 | Khalid et al. |
| 11,082,251 B2 | 8/2021 | Khalid et al. |

(56) References Cited

U.S. PATENT DOCUMENTS

| | | | |
|---|---|---|---|
| 11,096,024 B2 | 8/2021 | McQueen et al. |
| 11,108,585 B2 | 8/2021 | Khalid et al. |
| 11,121,887 B2 | 9/2021 | Khalid et al. |
| 11,139,997 B2 | 10/2021 | Khalid et al. |
| 11,153,113 B2 | 10/2021 | Khalid et al. |
| 11,213,455 B2 | 1/2022 | Laflamme et al. |
| 11,256,272 B2 | 2/2022 | Ravid |
| 2001/0028227 A1 | 10/2001 | Lys et al. |
| 2001/0041139 A1 | 11/2001 | Sabini et al. |
| 2001/0047539 A1 | 12/2001 | Lynn |
| 2002/0035403 A1 | 3/2002 | Clark et al. |
| 2002/0043938 A1 | 4/2002 | Lys |
| 2002/0065583 A1 | 5/2002 | Okada et al. |
| 2002/0069460 A1 | 6/2002 | Huffington et al. |
| 2002/0070611 A1 | 6/2002 | Cline et al. |
| 2002/0074559 A1 | 6/2002 | Dowling et al. |
| 2002/0082727 A1 | 6/2002 | Laflamme et al. |
| 2002/0108913 A1 | 8/2002 | Collins |
| 2002/0113555 A1 | 8/2002 | Lys et al. |
| 2002/0120369 A1 | 8/2002 | Boies et al. |
| 2002/0135476 A1 | 9/2002 | McKinney et al. |
| 2002/0149933 A1 | 10/2002 | Archer et al. |
| 2002/0150476 A1 | 10/2002 | Lucke et al. |
| 2002/0152045 A1 | 10/2002 | Dowling et al. |
| 2002/0163316 A1 | 11/2002 | Lys et al. |
| 2002/0171365 A1 | 11/2002 | Morgan et al. |
| 2002/0176259 A1 | 11/2002 | Ducharme |
| 2003/0006891 A1 | 1/2003 | Wild et al. |
| 2003/0034284 A1 | 2/2003 | Wolfe |
| 2003/0040813 A1* | 2/2003 | Gonzales ............ H01H 15/005 700/19 |
| 2003/0057884 A1 | 3/2003 | Dowling et al. |
| 2003/0061004 A1 | 3/2003 | Discenzo |
| 2003/0063900 A1 | 4/2003 | Wang et al. |
| 2003/0085183 A1 | 5/2003 | Mathews |
| 2003/0106147 A1 | 6/2003 | Cohen et al. |
| 2003/0133292 A1 | 7/2003 | Mueller et al. |
| 2003/0150394 A1 | 8/2003 | Wolfe |
| 2003/0168516 A1 | 9/2003 | Cline |
| 2003/0171111 A1 | 9/2003 | Clark |
| 2003/0196942 A1 | 10/2003 | Jones |
| 2003/0222782 A1 | 12/2003 | Gaudreau |
| 2003/0226663 A1 | 12/2003 | Krueger et al. |
| 2004/0016241 A1 | 1/2004 | Street et al. |
| 2004/0017158 A1 | 1/2004 | Ang et al. |
| 2004/0020485 A1 | 2/2004 | Roesler et al. |
| 2004/0047145 A1 | 3/2004 | Koren |
| 2004/0052076 A1 | 3/2004 | Mueller et al. |
| 2004/0105261 A1 | 6/2004 | Ducharme et al. |
| 2004/0117330 A1 | 6/2004 | Ehlers et al. |
| 2004/0133314 A1* | 7/2004 | Ehlers ............... G06Q 10/10 700/276 |
| 2004/0141321 A1 | 7/2004 | Dowling et al. |
| 2004/0206548 A1 | 10/2004 | Aronstam et al. |
| 2004/0219025 A1 | 11/2004 | Garcia-Ortiz |
| 2004/0230344 A1 | 11/2004 | Gallupe et al. |
| 2004/0231842 A1 | 11/2004 | Shammai et al. |
| 2004/0260427 A1* | 12/2004 | Wimsatt ............. G05B 15/02 700/275 |
| 2005/0038529 A1* | 2/2005 | Perez ................. A01G 25/16 700/19 |
| 2005/0039527 A1 | 2/2005 | Dhruva et al. |
| 2005/0040774 A1 | 2/2005 | Mueller et al. |
| 2005/0041161 A1 | 2/2005 | Dowling et al. |
| 2005/0047772 A1 | 3/2005 | Hayami et al. |
| 2005/0063123 A1 | 3/2005 | Cline et al. |
| 2005/0066433 A1 | 3/2005 | Phillips |
| 2005/0066434 A1 | 3/2005 | Phillips |
| 2005/0072850 A1 | 4/2005 | Cornwall et al. |
| 2005/0088434 A1 | 4/2005 | Potucek |
| 2005/0099824 A1 | 5/2005 | Dowling et al. |
| 2005/0115716 A1 | 6/2005 | Ciglenec et al. |
| 2005/0123408 A1 | 6/2005 | Koehl |
| 2005/0125718 A1 | 6/2005 | Van Doorn |
| 2005/0128751 A1 | 6/2005 | Roberge et al. |
| 2005/0168902 A1 | 8/2005 | Laflamme et al. |
| 2005/0174473 A1 | 8/2005 | Morgan et al. |
| 2005/0184681 A1 | 8/2005 | Gordin et al. |
| 2005/0191184 A1 | 9/2005 | Vinson |
| 2005/0193485 A1 | 9/2005 | Wolfe |
| 2005/0198063 A1 | 9/2005 | Thomas et al. |
| 2005/0213352 A1 | 9/2005 | Lys |
| 2005/0213353 A1 | 9/2005 | Lys |
| 2005/0218870 A1 | 10/2005 | Lys |
| 2005/0226731 A1 | 10/2005 | Mehlhorn et al. |
| 2005/0236594 A1 | 10/2005 | Lilly et al. |
| 2005/0248299 A1 | 11/2005 | Chemel et al. |
| 2005/0288821 A1 | 12/2005 | Laflamme et al. |
| 2006/0009861 A1* | 1/2006 | Bonasia ............. H04L 12/2809 700/18 |
| 2006/0012987 A9 | 1/2006 | Ducharme et al. |
| 2006/0022214 A1 | 2/2006 | Morgan et al. |
| 2006/0023454 A1 | 2/2006 | Koren |
| 2006/0038661 A1 | 2/2006 | Reinhold et al. |
| 2006/0045751 A1 | 3/2006 | Beckman et al. |
| 2006/0059922 A1 | 3/2006 | Anderson et al. |
| 2006/0076908 A1 | 4/2006 | Morgan et al. |
| 2006/0090255 A1 | 5/2006 | Cohen |
| 2006/0112480 A1 | 6/2006 | Sisk |
| 2006/0127227 A1 | 6/2006 | Mehlhorn et al. |
| 2006/0168611 A1 | 7/2006 | Fima |
| 2006/0176693 A1 | 8/2006 | Walter et al. |
| 2006/0198128 A1 | 9/2006 | Piepgras et al. |
| 2006/0204367 A1 | 9/2006 | Meza et al. |
| 2006/0238130 A1 | 10/2006 | Hosoya |
| 2007/0027564 A1 | 2/2007 | Walters |
| 2007/0093920 A1 | 4/2007 | Tarpo et al. |
| 2007/0094784 A1 | 5/2007 | Tran |
| 2007/0096134 A1 | 5/2007 | Kim et al. |
| 2007/0106403 A1* | 5/2007 | Emery ................ C02F 1/008 700/90 |
| 2007/0114162 A1 | 5/2007 | Stiles et al. |
| 2007/0154321 A1 | 7/2007 | Stiles et al. |
| 2007/0154322 A1 | 7/2007 | Stiles et al. |
| 2007/0163929 A1 | 7/2007 | Stiles et al. |
| 2007/0183902 A1 | 8/2007 | Stiles et al. |
| 2007/0216318 A1 | 9/2007 | Altonen et al. |
| 2007/0222295 A1 | 9/2007 | Wareham et al. |
| 2007/0233420 A1 | 10/2007 | Potucek et al. |
| 2007/0233509 A1 | 10/2007 | Buchman et al. |
| 2007/0251461 A1 | 11/2007 | Reichard et al. |
| 2007/0263378 A1 | 11/2007 | Koren |
| 2007/0294443 A1 | 12/2007 | Berenbaum et al. |
| 2007/0299562 A1 | 12/2007 | Kates |
| 2008/0021685 A1 | 1/2008 | Emery et al. |
| 2008/0039977 A1 | 2/2008 | Clark et al. |
| 2008/0041839 A1 | 2/2008 | Tran |
| 2008/0082661 A1 | 4/2008 | Huber |
| 2008/0095638 A1 | 4/2008 | Branecky |
| 2008/0095639 A1 | 4/2008 | Bartos et al. |
| 2008/0106422 A1 | 5/2008 | Sparks et al. |
| 2008/0144678 A1 | 6/2008 | Lu et al. |
| 2008/0165527 A1 | 7/2008 | VanderSchuit |
| 2008/0167756 A1* | 7/2008 | Golden ............... G05B 15/02 700/297 |
| 2008/0167931 A1 | 7/2008 | Gerstemeier et al. |
| 2008/0168599 A1 | 7/2008 | Caudill et al. |
| 2008/0186202 A1 | 8/2008 | Vaswani et al. |
| 2008/0197788 A1* | 8/2008 | Conover ............. H05B 37/029 315/291 |
| 2008/0218002 A1 | 9/2008 | Straka |
| 2008/0221737 A1* | 9/2008 | Josephson .......... G01D 4/02 700/276 |
| 2008/0237148 A1 | 10/2008 | Dennis et al. |
| 2008/0250581 A1 | 10/2008 | Henkin et al. |
| 2008/0251602 A1 | 10/2008 | Leggett et al. |
| 2008/0288115 A1 | 11/2008 | Rusnak et al. |
| 2008/0297068 A1 | 12/2008 | Koren et al. |
| 2008/0311898 A1 | 12/2008 | Benco et al. |
| 2009/0013570 A1 | 1/2009 | Grajcar |
| 2009/0016901 A1 | 1/2009 | Morris, III |
| 2009/0038696 A1 | 2/2009 | Levin et al. |
| 2009/0055029 A1 | 2/2009 | Roberson et al. |

(56) References Cited

U.S. PATENT DOCUMENTS

| | | | |
|---|---|---|---|
| 2009/0057425 A1* | 3/2009 | Sullivan | G05B 15/02 236/51 |
| 2009/0094173 A1 | 4/2009 | Smith et al. | |
| 2009/0109617 A1 | 4/2009 | Grajcar | |
| 2009/0132066 A1 | 5/2009 | Hollaway | |
| 2009/0138099 A1 | 5/2009 | Veillette | |
| 2009/0138131 A1* | 5/2009 | Uy | A01G 25/162 700/284 |
| 2009/0143917 A1 | 6/2009 | Uy et al. | |
| 2009/0151801 A1 | 6/2009 | Gorman et al. | |
| 2009/0164049 A1 | 6/2009 | Nibler et al. | |
| 2009/0180281 A1 | 7/2009 | Ahland, III et al. | |
| 2009/0180290 A1 | 7/2009 | Grajcar | |
| 2009/0185350 A1 | 7/2009 | Grajcar | |
| 2009/0185373 A1 | 7/2009 | Grajcar | |
| 2009/0185914 A1 | 7/2009 | Elnar | |
| 2009/0195349 A1 | 8/2009 | Frader-Thompson et al. | |
| 2009/0200245 A1* | 8/2009 | Steinbrueck | C02F 1/008 210/741 |
| 2009/0202250 A1* | 8/2009 | Dizechi | G08C 17/02 398/107 |
| 2009/0204239 A1 | 8/2009 | Netzel, Sr. et al. | |
| 2009/0204263 A1 | 8/2009 | Love | |
| 2009/0206769 A1 | 8/2009 | Biery et al. | |
| 2009/0210081 A1 | 8/2009 | Sustaeta et al. | |
| 2009/0211986 A1 | 8/2009 | Kates | |
| 2009/0261045 A1 | 10/2009 | Kilawee et al. | |
| 2009/0271042 A1 | 10/2009 | Voysey | |
| 2009/0278479 A1 | 11/2009 | Plainer et al. | |
| 2009/0282627 A1 | 11/2009 | Porat | |
| 2009/0290989 A1 | 11/2009 | Mehlhorn et al. | |
| 2009/0301522 A1 | 12/2009 | Abehasera et al. | |
| 2009/0322346 A1 | 12/2009 | Cao | |
| 2009/0327931 A1 | 12/2009 | Bonuso et al. | |
| 2010/0004764 A1 | 1/2010 | Ebrom et al. | |
| 2010/0017954 A1 | 1/2010 | Peterson et al. | |
| 2010/0018930 A1 | 1/2010 | King et al. | |
| 2010/0025483 A1 | 2/2010 | Hoeynck et al. | |
| 2010/0026102 A1 | 2/2010 | Landgraf et al. | |
| 2010/0033277 A1 | 2/2010 | Davis | |
| 2010/0039043 A1 | 2/2010 | Wacknov et al. | |
| 2010/0046133 A1 | 2/2010 | Suzuki | |
| 2010/0066260 A1 | 3/2010 | Newman, Jr. et al. | |
| 2010/0068073 A1 | 3/2010 | Branecky | |
| 2010/0070059 A1 | 3/2010 | LaFlamme et al. | |
| 2010/0082174 A1 | 4/2010 | Weaver | |
| 2010/0092308 A1 | 4/2010 | Stiles, Jr. et al. | |
| 2010/0100253 A1 | 4/2010 | Fausak et al. | |
| 2010/0118511 A1 | 5/2010 | Wegat | |
| 2010/0138007 A1* | 6/2010 | Clark | H04L 12/2809 700/90 |
| 2010/0157599 A1 | 6/2010 | Carter et al. | |
| 2010/0179704 A1 | 7/2010 | Ozog | |
| 2010/0185972 A1 | 7/2010 | Sherwood, II | |
| 2010/0200074 A1 | 8/2010 | Weatherbee et al. | |
| 2010/0211509 A1 | 8/2010 | Jacobs | |
| 2010/0214317 A1 | 8/2010 | Miura et al. | |
| 2010/0219962 A1 | 9/2010 | Brochu et al. | |
| 2010/0222934 A1 | 9/2010 | Iino et al. | |
| 2010/0232981 A1 | 9/2010 | Branecky et al. | |
| 2010/0254825 A1 | 10/2010 | Stiles, Jr. et al. | |
| 2010/0262313 A1 | 10/2010 | Chambers et al. | |
| 2010/0294751 A1 | 11/2010 | Chandler et al. | |
| 2010/0299401 A1 | 11/2010 | Lloyd | |
| 2010/0300548 A1 | 12/2010 | DeVerse | |
| 2010/0310382 A1 | 12/2010 | Kidd et al. | |
| 2010/0313169 A1 | 12/2010 | Huang et al. | |
| 2010/0314942 A1 | 12/2010 | Talkin et al. | |
| 2010/0321201 A1 | 12/2010 | Huang et al. | |
| 2010/0328314 A1 | 12/2010 | Ellingham et al. | |
| 2011/0001436 A1 | 1/2011 | Chemel et al. | |
| 2011/0002261 A1 | 1/2011 | Mocanu et al. | |
| 2011/0002792 A1 | 1/2011 | Bartos et al. | |
| 2011/0015797 A1* | 1/2011 | Gilstrap | G05B 15/02 700/291 |
| 2011/0040415 A1 | 2/2011 | Nickerson et al. | |
| 2011/0046796 A1 | 2/2011 | Brochu et al. | |
| 2011/0046806 A1 | 2/2011 | Nagel et al. | |
| 2011/0082599 A1 | 4/2011 | Shinde et al. | |
| 2011/0091329 A1 | 4/2011 | Stiles, Jr. et al. | |
| 2011/0093099 A1* | 4/2011 | Tran | G05B 15/02 700/90 |
| 2011/0101868 A1 | 5/2011 | Weiss | |
| 2011/0106276 A1 | 5/2011 | Donnell et al. | |
| 2011/0178650 A1 | 7/2011 | Picco | |
| 2011/0195664 A1 | 8/2011 | Keirstead et al. | |
| 2011/0196990 A1 | 8/2011 | Govindaraju et al. | |
| 2011/0197977 A1 | 8/2011 | Henderson | |
| 2011/0202189 A1 | 8/2011 | Venkatakrishnan et al. | |
| 2011/0202190 A1 | 8/2011 | Venkatakrishnan et al. | |
| 2011/0202194 A1 | 8/2011 | Kobraei et al. | |
| 2011/0202195 A1 | 8/2011 | Finch et al. | |
| 2011/0202196 A1 | 8/2011 | Venkatakrishnan et al. | |
| 2011/0202198 A1 | 8/2011 | Venkatakrishnan et al. | |
| 2011/0202910 A1 | 8/2011 | Venkatakrishnan et al. | |
| 2011/0231028 A1 | 9/2011 | Ozog | |
| 2011/0253638 A1 | 10/2011 | Easland et al. | |
| 2011/0267834 A1 | 11/2011 | Potucek et al. | |
| 2011/0286859 A1 | 11/2011 | Ortiz et al. | |
| 2011/0290707 A1 | 12/2011 | Porat | |
| 2011/0299068 A1 | 12/2011 | Glandt et al. | |
| 2012/0006730 A1 | 1/2012 | Tesauro et al. | |
| 2012/0020810 A1 | 1/2012 | Stiles, Jr. et al. | |
| 2012/0029705 A1 | 2/2012 | Broniak et al. | |
| 2012/0053737 A1 | 3/2012 | Vallur et al. | |
| 2012/0063921 A1 | 3/2012 | Stiles, Jr. et al. | |
| 2012/0065798 A1 | 3/2012 | Finch et al. | |
| 2012/0078426 A1 | 3/2012 | Macey | |
| 2012/0089269 A1 | 4/2012 | Weaver et al. | |
| 2012/0093508 A1 | 4/2012 | Baykal et al. | |
| 2012/0100010 A1 | 4/2012 | Stiles, Jr. et al. | |
| 2012/0101647 A1 | 4/2012 | LaFlamme et al. | |
| 2012/0106149 A1 | 5/2012 | Boa | |
| 2012/0117724 A1 | 5/2012 | Caudill et al. | |
| 2012/0130550 A1 | 5/2012 | Brochu et al. | |
| 2012/0158336 A1 | 6/2012 | Duchamp et al. | |
| 2012/0185571 A1 | 7/2012 | Uy | |
| 2012/0209444 A1 | 8/2012 | Seo et al. | |
| 2012/0215370 A1 | 8/2012 | Seo et al. | |
| 2012/0219428 A1 | 8/2012 | Cantolino et al. | |
| 2012/0221162 A1 | 8/2012 | Forbes, Jr. | |
| 2012/0221746 A1 | 8/2012 | Grinberg | |
| 2012/0222997 A1 | 9/2012 | Potucek et al. | |
| 2012/0226383 A1 | 9/2012 | Hollaway | |
| 2012/0239206 A1 | 9/2012 | Sauer et al. | |
| 2012/0295456 A1* | 11/2012 | Severac | H01R 9/2408 439/136 |
| 2012/0296447 A1* | 11/2012 | Diller | H05B 37/0245 700/9 |
| 2012/0316808 A1 | 12/2012 | Frader-Thompson et al. | |
| 2012/0323385 A1 | 12/2012 | Thiruvengada et al. | |
| 2013/0010018 A1 | 1/2013 | Economy | |
| 2013/0024306 A1 | 1/2013 | Shah et al. | |
| 2013/0026947 A1 | 1/2013 | Economy et al. | |
| 2013/0027176 A1 | 1/2013 | Stocker | |
| 2013/0030589 A1 | 1/2013 | Pessina et al. | |
| 2013/0030729 A1 | 1/2013 | Tu et al. | |
| 2013/0068631 A1 | 3/2013 | Brochu et al. | |
| 2013/0071029 A1 | 3/2013 | Terwilliger et al. | |
| 2013/0075311 A1 | 3/2013 | Steinbrueck et al. | |
| 2013/0085620 A1* | 4/2013 | Lu | H04L 12/2807 700/286 |
| 2013/0088152 A1 | 4/2013 | Hagen | |
| 2013/0096726 A1 | 4/2013 | Lyren et al. | |
| 2013/0098849 A1 | 4/2013 | Doyle et al. | |
| 2013/0124763 A1 | 5/2013 | Kessler | |
| 2013/0129536 A1 | 5/2013 | Robol et al. | |
| 2013/0166965 A1 | 6/2013 | Brochu et al. | |
| 2013/0197827 A1 | 8/2013 | Besore et al. | |
| 2013/0201316 A1 | 8/2013 | Binder et al. | |
| 2013/0251542 A1 | 9/2013 | Stiles, Jr. et al. | |
| 2013/0319535 A1 | 12/2013 | Boger et al. | |

(56) References Cited

U.S. PATENT DOCUMENTS

| | | |
|---|---|---|
| 2013/0320858 A1 | 12/2013 | Deery et al. |
| 2013/0331087 A1 | 12/2013 | Shoemaker et al. |
| 2014/0001977 A1 | 1/2014 | Zacharchuk et al. |
| 2014/0034562 A1* | 2/2014 | Wallace .................. C02F 1/008 210/138 |
| 2014/0058567 A1 | 2/2014 | Matsuoka et al. |
| 2014/0064139 A1 | 3/2014 | Mcqueen et al. |
| 2014/0091923 A1* | 4/2014 | Heninwolf .......... H04L 12/2823 340/539.11 |
| 2014/0107848 A1 | 4/2014 | Macey |
| 2014/0119077 A1 | 5/2014 | Walters et al. |
| 2014/0130878 A1 | 5/2014 | Marinez |
| 2014/0145644 A1 | 5/2014 | Netzel, Sr. et al. |
| 2014/0175875 A1 | 6/2014 | Newman, Jr. et al. |
| 2014/0177469 A1 | 6/2014 | Neyhart |
| 2014/0180487 A1 | 6/2014 | Bull |
| 2014/0210373 A1 | 7/2014 | Baret |
| 2014/0224350 A1 | 8/2014 | Patel |
| 2014/0225511 A1 | 8/2014 | Pickard et al. |
| 2014/0229023 A1 | 8/2014 | Bomholt et al. |
| 2014/0259612 A1 | 9/2014 | Bauckman et al. |
| 2014/0262998 A1 | 9/2014 | Wagner et al. |
| 2014/0264111 A1 | 9/2014 | Porter et al. |
| 2014/0265842 A1 | 9/2014 | Potucek et al. |
| 2014/0265875 A1 | 9/2014 | Nelson et al. |
| 2014/0266755 A1 | 9/2014 | Arensmeier et al. |
| 2014/0266788 A1 | 9/2014 | Bauckman et al. |
| 2014/0268678 A1 | 9/2014 | Potucek et al. |
| 2014/0277777 A1 | 9/2014 | Potucek |
| 2014/0292204 A1 | 10/2014 | Potucek et al. |
| 2014/0303757 A1 | 10/2014 | Pruchniewski et al. |
| 2014/0303781 A1 | 10/2014 | Potucek et al. |
| 2014/0303782 A1 | 10/2014 | Pruchniewski et al. |
| 2014/0314062 A1 | 10/2014 | Loebs |
| 2014/0322030 A1 | 10/2014 | Stiles, Jr. et al. |
| 2014/0336821 A1 | 11/2014 | Blaine et al. |
| 2014/0343734 A1 | 11/2014 | Meyer |
| 2014/0358458 A1 | 12/2014 | Shahi et al. |
| 2014/0379146 A1 | 12/2014 | Macey |
| 2015/0030463 A1 | 1/2015 | Stiles, Jr. et al. |
| 2015/0040307 A1 | 2/2015 | Deloche et al. |
| 2015/0042276 A1 | 2/2015 | Biedrzycki |
| 2015/0049750 A1 | 2/2015 | Uy et al. |
| 2015/0112492 A1 | 4/2015 | Panther et al. |
| 2015/0156031 A1 | 6/2015 | Fadell et al. |
| 2015/0161870 A1 | 6/2015 | Podlisker |
| 2015/0204334 A1 | 7/2015 | Stiles, Jr. et al. |
| 2015/0211531 A1 | 7/2015 | Stiles, Jr. et al. |
| 2015/0238384 A1 | 8/2015 | Macey |
| 2015/0243154 A1 | 8/2015 | Uy |
| 2015/0335525 A1 | 11/2015 | Breau et al. |
| 2015/0362925 A1 | 12/2015 | Uy et al. |
| 2015/0381795 A1 | 12/2015 | Brochu et al. |
| 2016/0002942 A1 | 1/2016 | Orlando |
| 2016/0069048 A1 | 3/2016 | Colbert et al. |
| 2016/0077530 A1 | 3/2016 | Moran et al. |
| 2016/0143115 A1 | 5/2016 | Zhang |
| 2016/0153456 A1 | 6/2016 | Stiles, Jr. et al. |
| 2016/0227981 A1 | 8/2016 | Francisco |
| 2016/0238668 A1 | 8/2016 | Cordray et al. |
| 2016/0244988 A1 | 8/2016 | Barcelos et al. |
| 2016/0249287 A1 | 8/2016 | Xie et al. |
| 2016/0269194 A1 | 9/2016 | Clark |
| 2016/0275633 A1 | 9/2016 | Gitt et al. |
| 2016/0281719 A1 | 9/2016 | Wung et al. |
| 2016/0284206 A1 | 9/2016 | Boettcher et al. |
| 2016/0286633 A1 | 9/2016 | Juslen |
| 2016/0319559 A1 | 11/2016 | Durvasula et al. |
| 2016/0335272 A1 | 11/2016 | Drogobetski et al. |
| 2016/0340205 A1 | 11/2016 | Murdock |
| 2017/0017315 A1 | 1/2017 | LaFlamme et al. |
| 2017/0027410 A1 | 2/2017 | Stoyanov et al. |
| 2017/0038123 A1 | 2/2017 | Strickland et al. |
| 2017/0053360 A1 | 2/2017 | Loeb et al. |
| 2017/0074589 A1 | 3/2017 | Somary et al. |
| 2017/0092096 A1 | 3/2017 | Fernandes et al. |
| 2017/0134171 A1 | 5/2017 | Woxland et al. |
| 2017/0138612 A1 | 5/2017 | Kaiser |
| 2017/0142249 A1 | 5/2017 | Shinar |
| 2017/0146964 A1 | 5/2017 | Beals |
| 2017/0160710 A1 | 6/2017 | Kang et al. |
| 2017/0160732 A1 | 6/2017 | Kang et al. |
| 2017/0161463 A1 | 6/2017 | Kang et al. |
| 2017/0164452 A1 | 6/2017 | Lyons, Sr. et al. |
| 2017/0170979 A1 | 6/2017 | Khalid et al. |
| 2017/0175746 A1 | 6/2017 | Mayleben |
| 2017/0206615 A1 | 7/2017 | Sloop et al. |
| 2017/0209338 A1 | 7/2017 | Potucek et al. |
| 2017/0209339 A1 | 7/2017 | Potucek et al. |
| 2017/0209340 A1 | 7/2017 | Potucek et al. |
| 2017/0209341 A1 | 7/2017 | Potucek et al. |
| 2017/0211285 A1 | 7/2017 | Potucek et al. |
| 2017/0212484 A1 | 7/2017 | Potucek et al. |
| 2017/0212489 A1 | 7/2017 | Potucek et al. |
| 2017/0212530 A1 | 7/2017 | Potucek et al. |
| 2017/0212532 A1 | 7/2017 | Potucek et al. |
| 2017/0212536 A1 | 7/2017 | Potucek et al. |
| 2017/0213451 A1 | 7/2017 | Potucek et al. |
| 2017/0215261 A1 | 7/2017 | Potucek et al. |
| 2017/0249285 A1 | 8/2017 | Stewart et al. |
| 2017/0346688 A1 | 11/2017 | Reddy et al. |
| 2017/0363312 A1 | 12/2017 | Crimins et al. |
| 2018/0012478 A1 | 1/2018 | Uy |
| 2018/0089763 A1 | 3/2018 | Okazaki |
| 2018/0148912 A1 | 5/2018 | Park |
| 2018/0174207 A1 | 6/2018 | Potucek et al. |
| 2018/0224822 A1 | 8/2018 | Potucek et al. |
| 2018/0240322 A1 | 8/2018 | Potucek et al. |
| 2018/0254949 A1 | 9/2018 | Reddy et al. |
| 2018/0254950 A1 | 9/2018 | Reddy et al. |
| 2018/0373304 A1 | 12/2018 | Davis et al. |
| 2019/0032353 A1 | 1/2019 | Gimenez et al. |
| 2019/0087548 A1 | 3/2019 | Bennett et al. |
| 2019/0158306 A1 | 5/2019 | Khalid et al. |
| 2019/0180595 A1 | 6/2019 | Uy |
| 2019/0206048 A1 | 7/2019 | Crabtree |
| 2019/0212022 A1 | 7/2019 | Aeberhard et al. |
| 2019/0314243 A1 | 10/2019 | MacCallum et al. |
| 2020/0096238 A1 | 3/2020 | Hikone et al. |
| 2020/0137534 A1 | 4/2020 | McQueen et al. |
| 2020/0150633 A1 | 5/2020 | Goldman et al. |
| 2020/0198068 A1 | 6/2020 | Bauckman et al. |
| 2020/0202698 A1 | 6/2020 | Uy |
| 2020/0207237 A1 | 7/2020 | Zuo et al. |
| 2020/0271312 A1 | 8/2020 | Litka et al. |
| 2021/0010989 A1 | 1/2021 | Yizhack et al. |
| 2021/0110694 A1 | 4/2021 | Uy |
| 2021/0367806 A1 | 11/2021 | Khalid et al. |

FOREIGN PATENT DOCUMENTS

| | | |
|---|---|---|
| AU | 2008319307 B2 | 7/2013 |
| AU | 2010274095 B2 | 9/2013 |
| AU | 2013200894 A1 | 9/2013 |
| AU | 2010302872 B2 | 10/2014 |
| AU | 2014200963 A1 | 12/2014 |
| AU | 2014203608 A1 | 3/2015 |
| AU | 2015100298 A4 | 4/2015 |
| AU | 2013270529 B2 | 5/2015 |
| AU | 2010235166 B2 | 8/2015 |
| AU | 2014228186 A1 | 10/2015 |
| AU | 2012244365 B2 | 11/2015 |
| AU | 2014248819 A1 | 11/2015 |
| AU | 2010101532 A4 | 1/2016 |
| AU | 2011296098 B2 | 7/2016 |
| AU | 2014380388 A1 | 8/2016 |
| AU | 2012328263 B2 | 11/2016 |
| AU | 2016202400 A1 | 11/2016 |
| AU | 2013206751 B2 | 12/2016 |
| AU | 2015275057 A1 | 2/2017 |
| AU | 2014251158 B2 | 6/2017 |
| AU | 2016269466 A1 | 6/2017 |
| AU | 2017203145 A1 | 6/2017 |
| CA | 2 486 045 A1 | 4/2005 |

(56) References Cited

FOREIGN PATENT DOCUMENTS

| | | |
|---|---|---|
| CA | 2670557 C | 10/2016 |
| CN | 2634785 Y | 8/2004 |
| CN | 1829404 A | 9/2006 |
| CN | 202954952 U | 5/2013 |
| CN | 103292421 A | 9/2013 |
| CN | 108870529 A | 11/2018 |
| EP | 0847008 A2 | 6/1998 |
| EP | 0863278 A2 | 9/1998 |
| EP | 1016062 A1 | 7/2000 |
| GB | 2 239 306 A | 6/1991 |
| JP | H0886433 A | 4/1996 |
| KR | 20070062669 A | 6/2007 |
| WO | 92/13195 A1 | 8/1992 |
| WO | 97/11448 A1 | 3/1997 |
| WO | 98/36339 A1 | 8/1998 |
| WO | 98/59174 A1 | 12/1998 |
| WO | 99/31560 A2 | 6/1999 |
| WO | 00/01067 A2 | 1/2000 |
| WO | 01/05195 A1 | 1/2001 |
| WO | 01/24584 A1 | 4/2001 |
| WO | 01/36864 A2 | 5/2001 |
| WO | 01/82657 A1 | 11/2001 |
| WO | 01/99475 A1 | 12/2001 |
| WO | 02/10847 A2 | 2/2002 |
| WO | 02/11497 A1 | 2/2002 |
| WO | 02/12127 A2 | 2/2002 |
| WO | 02/13490 A2 | 2/2002 |
| WO | 02/18913 A2 | 3/2002 |
| WO | 02/25842 A2 | 3/2002 |
| WO | 02/040921 A2 | 5/2002 |
| WO | 02/045467 A2 | 6/2002 |
| WO | 02/061330 A2 | 8/2002 |
| WO | 02/069306 A2 | 9/2002 |
| WO | 02/091805 A2 | 11/2002 |
| WO | 02/098182 A2 | 12/2002 |
| WO | 02/098183 A1 | 12/2002 |
| WO | 02/099780 A2 | 12/2002 |
| WO | 02/101702 A2 | 12/2002 |
| WO | 03/024269 A1 | 3/2003 |
| WO | 03/026358 A1 | 3/2003 |
| WO | 03/055273 A2 | 7/2003 |
| WO | 03/067934 A2 | 8/2003 |
| WO | 03/096761 A1 | 11/2003 |
| WO | 03/099705 A2 | 12/2003 |
| WO | 2004/021747 A2 | 3/2004 |
| WO | 2004/023034 A1 | 3/2004 |
| WO | 2004/023850 A2 | 3/2004 |
| WO | 2004/032572 A2 | 4/2004 |
| WO | 2004/094896 A2 | 11/2004 |
| WO | 2004/100624 A2 | 11/2004 |
| WO | 2005/012997 A2 | 2/2005 |
| WO | 2005/024898 A2 | 3/2005 |
| WO | 2005/060309 A2 | 6/2005 |
| WO | 2005/084339 A2 | 9/2005 |
| WO | 2005/089293 A2 | 9/2005 |
| WO | 2005/089309 A2 | 9/2005 |
| WO | 2006/023149 A2 | 3/2006 |
| WO | 2006/031753 A2 | 3/2006 |
| WO | 2006/031810 A2 | 3/2006 |
| WO | 2006/093889 A2 | 9/2006 |
| WO | 2007/092619 A2 | 8/2007 |
| WO | 2007/095087 A2 | 8/2007 |
| WO | 2008/067402 A2 | 6/2008 |
| WO | 2010/030332 A1 | 3/2010 |
| WO | 2011/106557 A1 | 9/2011 |
| WO | 2011/143736 A1 | 11/2011 |
| WO | 2014/143779 A2 | 9/2014 |
| WO | 2014/144445 A1 | 9/2014 |
| WO | 2014/150919 A1 | 9/2014 |
| WO | 2014/151520 A1 | 9/2014 |
| WO | 2014/164721 A1 | 10/2014 |
| WO | 2015/048412 A1 | 4/2015 |
| WO | 2015/116035 A1 | 8/2015 |
| WO | 2016/074749 A1 | 5/2016 |
| WO | 2016/102021 A1 | 6/2016 |
| WO | 2016/102022 A1 | 6/2016 |
| WO | 2016/107658 A1 | 7/2016 |
| WO | 2017/127802 A1 | 7/2017 |

OTHER PUBLICATIONS

Hayward Underwater ColorLogic LED Lighting Fixtures for Swimming Pools and Spas (Generation 2.5), SP0524(S) /SP0525(S) / SP0532(S) / SP0533(S) Owner's Guide (2004) (12 pages).

Hayward Underwater ColorLogic LED Lighting Fixtures for Swimming Pools and Spas, SP0522(S) / SP0523(S) /SP0530(S) / SP0531(S) Owner's Guide (2004) (12 pages).

U.S. Appl. No. 60/515,090 entitled "Color Changing Image with Backlighting and Combination Localized Gray-Scale and Color Image" filed Oct. 28, 2003, Inventors: Kevin Potucek and Kevin Murphy (coversheet and 12 pages).

U.S. Appl. No. 60/071,281 entitled "Digitally Controlled Light Emitting Diode Systems and Methods" filed Dec. 17, 1997, Inventors: George G. Mueller and Ihor A. Lys (coversheet and 23 pages).

U.S. Appl. No. 60/243,250 entitled "Illumination of Liquids" filed Oct. 25, 2000, Inventors: Frederick Morgan, Timothy Holmes, Chris Cantone, Ihor Lys and George Mueller (coversheet and 23 pages).

U.S. Appl. No. 60/297,828 entitled "Systems and Methods for Controlling Lighting Systems" filed Jun. 13, 2001, Iventors: George Mueller, Frederick Morgan, Ihor Lys and Kevin Dowling (coversheet and 12 pages).

U.S. Appl. No. 60/296,377 entitled "Systems and Methods for Controlling Lighting Systems" filed Jun. 6, 2001, Inventors: Mike Blackwell (coversheet and 10 pages).

U.S. Appl. No. 60/290,101 entitled "Systems and Methods for Synchronizing Illumination Systems" filed May 10, 2001, Inventors: Kevin Dowling and Eric K Schanberger (coversheet and 26 pages).

U.S. Appl. No. 60/090,920 entitled "Method for Software Driven Generation of Multiple Simultaneous High Speed Pulse Width Modulated Signals" filed Jun. 26, 1998, Inventors: Ihor Lys (coversheet and 7 pages).

U.S. Appl. No. 60/078,861 entitled "Digital Lighting Systems" filed Mar. 20, 1998, Inventors: Ihor Lys (coversheet and 1 page).

U.S. Appl. No. 60/079,285 entitled "Systems and Methods for Controlled Illumination" filed Mar. 25, 1998, Inventors George G. Mueller and Ihor Lys (coversheet and 33 pages).

U.S. Appl. No. 60/068,792 entitled "Multi-Color Intelligent Lighting" filed Dec. 24, 1997, Inventors: George G. Mueller and Ihor Lys (coversheet and 1 page).

U.S. Appl. No. 60/199,333 entitled "Autonomous Color Changing Accessory" filed Apr. 24, 2000, Inventors: Al Ducharme, Ihor Lys and Kevin Dowling (coversheet and 18 pages).

International Search Report of the International Searching Authority dated Jun. 12, 2008, issued in connection with International Patent Appl. No PCT/US07/85793 (3 pages).

Written Opinion of the International Searching Authority dated Jun. 12, 2008, issued in connection with International Patent Appl. No. PCT/US07/85793 (5 pages).

Hayward Underwater ColorLogic LED Lighting Fixtures for Swimming Pools and Spas, SP0524(S) / SP0525(S) /SP0527(S) / SP0532(S) / SP0533(S) / SP0535(S) Owner's Guide (2004) (12 pages).

Cool Polymers CoolPoly D5108 Thermally Conductive Polyphenylene Sulfide (PPS), Product Data Sheet dated Aug. 8, 2007 (2 pages).

American/Pentair Niche w/3/4 in. Side Hub, Concrete (78210400), printed from Internet website http://www.poolplaza.com/P-PEN-78210400-2282.html (Oct. 19, 2010) (1 page).

American/Pentair Niche w/1.0 in. Hub, Vinyl/Fbgls (10 Hole) (78232500), printed from Internet website http://www.poolplaza.com/P-PEN-78210400-2282.html (Oct. 19, 2010) (1 page).

Sta-Rite Large Underwater Light Niche Owner's Manual (2004) (8 pages).

Product Specifications for Jandy ProNiche Pool and Spa Light Niches, printed from Internet website http://www.jandy.com/html/products/lights/proniche/specs.php (Oct. 19, 2010) (2 pages).

Jandy ProNiche Pool & Spa Light Niches, product description (2007) (2 pages).

(56) References Cited

OTHER PUBLICATIONS

Jandy Installation Manual "Jandy Housing for Wet Niche Fixtures" (2007) (8 pages).
Pentair 620004 AmerLite Quick Niche, printed from Internet website http://www.aqua-man.com/row.sub.-num.asp?lc=1892 (Oct. 19, 2010) (2 pages).
Pentair 79206700 AmerLite Large Plastic Niche, printed from Internet website http://www.aqua-man.com/row.sub.-num.asp?lc=1895 (Oct. 19, 2010) (2 pages).
Pentair QuickNiche Vinyl Pool Lighting Niche, product description (2006) (2 pages).
Bergquist Bond-Ply 100/400/660B Thermally Conductive Pressure Sensitive Adhesive Tape, datasheets retrieved from http://www.bergquistcompany.com, publicly available prior to Dec. 24, 2008 (3 pages).
Aqua Logic Automation and Chlorination Operation Manual for Models AQL-PS-4, AQL-PS-8, AQL-PS-16, Goldline Controls, Inc. (2004) (40 pages).
Supplementary European Search Report dated Jan. 27, 2014, issued in connection with European U.S. Appl. No. 07871628 (7 pages).
Sanderfoot, Alan E., "Too Late, But Not Too Little", Aqua—The Business Magazine for Spa & Pool Professionals, Jul. 1996, vol. 21, No. 7, p. 8. (1 page).
Pollock, Elissa Sard, "Unrecognized Peril? The Industry Responds to Spa and Pool Drain-Related Drownings", Aqua—The Business Magazine for Spa & Pool Professionals, Jul. 1996, pp. 63-64 (2 pages).
"Important Points to Know About CalSpas", brochure, date unkown (10 pages).
Teel Vacuum Switch Operating Instructions and Parts Manual, 1995, W.W. Granger, Inc. (4 pages).
Teel "Rotary Gear Pumps and Vacuum-On Switch" brochure, date unknown (1 page).
Levin, Alan P, P.E., "Design and Development of a Safety Vacuum Release System", Proceedings of the 2007 ASME International Mechanical Engineering Congress and Exposition, Nov. 11-15, 2007, Seattle, Washington (8 pages).
A.O. Smith eMod Motors brochure (2 pages) and eMod Load Sensing Module Specification and Instruction Guide (13 pages), both dated 2006.
Pentair IntelliFlo 4×160 High Performance Pump brochure (4 pages) and "IntelliFlo vs. IntelliFlo 4×160 Pump Comparison" printed from Internet website http://www.pentairpool.com/intelliflo_comparison.htm on Jun. 7, 2006 (1 page).
Yu, et al., "AC Induction Motor Control Using Constant V/Hz Principle and Space Vector PWM Technique with TMS320C240," Texas Instruments (Apr. 1998) (131 pages).
Control Techniques, Commander SE Advanced User Guide, "Variable speed drive for 3 phase induction motors from 0.25kW to 37kW", Nov. 2002 (194 pages).
Danfoss VLT 6000 Series Adjustable Frequency Drive Installation, Operation, and Maintenance Manual, Rev. G (Mar. 2000) (118 pages).
Baldor Motors and Drives, Series 10 Inverter Control Installation and Operating Instructions (Feb. 2000) (74 pages).
Control Techniques, Dinverter 2B User Guide, "Variable Speed Drive for three-phase induction motors 0.75kW to 4.0 kW, 1.0 HP to 5.3 HP", Nov. 1998 (94 pages).
Pentair IntelliComm Communication Center Installation Guide, Rev. B, Sep. 2008 (16 pages).
Fluidra Connect—Internet of Pools, archived website on Aug. 6, 2015, https://web.archive.org/web/20150806194325/http://www.fluidraconnect.com:80/ (English translation) (8 pages).
Brochure by Fluidra entitled "Fluidra Connect Internet of Pools" and distributed at tradeshow in Barcelona, Spain, Oct. 2015 (4 pages).
Examination Report No. 1, dated Dec. 19, 2018, issued in connection with Australian Patent Application No. 2014228186 (4 pages).
Patent Board Decision dated Jan. 29, 2019, issued in connection with U.S. Appl. No. 14/211,461 (15 pages).
Aqua Rite Electronic Chlorine Generator Manual, Goldline Controls, Inc., undated, known about at least as early as Mar. 15, 2012 (20 pages).
Aqua Rite Electronic Chlorine Generator Manual, Goldline Controls, Inc. (2005) (20 pages).
Aqua Logic Automation and Chlorination Installation Manual for Model AQL-P-4, Goldline Controls, Inc. (2004) (33 pages).
Aqua Logic Automation and Chlorination Installation Manual for Models AQ-LOGIC-p. 4, AQ-LOGIC-PS-4, Goldline Controls, Inc., known about at least as early as Mar. 15, 2012 (30 pages).
Aqua Logic Automation and Chlorination Operation Manual for Models AQ-LOGIC-PS-4, AQ-LOGIC-p. 4, Goldline Controls, Inc., known about at least as early as Mar. 15, 2012 (28 pages).
Aqua Logic Automation and Chlorination Installation Manual for Models AQ-LOGIC-PS-4, AQ-LOGIC-PS-8, Goldline Controls, Inc., known about at least as early as Mar. 15, 2012 (32 pages).
Aqua Logic Automation and Chlorination Operation Manual for Models AQ-LOGIC-PS-4, AQ-LOGIC-PS-8, Goldline Controls, Inc., known about at least as early as Mar. 15, 2012 (36 pages).
Pro Logic Automation and Chlorination Installation Manual for Model PL-P-4, Goldline Controls, Inc. (2008) (36 pages).
Pro Logic Automation and Chlorination Operation Manual for Model PL-P-4, Goldline Controls, Inc. (2008) (40 pages).
Pro Logic Automation and Chlorination Installation Manual for Models PL-PS-4, PL-PS-8, PL-PS-16, PL-PS-8-V, PL-PS-16-V, Goldline Controls, Inc. (2008) (48 pages).
Pro Logic Automation and Chlorination Operation Manual for Models PL-PS-4, PL-PS-8, PL-PS-16, PL-PS-8-V, PL-PS-16-V, Goldline Controls, Inc. (2007) (52 pages).
Owner's Guide, Hayward Pro-Series High-Rate Sand Filter (Oct. 2002) (4 pages).
Compool (Pentair) Cp3800 Pool-Spa Control System Installation and Operating Instructions (Nov. 7, 1997) (43 pages).
Pentair IntelliTouch Owner's Manual-Set-Up and Programming (May 22, 2003) (60 pages).
Pentair RS-485 Pool Controller Adapter Published Advertisement from Pool and Spa News (Mar. 22, 2002) (2 pages).
"New AC Drive Series Targets Water, Wastewater Applications," Product Focus, WaterWorld Magazine, vol. 8, No. 7 (Jul. 2002) (5 pages).
Danfoss VLT 8000 AQUA Instruction Manual (Apr. 16, 2004) (210 pages).
Robert S. Carrow, Electrician's Technical Reference-Variable Frequency Drives (published by Delmar) (2001) (187 pages).
Invitation to Pay Additional Fees and, Where Applicable, Protest Fee, dated Jul. 7, 2014, issued in connection with International Application No. PCT/US2014/027886 (2 pages).
International Search Report and Written Opinion of the International Searching Authority, dated Sep. 12, 2014, Issued in connection with International Application No. PCT/US2014/027886 (16 pages).
Office Action dated Sep. 17, 2014, issued in connection with U.S. Appl. No. 14/211,461 (22 pages).
Notice of Allowance dated Sep. 24, 2014, issued in connection with U.S. Appl. No. 14/211,991 (10 pages).
Office Action dated Oct. 28, 2014, issued in connection with U.S. Appl. No. 14/211,797 (9 pages).
Notice of Allowance dated Jan. 16, 2015, issued in connection with U.S. Appl. No. 14/211,991 (8 pages).
Notice of Allowance dated Feb. 9, 2015, issued in connection with U.S. Appl. No. 14/211,797 (8 pages).
Office Action dated Feb. 24, 2015, issued in connection with U.S. Appl. No. 14/211,461 (22 pages).
Office Action dated Aug. 5, 2015, issued in connection with U.S. Appl. No. 14/211,461 (26 pages).
Office Action dated Jun. 30, 2016, issued in connection with U.S. Appl. No. 14/211,461 (33 pages).
Extended European Search Report dated Oct. 6, 2016, issued by the European Patent Office in connection with European Application No. 14764537.8 (7 pages).
Examiner's Answer dated Sep. 22, 2017, issued in connection with U.S. Appl. No. 14/211,461 (21 pages).

(56) References Cited

OTHER PUBLICATIONS

Pentair EasyTouch and IntelliTouch Pool and Spa Control System Load Center Installation Guide (2011) (60 pages).
Pentair IntelliTouch Pool and Spa Control System User's Guide and Instructions (2011) (126 pages).
Pentair IntelliChem Water Chemistry Controller Installation and User's Guide (2014) (64 pages).
Pentair IntelliFlo Variable Speed Programmable Pump Installation and User's Guide, Rev. C, Apr. 2012 (44 pages).
Communication under Rule 71(3) EPC (Intention to Grant) dated Apr. 10, 2019, issued in connection with European Patent Application No. 14764537.8 (5 pages).
Notice of Allowance dated Aug. 12, 2019, issued in connection with U.S. Appl. No. 14/211,461 8 pages).
Notice of Allowance dated Oct. 29, 2019, issued in connection with U.S. Appl. No. 14/211,461 (9 pages).
Office Action dated Feb. 13, 2019, issued in connection with U.S. Appl. No. 16/208,458 (18 pages).
Office Action dated Nov. 26, 2019, issued in connection with U.S. Appl. No. 16/208,458 (18 pages).
Extended European Search Report dated Jan. 17, 2020, issued in connection with European Patent Appln. No. 19200908.2 (8 pages).
Notice of Allowance dated Feb. 5, 2020, issued in connection with U.S. Appl. No. 14/211,461 (9 pages).
Examination Report dated Feb. 7, 2020, issued in connection with Canadian Patent Application No. 2,906,938 (3 pages).
Office Action dated May 5, 2020, issued in connection with U.S. Appl. No. 16/208,458 (20 pages).
Examination Report dated Oct. 3, 2020, issued in connection with Australian Patent Application No. 2020200758 (3 pages).
Jandy, "AquaLink RS All Button and OneTouch Control Systems Installation Manual," 2007, Jandy Pool Products, Version 6594N (48 pages).
Zodiac, "iAquaLink 2.0 Web Connect Device Installation Manual," 2013, Zodiac Pool Systems, Version H0435500 Rev B (16 pages).
Office Action dated Nov. 17, 2020, issued in connection with U.S. Appl. No. 16/208,458 (21 pages).
Notice of Allowance dated Dec. 16, 2020, issued in connection with U.S. Appl. No. 14/211,461 (9 pages).
Communication (Intention to Grant) dated Mar. 19, 2021, issued in connection with European Patent Appln. No. 19200908.2 (5 pages).
Office Action dated Jun. 21, 2021, issued in connection with U.S. Appl. No. 16/208,458 (15 pages).
Examination Report dated Jul. 29, 2021, issued in connection with Canadian Patent Application No. 2,906,938 (3 pages).
Examination Report dated Dec. 10, 2021, issued in connection with Canadian Patent Application No. 2,906,938 (3 pages).
Extended European Search Report dated Jan. 4, 2022, issued in connection with European Patent Appln. No. 21200805.6 (9 pages).
Office Action dated Mar. 16, 2022, issued in connection with U.S. Appl. No. 16/208,458 (19 pages).
Office Action dated Nov. 28, 2022, issued in connection with U.S. Appl. No. 16/208,458 (17 pages).
Examination Report dated Mar. 3, 2023, issued in connection with Australian Patent Appln. No. 2022200316 (3 pages).

\* cited by examiner

MODULAR POOL/SPA CONTROL SYSTEM

CROSS-REFERENCE TO RELATED APPLICATIONS

This application is a continuation of U.S. patent application Ser. No. 14/211,461, filed on Mar. 14, 2014, which claims priority to U.S. Provisional Patent Application No. 61/790,496, filed on Mar. 15, 2013, and to U.S. Provisional Patent Application No. 61/787,809, filed on Mar. 15, 2013, the entire disclosures of which are expressly incorporated herein by reference.

BACKGROUND OF THE INVENTION

Field of the Invention

The present disclosure relates to pool/spa system controllers, and specifically, to a modular pool/spa control system that includes modular relay packs, and is easily expandable to accommodate various types and/or combinations of equipment at pool/spa locations.

Related Art

For a pool or a spa to operate on a daily basis, several devices are required. This often includes pumps, heaters, filters, cleaners, lights, etc. To provide automation for these components, it is known in the art to control such devices by a microprocessor-based controller that provides switching instructions to various relays connected to such device. However, such controllers are often only compatible with specific types of devices. As such, a pool or a spa owner can own a particular controller and then purchase a subsequent heater, only to find out that the heater is not compatible with the controller. In such a circumstances, the pool or spa owner can be forced to purchase a special convertor to make the device compatible with the controller, or to purchase a new compatible device, both options being expensive.

Additionally, controllers generally are restricted to the number of devices that can be connected thereto. For example, a controller can only have a pre-defined number of relays/ports that accept devices to be controlled, and/or can be limited by the total number of devices connected to the controller. As such, if a user wishes to expand the operation of his/her pool or spa, e.g., by adding additional lights, pumps, heaters, solar arrays, etc., the user will be restricted by the capabilities of the controller. When a pool or a spa owner has reached the maximum device capacity of the controller, the owner can be forced to purchase an additional controller, in addition to the existing controller. As such, the user could be forced to use two separate controllers that are not in communication and need to be programmed separately. Such an arrangement is not only expensive, but also time-consuming, considering that the operations of both controllers will have to be matched. Additionally, two separate controllers that do not communicate with each other will result in a less energy-efficient system.

SUMMARY OF THE INVENTION

The present disclosure relates to a pool or spa control system including modular relay packs. In one embodiment, the control system includes a main control panel including a motherboard and a local terminal. The motherboard includes a main panel processor, a power supply, one or more internal communications busses (e.g., a high-speed RS-485, a low-speed RS-485 bus, or other suitable communications busses), external communications bus connectors (e.g., an external high-speed RS-485 bus connector and an external low-speed RS-485 bus connector, or suitable connectors for a respective communication bus that is implemented) that allow for smart components to be connected thereto, at least one relay bank socket, and an optional expansion slot. The local terminal is connectable to the motherboard and includes a master system processor and a screen. The local terminal allows the control system to be programmed. A programmable modular relay pack can be inserted into the relay bank socket of the main panel and connected to the main panel processor. The system automatically identifies the relay pack and permits a user to assign one or more functions and/or devices to be controlled by the relay pack, using the local terminal. The programmable modular relay pack includes a relay bank processor and a plurality of high voltage relays for connection with various pool or spa devices. When the programmable modular programmable relay pack is inserted into the at least one relay bank socket, it engages in a handshake with the main panel processor such that the processor recognizes the modular programmable relay pack and can control operation thereof. The main panel can also include a plurality of RS-485 connectors, actuators, relays, and sensor connectors. The main panel could include a chlorinator control subsystem that allows a chlorinator to be connected to the main panel and controlled by the main panel processor and/or the master system processor.

The controller can include an expansion panel connectable to one of the external communications bus connectors of the main panel. The expansion panel can include an expansion panel mother board including an expansion panel processor, a power supply connector, one or more internal communications busses (e.g., a high-speed RS-485 and a low-speed RS-485 bus), at least one relay bank socket, and an optional expansion slot. When the expansion panel is connected to the main panel, it engages in a handshake with the main panel processor such that the processor recognizes the expansion panel and the expansion panel becomes "slaved" to the main panel processor. A modular relay pack can be inserted into the at least one relay bank socket of the expansion panel. When the programmable modular programmable relay pack is inserted into the relay bank socket it engages in a handshake with the main panel processor such that the processor can control operation thereof. As with smart components connected directly to the main panel, expansion panel smart components, such as the relay bank, are automatically discovered and identified to the user, via the user local terminal of the main panel. The user can assign one or more functions and/or devices to be controlled by the relay pack.

The controller of the present disclosure could also include a handheld remote control unit in communication with the main panel. The handheld remote control unit can be a wired unit that is connected to the main panel or the expansion panel, or a wireless unit that wirelessly communicates with a wireless communication subsystem of the main panel. Operation and programming of the entire system can be controlled by the handheld remote control unit. Where the handheld remote control unit is wireless, the main control panel can include a radio module for communication with the wireless handheld remote control unit. The radio module may be a radio module or a WiFi (IEEE 802.11) radio module. The handheld remote control unit can be mounted on a wall or built into a spa.

The control system could also include an I/O expansion module that is connectable to an RS-485 connector of the main panel and in communication with the internal RS-485 bus of the main panel. The I/O expansion module includes a smart component processor, a plurality of actuators, a plurality of relays, and a plurality of sensors. The I/O expansion module expands the actuator, relay, and sensor capabilities of the controller.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present disclosure relates to a modular pool/spa control system, as discussed in detail below in connection with FIGS. 1-20B.

Figure 1:
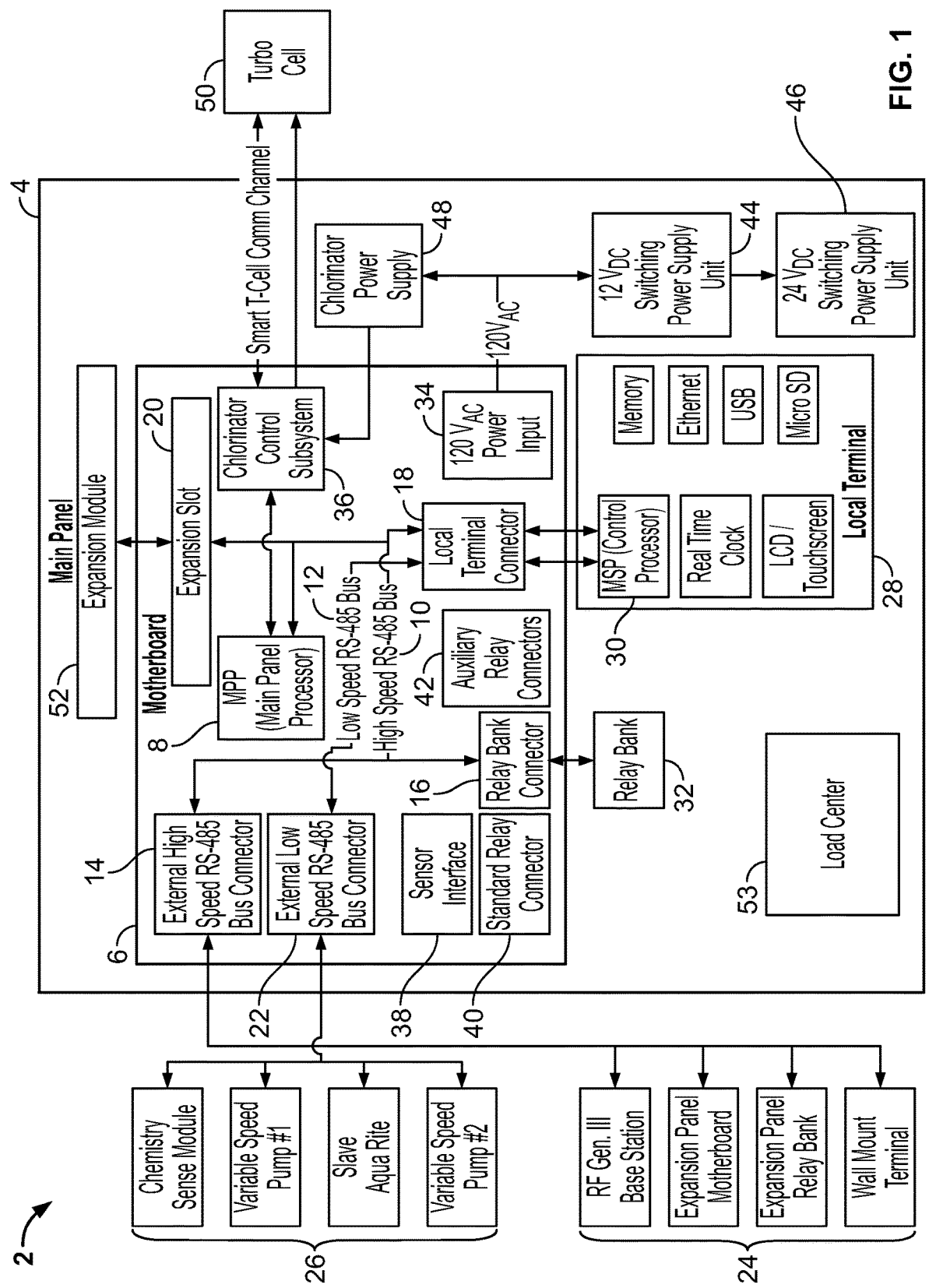
FIG. 1 is a schematic block diagram of the modular pool/spa control system of the present disclosure.
Figure 2:
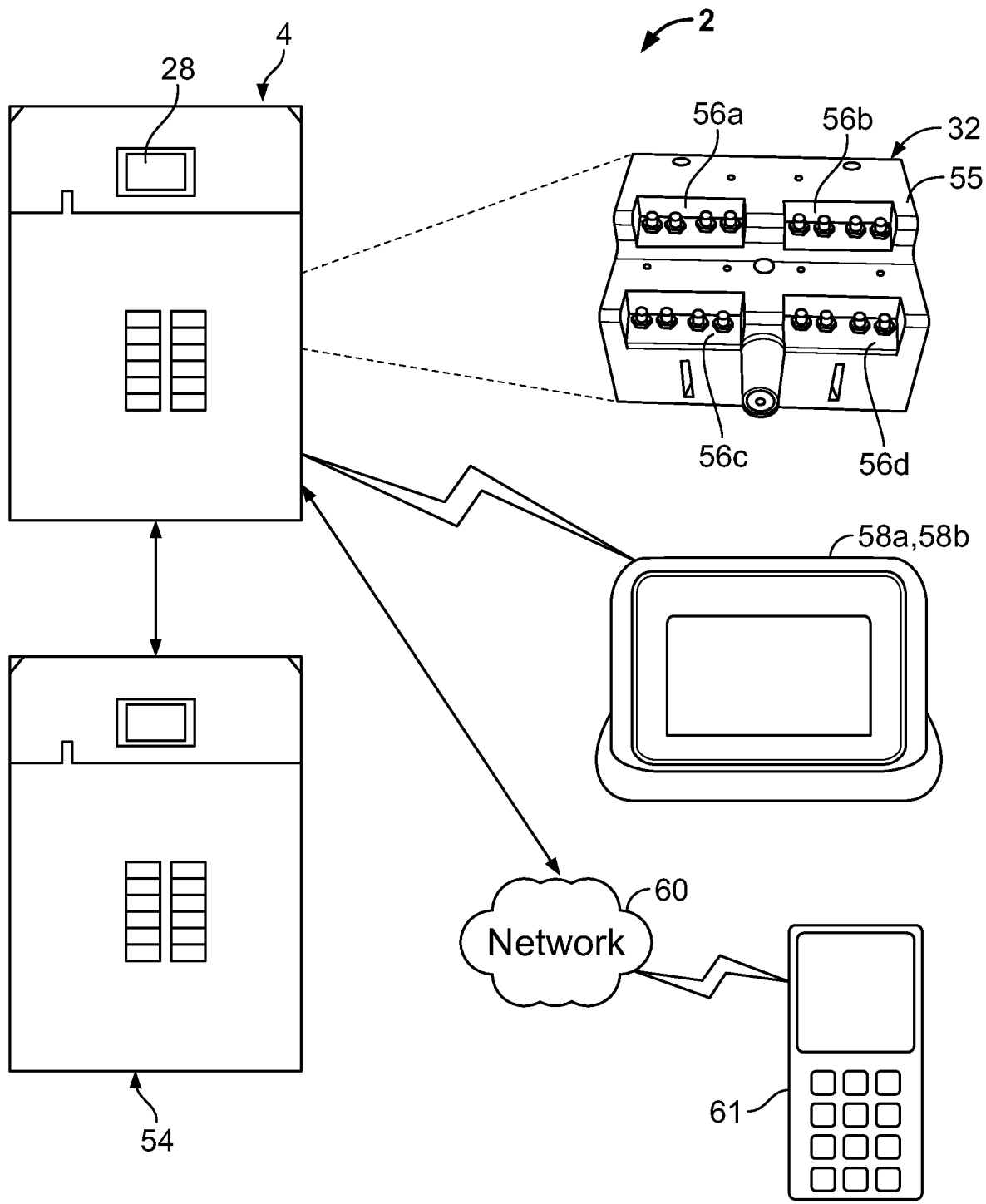
FIG. 2 is a diagram of the modular pool/spa control system of the present disclosure, showing a main control panel, a modular relay pack, an optional expansion panel, and an optional remote control unit in communication with the main control unit.

FIGS. 1-2 illustrate the control system 2 of the present disclosure. As shown in FIG. 1, the control system 2 includes a main control panel 4 for housing various electrical components of the control system 2. The control panel 4 includes a motherboard 6 having a main panel (central) processor 8. The central processor 8 is connected with an internal high speed RS-485 bus 10 and an internal low speed RS-485 bus 12 of the motherboard 6. The high speed RS-485 bus 10 places the central processor 8 in two-way communication with an external high speed RS-485 bus connector 14, a relay bank connector 16, and a local terminal connector 18. The low speed RS-485 bus 12 places the central processor 8 in two-way communication with an external low speed RS-485 bus connector 22, and the local terminal connector 18. Various smart devices 24 could be connected to the external high speed RS-485 bus connector 14, for example, a radio frequency base station, an expansion panel motherboard, an expansion panel relay bank, a wall mount control terminal, etc. Further, various smart devices 26 could be connected to the external low speed RS-485 bus connector 22, for example, a chemistry sense module, a first variable speed pump, a slaved salt chlorinator such as Aqua Rite manufactured by Hayward Industries, Inc., a second variable speed pump, etc. The high speed and low speed RS-485 bus connectors 14, 22 allow smart devices 24, 26 connected thereto to be in two-way communication with the central processor 8. One of ordinary skill in the art shall understand that while reference is made to an RS-485 bus, internal communications could be achieved through the implementation of any known and suitable communications bus, e.g., serial, parallel, etc. To this end, where a different communications bus is provided instead of the RS-485 bus, the high speed and low speed RS-485 bus connectors 14, 22 would be provided as suitable connectors for the respective communication bus that is implemented in the control system 2. This holds true for any of the subsequent devices that illustrate the utilization of an RS-485 bus for communications.

The main panel 4 further includes a local terminal 28 that is engageable with the local terminal connector 18 for allowing a user to interact with and control the control system 2. The local terminal 28 includes a master system processor 30 that is in two-way communication with the central processor 8 by way of the local terminal connector 18. The local terminal 28 can include a real time clock, a liquid crystal display (LCD) touchscreen, one or more memory units, one or more Ethernet ports, one or more USB ports, and one or more micro-SDHC ports for receiving one or more non-volatile memory cards (e.g., micro-SDHC memory cards). The LCD of the local terminal 28 is in two-way electrical communication with the central processor 8 via the master system processor 30. The local terminal 28 receives data from the central processor 8 relating to the system configuration, as well as other information (e.g., status information, alerts/alarms, etc.) and could be utilized by a user for programming purposes. Specifically, a user could utilize the local terminal 28 to assign a desired function to a particular relay of a bank of relay packs 32. For example, a user can specify that a particular relay be assigned for controlling a heater, a light, a pump, etc. The local terminal 28 could be a graphic display panel that could indicate system configuration, status information, and other information in a convenient, easy-to-navigate graphical display.

The USB ports and the micro-SDHC ports of the local terminal 28 allow data to be provided to the control system 2 via an external memory card, and/or from a USB flash memory or "thumb" drive. The USB ports and the micro-SDHC ports can be mounted on the main control panel 4 so that they are externally accessible. For example, a field technician can insert a USB drive into one of the USB ports or a micro-SDHC card into one of the micro-SDHC ports in order to install updated firmware, additional language packs, pool/spa layouts, programs for controlling one or more devices (such as programs for controlling one or more underwater pool or spa lights), etc. Further, the field technician can have a separate bootloader included on the USB drive or the micro-SDHC card such that he/she can boot an operating system of the control system 2 from the drive or card. This provides extensive diagnostic uses and allows for memory expansion. Furthermore, this functionality permits data logging of the components, which can be stored on a USB drive, micro-SDHC card, or, alternatively, on an associated website.

The main control panel 4 includes one or more modular programmable relay packs 32 that each contain a plurality of relays 56a-d (e.g., four). The modular programmable relay packs 32 (e.g., relay banks) are connectable to the relay bank connector 16 for two-way communication with the central processor 8 by way of the high speed RS-485 bus 10. Each modular relay pack 32 is connectable to pool/spa equipment and smart components, e.g., heaters, lights, pumps, pH dispense units, which allows the relay packs 32 to communicate with and control such pool/spa equipment.

The motherboard 6 can additionally include a 120 V AC power input 34, a chlorinator control subsystem 36, a sensor interface 38, a standard relay connector 40, and auxiliary relay connectors 42.

The AC power input 34 is connected to a 12 V DC power supply 44, a 24 V DC power supply 46, and a chlorinator power supply 48 that are in the main panel 4. The power supplies 44, 46 could be switch-mode power supplies, if desired. The AC power input 34 allows the 12 V DC power supply 44, 24 V DC power supply 46, and chlorinator power supply 48 to be connected to an AC power source. When connected to an AC power source, the AC power supplied is converted to DC by the 12 V DC power supply 44, the 24 V DC power supply 46, and chlorinator power supply 48. The 12 V DC power supply 44 provides 12 V DC power, while the 24 V DC power supply 46 provides 24 V DC power to the main control system 2 and the electrical components connected thereto. The 12 V DC power supply 44 and the 24 V DC power supply 46 are diagrammatically shown as separate units, however, one of ordinary skill in the art shall understand that 12 V DC power supply 44 and the 24 V DC power supply 46 can be provided as a single power supply unit that supplies both 12 V DC and 24 V DC.

The chlorinator control subsystem 36 could be in two-way electrical communication with the central processor 8 and a chlorinator unit 50, e.g., turbo cell or "T-Cell," of the pool or spa. This communication allows the control system 2 to be in operative communication with a chlorinator 50 such that the control system 2 could control the chlorinator 50 (e.g., chlorination times, amounts, etc.), or simply display chlorinator operating parameters and conditions on the local terminal 28. In some embodiments, the chlorinator subsystem 26 can be positioned on the motherboard 6. In other embodiments, the chlorinator subsystem 26 can be provided on an expansion card that is connectable to the control system 2.

The sensor interface 38 allows for the integration of a plurality of sensors with the control system 2. The various sensors are in electrical communication with the sensor interface 38 and provide the sensor interface 38 with information relating to the operating parameters of the pool or spa. The sensor interface 38 transmits this data to the central processor 8, which can utilize the data for various calculations, for control purpose, or for display via the local terminal 28. The sensors could be connected to the pool or spa itself or to the various pool or spa equipment and sense, among other things, temperatures (ambient, water, heater, etc.), flow rates, current and/or voltages of the various equipment, chlorination levels, etc. The sensor interface 38 could include a 12-wire, 10-wire, or 2-wire sensor connector such that sensors of varying capabilities and purposes can be connected to the system and utilized. The sensor interface 38 could also provide sensor conditioning, amplification, error correction, etc., so that signals received from the various sensors are in a suitable condition for processing by the central processor 8. The signals received by the sensor interface 38 can be converted from analog to digital by the sensor interface 38, and vice-versa, or, alternatively, can be converted by the central processor 8.

The standard relay connector 40 and the auxiliary relay connectors 42 can be connected with a plurality of relays that can be fixed-function relays or user-assignable relays. The standard relay connector 40 and the auxiliary relay connectors 42 can be either high voltage or low voltage depending upon the types of pool/spa devices to be controlled by the relays. For example, the standard relay connector 40 and the auxiliary relay connectors 42 could include two fixed-function, dry contact relays that can be assigned to switch a first heater and a second heater, respectively, and two user-assignable relays. The number of relays included in the standard relay connector 40 and the auxiliary relay connectors 42 is not limited to four as illustrated, and could be any desired number of relays.

The standard relay connector 40 and the auxiliary relay connectors 42 can have multiple control methods available, which are dependent on the configuration, including manual on/off, time clock (where the user has the ability to set an on/off time in a menu so that the relay can automatically turn on/off), countdown timer, and automatic control. Further, high voltage relays can be controlled in one or more of the following ways: in a group, as the low-speed output of a 2-speed pump, as a filter pump on a separate body of water, as a boost pump, as a light controller, as a pH dispense control, and/or as a general output. When the standard relay connector 40 and the auxiliary relay connectors 42 are used as a light controller, a menu can be displayed on the local terminal 28 which allows a user to directly activate a specific color for the light. Additionally, low voltage relays can be used for any purpose including, but not restricted to, heater control. The low voltage relays can be controlled from a group, as a dumb heater control, or as a general low voltage output.

As mentioned previously, the external high speed and low speed RS-485 bus connectors 14, 22 allow for various devices to be connected thereto. Some sample devices include communication subsystems, which may be a wired communication subsystem and/or a wireless communication subsystem that allow for communication with various remote control devices. This permits the remote control devices to be integrated with the control system 2. The wired communication subsystem could include Ethernet communications, serial (e.g., RS-485) communications, or other suitable communications types/protocols so that a remote control device can be connected to the main panel 4. Alternatively, the wired communication subsystem can be connected to the local terminal 28. For example, the wired communication subsystem could be connected to the Ethernet port on the local terminal 28. When connected, the wired communication subsystem is in two-way communication with the central processor 8 and transfers data from a connected remote control device to the central processor 8 and from the central processor 8 to the remote control device. For example, this permits a home Ethernet network to be connected to and integrated with the control unit 8 such that a wired remote control, located in a house for example, can be connected to the Ethernet network and in communication with the control unit 8. The wireless communication subsystem provides a wireless communication link between the control unit 8 and a wireless (e.g., handheld) remote control unit 58. The wireless communication link could includes WiFi, Bluetooth, or any other suitable communication means. The wireless remote control unit 58 could include a rechargeable battery, can be ruggedized and waterproof so that it can be used near a pool or spa, and could include an ultraviolet light (UV) resistant plastic enclosure. Importantly, the wired and wireless remote control unit 58 duplicates the functionality provided by the local terminal 28. The wired remote control unit could be an indoor unit that can be mounted to an interior wall of a house, or an outdoor version that can be mounted in or near a pool/spa.

Further, the wireless communication subsystem could also communicate with a network 60, which could be a wireless network, wireless cellular network (e.g., 3G or 4G), or the Internet. This permits the control system 2 to integrate with and be controlled by a wireless device 61, e.g., an iPhone, IPod Touch, iPad, Blackberry device, Android smart phone, Android tablet, etc., over the network 60. In such circumstances, a graphical user interface (GUI) and control program can be created generally for the control unit 58 and installed on the wireless device 61. All of the functionality available at the local terminal 28 is replicated at the user interface and by the control program of the wireless device 61. The user interface and control program can be an application that can be downloadable by the wireless device 61, and can be licensed on a subscription basis. One sample application can be a "mood" sensing application that allows a wireless device 61 with a gyroscope, accelerometer, heat sensor, camera, and/or microphone to determine various conditions of a user or an environment, and transmit control commands based on these determinations to the control system 2. For example, the application can sense body temperature, ambient temperature, movement of the device, sounds, etc., and control one or more components connected to the control system 2, such as by changing the color of one or more underwater pool lights in response to the conditions sensed by the wireless device 61. Further, such application could be provided as a personal computer (PC) version whereby a user can download the application to their PC and utilize his/her PC to control the control system 2 via their home network, e.g., Ethernet or the Internet. Even further, the wireless device 61 could include WiFi or Bluetooth capabilities itself and integrate with the control system 2 via such protocol.

The GUI at the control unit 58 could be replicated at each device connected to the control system 2, to control the control system 2 using a common interface. For example, there can be a local terminal 28, a handheld remote control unit 58 (wireless or wired), a wireless device 61 (smart phone/table), a manufacturer website accessible by the Internet, or a locally-served web page accessible by a computer. The locally served web page could make the GUI available as web pages that can be viewed by any device with a web browser that is communicating on the home network, e.g., via the IP address of the local server. In a system where multiple devices are configured to access the control program, the central processor 8 could maintain the configuration and the settings. The control system 2 can include functionality for foreign language support and display on the GUI. The foreign language support can come in the form of downloadable language packs. The control program, including the GUI, can have different defined levels of access. For example, the control program can have four separate levels designated as limited control access, full control access, settings access, and configuration access (administration mode). The limited control access definition can provide the minimal access needed for operation, and can be most suitable when a guest or renter is utilizing the system. For example, a control access definition can allow a user to turn a device on or off, but cannot allow the changing of set points, timers, or the creation/modification of set programing, etc. As another example, the settings access definition can provide the user with full control access plus the ability to change set points, timers, and programs. The configuration access definition can be an administration mode that provides full control and settings access as well as the ability to set up or change basic pool configuration information. The administration mode can be only for use by experienced pool owners or field technicians. Each of these modes/definitions can be password protected.

Further, the main panel 4 could include a plurality of "knockouts" in walls thereof, which can provide access to difference compartments of the main panel 4. For example, the main panel 4 can include knockouts on the back, bottom, or sides that provide access to a high voltage compartment or low voltage compartment, and can allow for the implementation of a ground fault circuit interrupter (GFCI). Additionally, the main panel 4 could include load center 53 or a 125 amp sub-panel base that can be compatible with various circuit breaker manufacturers.

The control system 2 could further include an expansion panel 54 connectable to the main control panel 4 and "slaved" thereto. The expansion panel 54 is discussed in greater detail below in connection with FIG. 4. Generally, the expansion panel 54 can be connected to the external high speed RS-485 bus connector 14 of the main control panel motherboard 6. The modular relay packs 32 are connectable to the expansion panel 54 for two-way communication with the expansion panel 54, and thus with the central processor 8. The modular relay packs 32 are connectable to both the main control panel 4 and the expansion panel 54. As such, the expansion panel 54 functions to "daisy chain" additional modular relay packs 32 to the main control panel 4. Further, the expansion panel 54 can include an additional expansion port to allow an expansion panel to be connected thereto. This functionality permits the number of modular relay packs that can be connected to the system to be expanded, allowing additional equipment to be controlled by the main control panel 4.

As shown in FIG. 2, the expansion panel 54 is external to the main control panel 4 and connected thereto by the data and power connection. A plurality of the relay packs 32 can be installed in the main panel 4 and the expansion panel 54, in any desired number/combination. The modular relay packs 32 each include a housing 55 and a plurality of relays 56a-56d. Each relay 56a-56d is a general-purpose relay that can be assigned a desired function by the user via the local terminal 28. By way of example, the first relay 56a can be assigned for controlling a pool heater, the second relay 56b can be assigned for controlling a light, the third relay 56c can be assigned for controlling a circulation pump, and the fourth relay 56d can be assigned for controlling a fountain pump. Of course, these functions can be altered as desired. A user can thus control the pool heater, the light, the circulation pump and the fountain pump via the local terminal 28 or, alternatively, by the hand-held remote control unit 58 or a wireless device 61 if such is in communication with the wireless communication subsystem. Further, a single device can be connected to two relays where necessary, e.g., a two-speed pump. As can be appreciated, the relay packs 32 allow for a user-friendly, "plug-and-play" installation and configuration.

Figure 3:
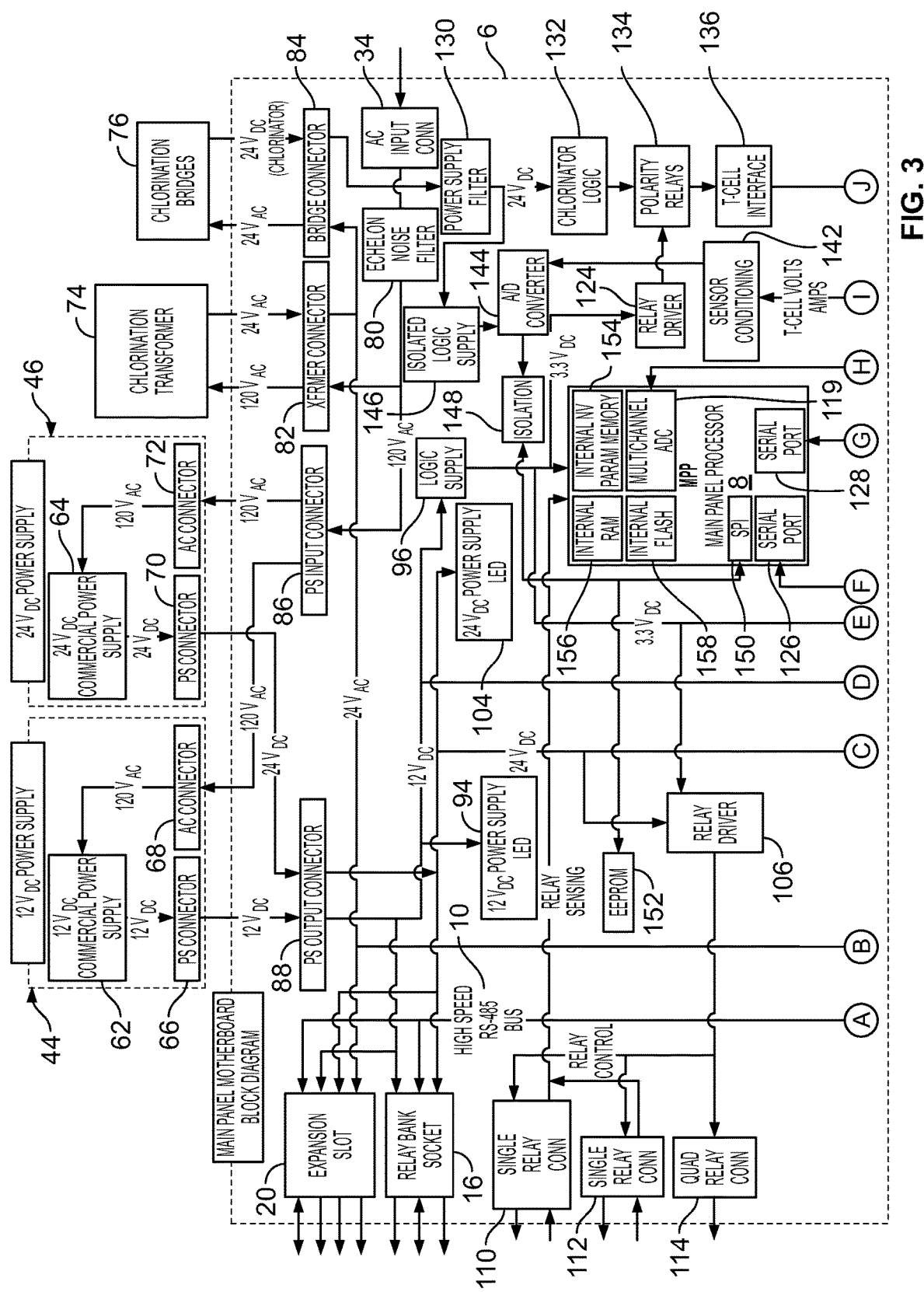
FIG. 3 is a block diagram showing electrical components of the main control panel of the present disclosure.
Figure 3:
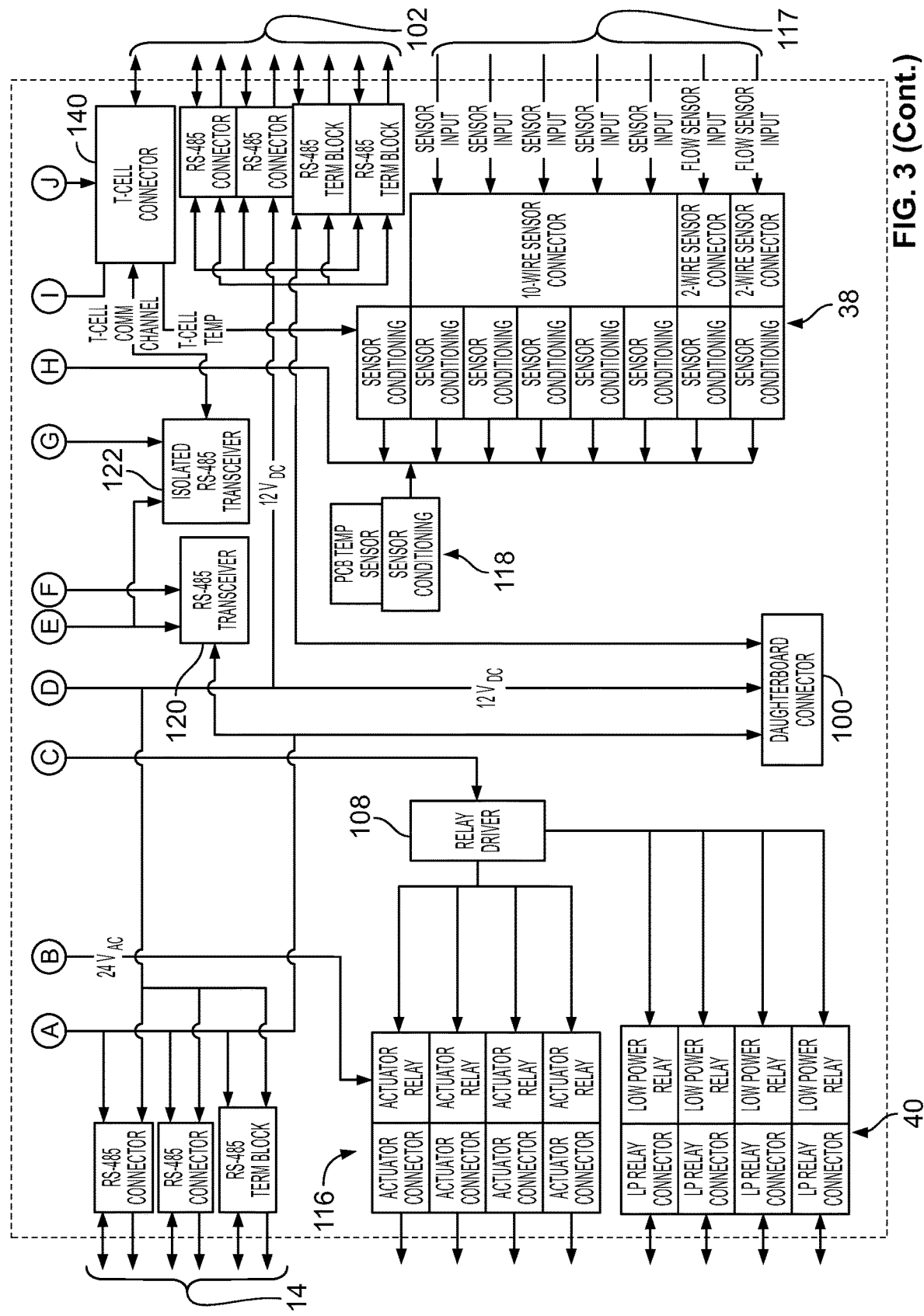

FIG. 3 is a block diagram showing the electronic components of the main control panel 4. The main control panel 4 includes a main panel motherboard 6 that holds various components of the main control panel 4 and provides interconnectivity therebetween. The main panel motherboard 6 can be a printed circuit board that can be conformal coated to prevent corrosion/damage from long term exposure to dampness. The main panel 4 includes a 12 VDC power supply assembly 44 and a 24 VDC power supply assembly 46. Connected to the main panel motherboard 6 is an AC input connector 34 that receives power from an AC power source, e.g., a standard outlet of a household. The AC input connector 34 sends the received power through a noise filter 80 (e.g., manufactured by Echelon, Inc.), which filters the power and removes any unwanted noise, and to a transformer connector 82 and a power supply input connector 86. The power supply input connector 86 allows connection of the main panel motherboard 6 with the 12 VDC power supply 62 and the 24 VDC power supply 64 via their respective AC connectors 68, 72. Each AC connector 68, 72 provides the respective power supply (e.g., 12 VDC power supply 62 and 24 VDC power supply 64) with 120 VAC power, which in turn converts same into 12 VDC and 24 VDC, respectively. The 12 VDC and 24 VDC output of the power supplies 62, 64 are connected to a respective power supply connector 66, 70 that are each connected to the power supply output connector 88 of the main panel motherboard 6. The power supply output connector 88 distributes power to various components of the main panel mother board 6. As mentioned previously, the AC input connector 34 provides AC power to the transformer connector 82 for connection with a chlorination transformer 74 that transforms the 120 VAC power to 24 VAC. The 24 VAC is returned by the chlorination transformer 74 to the transformer connector 82 for distribution among various components of the main panel motherboard 6.

The main panel motherboard 6 includes an expansion slot 20 that receives 12 VDC power and 24 VDC power from the power supply output connector 88 and is in two-way communication with the internal bus 10 for communication with the central processor 8. The expansion slot 20 is also in communication with the transformer connection 82 and a bridge connector 84, which will be discussed in greater detail below. The expansion slot 20 includes a data connection and a power connection that allow the expansion slot 20 to provide a connected expansion panel 54 with power and transfer data therebetween. Specifically, the expansion slot 20 permits an expansion panel 54 to be connected to the main panel motherboard 6, such that the expansion panel 54 is "slaved" to the main panel motherboard 6 when connected. Additionally, the expansion panel 54 is in two-way communication with the main panel motherboard 6, e.g., receiving and sending data via the data connection 44. The expansion slot 20 additionally receives 24 VAC power from the transformer connector 82 so that an expansion panel 54 connected thereto has the capability of allowing a chlorinator unit to be connected to it. More specifically, the expansion slot 20 can provide the required power to a chlorinator unit attached to an expansion panel 54. FIG. 3 illustrates only one expansion slot 20 on the main panel motherboard 6, however, it should be understood that the main panel motherboard 6 can hold a plurality of expansion slots so that more than one expansion panel 54 can be connected to the main panel motherboard 6. Furthermore, it is not necessary for an expansion panel 54 to be connected to the expansion slot 20, but instead, a second main control panel 4 can be connected to the expansion slot 20 such that a plurality of main control panels can be daisy chained together.

The main panel motherboard 6 further includes a relay bank socket 16 that allows connection of one or more of the modular programmable relay packs 32 with the main control motherboard 6. The relay bank socket 16 receives 12 VDC power and 24 VDC power from the power supply output connector 88 and is in two-way communication with the internal bus 10 for communication with the central processor 8. FIG. 3 illustrates only one relay bank socket 16 on the main panel motherboard 6, however, it should be understood that the main panel motherboard 6 can hold a plurality of relay bank sockets. Each additional relay bank socket can function identically to the relay bank socket 16 shown. When a modular programmable relay pack is connected to the relay bank socket 16, the relay pack engages in a handshake with the central processor 8 so that the central processor 8 recognizes that a relay pack has been connected to the system and can be programmed by the central processor 8.

The power supply output connector 88 additionally provides 12 VDC power to a 12 VDC power supply light-emitting diode (LED) 94, a logic supply 96, a first external RS-485 bus 14, a daughterboard connector 100, and a second external RS-485 bus 102. Additionally, the power supply output connector 88 provides 24 VDC power to a 24 VDC power supply LED 104, a first relay driver 106, and a second driver 108. The 12 VDC and 24 VDC power supply LED 94, 104 illuminate when power is being provided by the 12 VDC power supply 62 and/or the 24 VDC power supply 64, respectively. This provides a user with notification that the main panel motherboard 6 is receiving power. The other components will be discussed in greater detail below.

The first and second single relay connection 110, 112 and a quad relay connection 114 are included on the main panel motherboard 6 for switching multiple connected devices, e.g., motors. The quad relay connection 114 allows for four separate devices to be switched simultaneously when connected to the quad relay connection 114. The first and second single relay connections 110, 112 and the quad relay connection are connected to the first relay driver 106 for receiving power therefrom for switching operations. The first relay driver 106 receives 3.3 VDC from the logic supply 96 for power. The first and second single relay connection 110, 112 are also in direct communication with the central processor 8 for providing information thereto. The first and second single relay connections 110, 112 and the quad relay connection 114 can support various devices, such as a dimmer relay. Additionally, one of the first and second single relay connections 110, 112 can be a fixed-function, high-voltage relay for a filter, while the other relay can be free for use in controlling another device.

The first external RS-485 bus 14 includes a plurality of RS-485 connectors and an RS-485 terminal block, and is in communication with the internal high-speed RS-485 bus. The first external RS-485 bus 14 allows various components, including intelligent/smart devices, to be connected thereto and in two-way communication with the central processor 8. Possible devices for connection include, but are not limited to, heaters, underwater lights, chlorination equipment, a modem, a home automation base station, a wired terminal, chemistry sensing equipment, etc. Further, the first external RS-485 bus 14 receives 12 VDC power via the power supply output connector 88.

An actuator interface 116, which includes a plurality of actuator connectors and actuator relays, is included on the main panel motherboard 6, and is controlled by the second relay driver 108. The actuator relays of the actuator interface 116 receive 24 VAC power from the transformer connector 82 (which receives 24 VAC power from the chlorination transformer 74). The actuator interface 116 permits various types of actuators to be connected to each actuator connector and controlled by the system. For example, the actuator could be a valve actuator. Also connected to the second relay driver 108 are low power relays 40, each relay including an associated low power relay connector. The low power relays 40 permit various low power devices to be connected to the system, such that the hardwire relay 40 switches operation of the connected device.

The individual actuator relays of the actuator interface 116 have no restriction on what device (e.g., valve actuators) can be connected to what actuator relay, and can have multiple control methods available. These control methods are dependent on the configuration and include manual on/off, time clock (where the user has the ability to set an on/off time in a menu so that the relay can automatically turn on/off), countdown timer, and automatic control. Further, the individual actuator relays could be controlled in the following ways: from a group, as part of a pool/spa control for a single equipment system, in response to a spillover control program, as part of a pool/spa cleaner control program, in response to a water feature control program, in response to a solar heating control program, in response to a pH dispense control program, or otherwise.

As mentioned above, the main panel motherboard 6 includes a daughterboard connector 100. The daughterboard connector 100 is connected to the internal bus 10 for communicating with the central processor 8. The daughterboard connector 100 allows an additional circuit board to be connected to the main panel motherboard 6, permitting further expansion of the system functionality.

The sensor interface 38 includes a plurality of sensor connectors, which can be any number of wires, and receives input signals from a plurality of sensors connected thereto. Associated sensor conditioning circuitry could also be provided. The various sensor connectors permit various sensors of different capabilities to be connected to the system. The sensor connectors receive input from the wires 117 which are in electrical connection with and transmit data from associated sensors. The sensors can provide information and data pertaining to various operating parameters of the pool or spa. The sensor interface 38 transmits this data to the central processor 8, which can utilize the data for various purposes, e.g., to control devices and/or display information on the local terminal 28. The sensors can be resistance temperature sensors/external interlocks that can be connected to the pool or spa itself, or to the various pool or spa equipment, and can sense, among other parameters, temperatures (e.g., ambient air, pool water, spa water, solar panel, heater, etc.), flow rates, pressure, current and/or voltages of various equipment, chlorination levels, etc. The sensor conditioning units provide sensor conditioning, e.g., amplification and/or error correction, prior to sending the sensor input to a multichannel analog-to-digital converter 119 of the central processor 8. This ensures that the data and information provided by the various sensors is in proper condition for the central processor 8. The signal received by the sensor interface 38 can be converted from analog to digital by the sensor interface 38, or, alternatively, can be converted by the central processor 8. Additionally, a printed circuit board temperature sensor 118 (and associated sensor conditioning) could be included on the main panel motherboard 6 to measure the temperature of the main panel motherboard 6 and/or other components. This value can be used in various operations of the system including safety procedures and precautions. For example, if it is determined that the main panel motherboard 6 is operating at a temperature that is greater than or less than a threshold value, e.g., the main panel motherboard 6 is at a dangerously high or low temperature, the system can perform an automatic shut down or notify a user of the condition.

As mentioned previously, the main panel motherboard 6 includes a second external RS-485 bus 102 that includes a plurality of RS-485 connectors and RS-485 terminal blocks. The RS-485 bus 102 receives 12 VDC power from power supply output connector 88, and is in two-way communication with the daughterboard connector 100. The second external RS-485 bus 102 functions as an external RS-485 bus allowing various components, including intelligent/smart devices, to be connected thereto. Possible devices for connection include, but are not limited to, heaters, underwater lights, chlorination equipment, a modem, a home automation base station, a wired terminal, chemistry sensing equipment, etc.

The first external RS-485 bus 14 and the second external RS-485 bus 102 allow various devices to be connected to the control system 2 during or after installation, to add additional capabilities to the control system 2. These devices can be mounted externally to the main control panel 4 in their own weatherproof enclosure, or in some instances, internally with the main control panel 4. These devices can include an underwater pool/spa lighting control module (which permits control of underwater pool/spa lights using dedicated, low-voltage control wiring interconnected with the underwater pool/spa lights, or through power line carrier (PLC) control wherein controls are transmitted to the pool/spa lights over high or low voltage power lines which supply power to the lights), a wireless ("WiFi") radio module 26, a Z-wave radio module, or another type of wired or wireless transmitter and/or receiver. Each of the radio modules could be manufactured to conform with required government radio frequency (RF) standards. The WiFi radio module 26 can connect to the Ethernet port of the main panel motherboard 6, thus creating an Ethernet to WiFi bridge. The main panel motherboard 6, and all associated devices/expansion boards, can communicate with a home network through a wired Ethernet connection via the Ethernet port, or wirelessly using the WiFi radio module 26. Additionally, the WiFi radio 26 allows the wireless remote control unit 58 or a wireless device 61 to communicate with the main panel motherboard 6 at ranges of 250 feet or more. The WiFi radio 26 can be mounted in a radome housing that is capable of withstanding a NEMA 3R rain test and mounted externally to the main control panel 4. Alternatively, the WiFi radio module 26 can be mounted inside the main control panel 4 with only the antenna mounted externally.

The radio module can be a Z-wave radio module that allows the control system 2 to control various third party devices that are separate from the main control panel 4 and support the Z-wave standard. For example, the control system 2 can be capable of controlling locks, light switches, and outlets via the Z-wave radio module. The Z-wave radio module can be mounted in a radome housing external to the main control panel 4 and connected to either the first external RS-485 bus 14 or the second external RS-485 bus 102. The control system 2 can be capable of configuring the devices connected by way of the Z-wave radio module, such that the control system 2 discovers the devices, automatically assigns the devices to groups, allows a user to define groups of devices, and allows a user to define virtual circuits involving the devices.

Alternative to the Z-wave radio functionality, when the main control panel 4 is connected to a home network, the devices connected to the main control panel 4 can be controlled via an already existing home automation system.

Included on the main panel motherboard 6 is an RS-485 transceiver 120 that receives signals from the internal RS-485 bus 10, which is connected to the expansion slot 20, the relay bank socket 16, the first external RS-485 bus 14, and the daughterboard connector 100. The RS-485 transceiver 120 functions to interpret and process the signals received thereby for transmission to the central processor 8. The RS-485 transceiver is in two-way electrical communication with a first serial port 126 of the central processor 8 and receives 3.3 VDC from the logic supply 96. The main panel motherboard 6 also includes an isolated RS-485 transceiver 122 that receives a signal received by a chlorinator (T-Cell) connector 140, discussed in greater detail below, and interprets and processes the received signal for transmitting to the central processor 8. The isolated RS-485 transceiver 122 is in two-way electrical communication with a second serial port 128 of the central processor 8 and receives 3.3 VDC from the logic supply 96.

Turning now to the chlorination subsystem included in the main control panel 4, the chlorination subsystem includes the chlorination transformer 74, the transformer connector 82, chlorination bridge rectifiers 76, the bridge rectifier connector 84, a power supply filter 130, a chlorinator logic 132, polarity relays 134, a T-Cell interface 136, a T-Cell connector 140, an isolated RS-485 transceiver 122, a sensor conditioning unit 142, a third relay driver 124, an A/D converter 144, an isolated logic supply 146, an isolation component 148, and a serial peripheral interface 150. The chlorination transformer 74 is connected to the transformer connector 82 of the main panel motherboard 6. The chlorination transformer 74 receives 120 VAC from an AC power source via the AC input connector 34 and the transformer connector 82, and transforms the 120 VAC into 24 VAC, which is output back to the transformer connector 82. The transformer connector 82 provides 24 VAC to the bridge rectifier connector 84. The chlorination bridge rectifiers 76 are connected to the bridge rectifier connector 84 of the main panel motherboard 6. The chlorination bridge rectifier 76 receive 24 VAC from the bridge rectifier connector 84 and convert it into 24 VDC, which is output back to the bridge rectifier connector 84. The 24 VDC is provided to the power supply filter 130 which filters the power to reduce noise and transmits the filtered 24 VDC power to the isolated logic supply 146 and the chlorinator logic 132. The chlorinator logic 132 provides a logic output to the polarity relays 134, which switch the polarity of an associated chlorinator cell. The polarity relays 134 are connected to a third relay driver 124 for receiving power therefrom. The third relay driver 124 receives 3.3 VDC power from the logic supply 96. The polarity relays 134 provide switching signals to the T-Cell interface 136 which communicates with a chlorinator cell connected to the T-Cell connector 140. The T-Cell connector 140 is in two-way communication with the isolated RS-485 transceiver 122 over a T-Cell communication channel, for providing the central processor 8 with data regarding a connected chlorinator cell. The T-Cell connector 140 is also connected to a sensor conditioning unit 142 which provides sensor conditioning, e.g., amplification and error correction, of the data supplied by any sensors of a connected chlorinator cell. The sensor conditioning unit 142 provides data to an analog to digital (A/D) converter 144 that receives low voltage power from the isolated logic supply 146 and converts any input sensor signals from analog to digital. The A/D converter 144 provides the converted signal to an isolation unit 148, which isolates the signal and provides the signal to the serial peripheral interface 150 of the central processor 8 and the electrically erasable programmable read only memory (EEPROM) 152. The chlorinator attached to the T-Cell connector 140 can include a heat sink at the power supply that can be monitored by the central processor 8, which can shut down the chlorinator if an overheat situation has occurred or is imminent.

The central processor 8 could also include an internal non-volatile parameter memory 154, internal random-access memory (RAM) 156 and internal flash memory 158. This permits the system to retain settings in the event of a loss of power.

Figure 4:
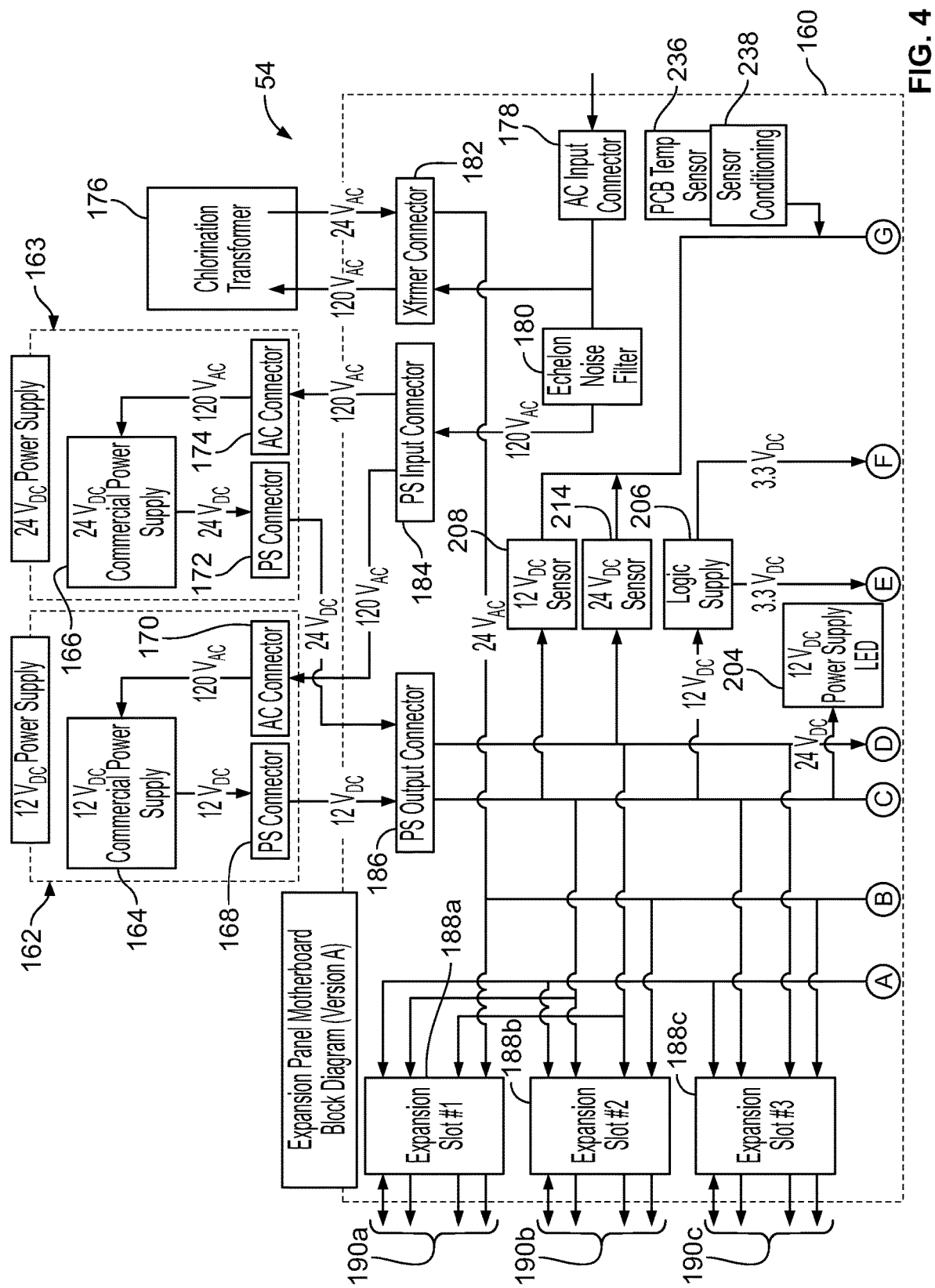
FIG. 4 is a block diagram showing electrical components of the expansion panel of the present disclosure.
Figure 4:
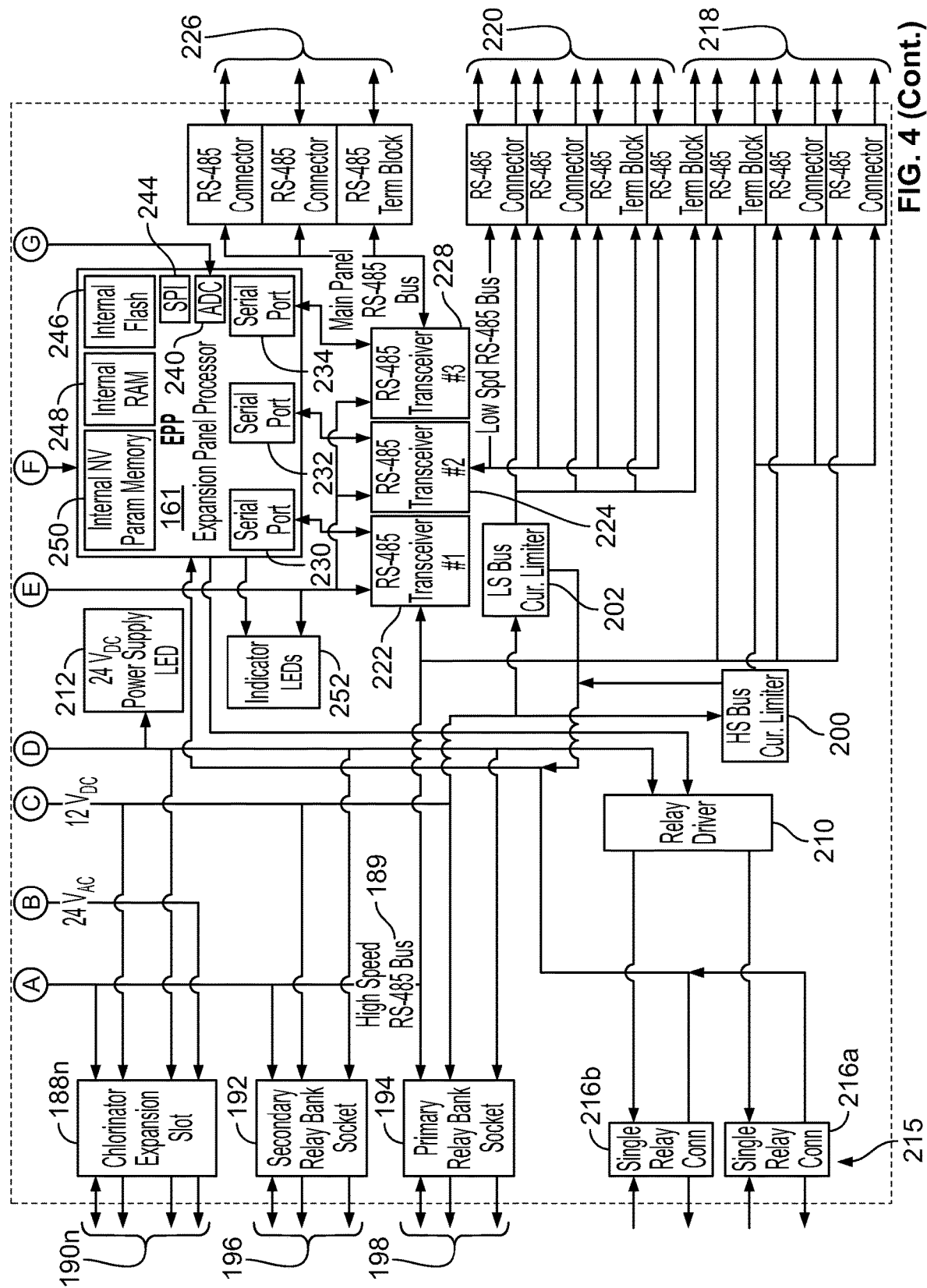

FIG. 4 is a block diagram illustrating an expansion panel 54 of the present disclosure. As mentioned above, the expansion panel 54 is connectable to the main control panel 4. The expansion panel 54 includes an expansion panel motherboard 160 including various components of the expansion panel 54. The expansion panel motherboard 160 can be a printed circuit board that can be conformal coated to prevent corrosion/damage from long term exposure to dampness. The expansion panel motherboard 160 includes an expansion panel processor 161. The expansion panel 54 includes 12 VDC power supply assembly 162 and a 24 VDC power supply assembly 163. Additionally, the expansion panel 26 could include additional 125 amp circuit breakers in addition to those of the main control unit 2. Connected to the expansion panel motherboard 160 is an AC input connector 178 that receives power from an AC power source. Alternatively, the expansion panel motherboard 160 can receive power from the main panel motherboard 60. The AC input connector 178 sends the received power through an Echelon noise filter 180, which filters the power and removes any unwanted noise, and to a transformer connector 182 and a power supply input connector 184. The power supply input connector 184 allows a 12 VDC power supply 164 and a 24 VDC power supply 166 to be connected to the expansion panel motherboard 160 via their respective AC connectors 170, 174. Each AC connector 170, 174 provides the respective power supply (e.g., 12 VDC power supply 164 and 24 VDC power supply 166) with 120 VAC power, which is converted by the power supply 164, 166 into 12 VDC or 24 VDC, respectively. The 12 VDC and 24 VDC outputs of the power supplies 164, 166 are connected to respective power supply connectors 168, 172, which, in-turn, are each connected to the power supply output connector 186 of the expansion panel mother board 160. The power supply output connector 186 functions to distribute power to various components of the expansion panel motherboard 160. The AC input connector 178 further provides AC power to the transformer connector 182 for connection with a chlorination transformer 176 that transforms the 120 VAC power to 24 VAC. The 24 VAC is returned by the chlorination transformer 176 to the transformer connector 182 for distribution among various components of the expansion panel motherboard 160. The 12 V DC power supply 164 and the 24 V DC power supply 166b are diagrammatically shown as separate units, however, one of ordinary skill in the art shall understand that 12 V DC power supply 164 and the 24 V DC power supply 166b can be provided as a single power supply unit that supplies both 12 V DC and 24 V DC.

The expansion panel motherboard 160 includes a plurality of expansion slots 188a-188n; four are illustrated for description purposes. The plurality of expansion slots 188a-188n receive 12 VDC power and 24 VDC power from the power supply output connector 186, and are in two-way communication with the expansion panel internal bus 189 (e.g., an RS-485 high speed bus) for communication with the expansion panel processor 161. The plurality of expansion slots 188a-188n are also in communication with the transformer connector 182 for allowing a chlorinator unit to be connected to any one of the expansion slots 188a-188n. Each expansion slot 188a-188n includes a respective connection 190a-190n with each connection 190a-190n including a data connection for communication with the internal bus 189 and a power connection for providing power to the device connected to the expansion slot 188a-188n. Specifically, the plurality of expansion slots 188a-188n permit an additional expansion panel to be connected at each expansion slot 188a-188n, such that a plurality of expansion panels can be daisy chained together and in communication with the main panel motherboard 6. When an expansion panel is connected to one of the plurality of expansion slots 188a-188n, it is slaved to the main panel motherboard 6. Additionally, such an expansion panel is in two-way communication with the main panel motherboard 6, e.g., receiving and sending data via the connection 190a-190n. The capability of daisy chaining several expansion panels together provides greater diversity and functionality, as more accessories can be added as needed.

The expansion panel mother board 160 further includes a primary relay bank socket 194 and a secondary relay bank socket 192 that each can receive one or more programmable relay packs 32. The primary relay bank socket 194 and secondary relay bank socket 192 receive 12 VDC power and 24 VDC power from the power supply output connector 186 and are in two-way communication with the internal bus 189 for communication with the expansion panel processor 161. FIG. 4 illustrates only two relay bank sockets 192, 194 on the expansion panel motherboard 160, however, it should be understood that the expansion panel motherboard 160 can include a plurality of relay bank sockets so that any desired number of modular programmable relay packs 32 can be connected to the expansion panel motherboard 160. When a modular programmable relay pack 32 is connected to the relay bank socket 192, 194, the relay pack 32 engages in a handshake with the expansion panel processor 161 so that the expansion panel processor 161 recognizes that a relay pack 32 has been connected to the system. This information is also communicated to the central processor 8 so that the relay pack 32 can be automatically programmed by the central processor 8.

The power supply output connector 186 additionally provides 12 VDC power to a high-speed bus current limiter 200, a low-speed bus current limiter 202, 12 VDC power supply LED 204, a logic supply 206, and a 12 VDC sensor 208. Further, the power supply output connector 186 also provides 24 VDC power to a relay driver 210, a 24 VDC power supply LED 212, and a 24 VDC sensor 214. The 12 VDC and the 24 VDC power supply LEDs 204, 212 illuminate when power is being provided by the 12 VDC power supply 164 and/or the 24 VDC power supply 166, respectively. The 12 VDC and the 24 VDC sensors 208, 214 sense, respectively, the presence of 12 VDC or 24 VDC power being provided by the 12 VDC power supply 164 and the 24 VDC power supply 166. Further, the 12 VDC and the 24 VDC sensors 208, 214 sense the presence of power and send a signal to an analog-to-digital converter 240 of the expansion panel processor 161 for monitoring and calculation purposes. The other components in communication with the power supply output connector 186, e.g., the high speed bus current limiter 200, the low speed bus current limiter 202, and the logic supply 206, will be discussed in greater detail below.

First and second single relay connections 216a, 216b are provided on the expansion panel motherboard 160 for switching a connected device, e.g., a pump. The first and second single relay connections 110, 112 are connected to the relay driver 210 for receiving power therefrom or for switching operations. The first and second single relay connections 216a, 216b are also in direct communication with the expansion panel processor 161 for providing information thereto.

A high-speed RS-485 connection 218 and a low-speed RS-485 connection 220 are provided on the expansion panel motherboard 160. The high-speed RS-485 connection 218 includes a plurality of RS-485 connectors and an RS-485 terminal block, and the low-speed RS-485 connection 220 includes a plurality of RS-485 connectors and RS-485 terminal blocks. The high-speed RS-485 connection 218 is in communication with the internal high speed RS-485 bus 189, which is in further communication with and provides data to a first RS-485 transceiver 222. The high-speed RS-485 connection 218 is also in communication with the high-speed bus current limiter 200, which provides the high-speed RS-485 connection 218 with 12 VDC power and limits the current provided to the high-speed RD-485 connection 218. The low-speed RS-485 connection 220 is in communication with and provides data to a second RS-485 transceiver 224, and is in further communication with the low-speed bus current limiter 202. The low-speed bus current limiter 202 provides the low-speed RS-485 connection 220 with 12 VDC power and limits the current provided to the low-speed RD-485 connection 220. The first and second RS-485 transceivers 222, 224 respectively receive data from the internal RS-485 bus 189 and the low-speed RS-485 connection 220, and are each connected to and in communication with a respective serial port 230, 232 of the expansion panel processor 161 for providing the expansion panel processor 161 with the data from the internal high-speed RS-485 bus 189 and the low-speed RS-485 connection 220. The high-speed RS-485 connection 218 and the low-speed RS-485 connection 220 allow various components, including intelligent/smart devices, to be connected thereto and in two-way communication with the expansion panel processor 161. Possible devices for connection include, but are not limited to, heaters, underwater lights, chlorination equipment, a modem, a home automation base station, a wired terminal, chemistry sensing equipment, etc.

The expansion panel motherboard 160 additionally includes an external RS-485 connection 226 that includes a plurality of RS-485 connectors for communication with the main panel mother board 6. The external RS-485 connection 226 exchanges with a third RS-485 transceiver 228, which is connected to and in communication with a serial port 234 of the expansion panel processor 161 for providing the expansion panel processor 161 with data from the external RS-485 connection 226.

Additionally, a printed circuit board (PCB) temperature sensor interface including a PCB sensor 236 and a sensor conditioning unit 238 is included on the expansion panel motherboard 160. The PCB sensor 236 provides a signal indicative of the temperature of the expansion panel motherboard 160 to the sensor conditioning unit 238, which conditions the signal and provides the conditioned signal to the expansion panel processor 161. This signal can be used in various operations of the system including safety procedures and precautions. For example, if it is determined that the expansion panel motherboard 160 is operating at a temperature that is greater than or less than a threshold value, e.g., the expansion panel motherboard 160 is at a dangerously high or low temperature, the system could perform an automatic shut down, illuminate an LED to notify a user of the condition, etc.

An EEPROM could be provided on the expansion panel motherboard 160 and receive 3.3 VDC from the logic supply 206. The EEPROM is in two-way communication with a serial peripheral interface 244 of the expansion panel processor 161 and stores data indicative of operations of the expansion panel motherboard 160. The expansion panel processor 161 could also include internal flash memory 246, internal RAM 248, and internal non-volatile parameter memory 250.

Furthermore, the expansion panel motherboard 160 could also include a plurality of indicator LEDs 252 that can designate various operating conditions of the expansion panel motherboard 160 or devices connected thereto. The plurality of indicator LEDs 252 can be used to alert a user to warnings, occurrences of fault conditions, or general operating conditions, etc.

Alternatively, the expansion panel motherboard can be identical to the main panel motherboard 6 discussed above with regard to FIG. 3. Reference is made to the discussion provided above in connection with FIG. 3.

Figure 5:
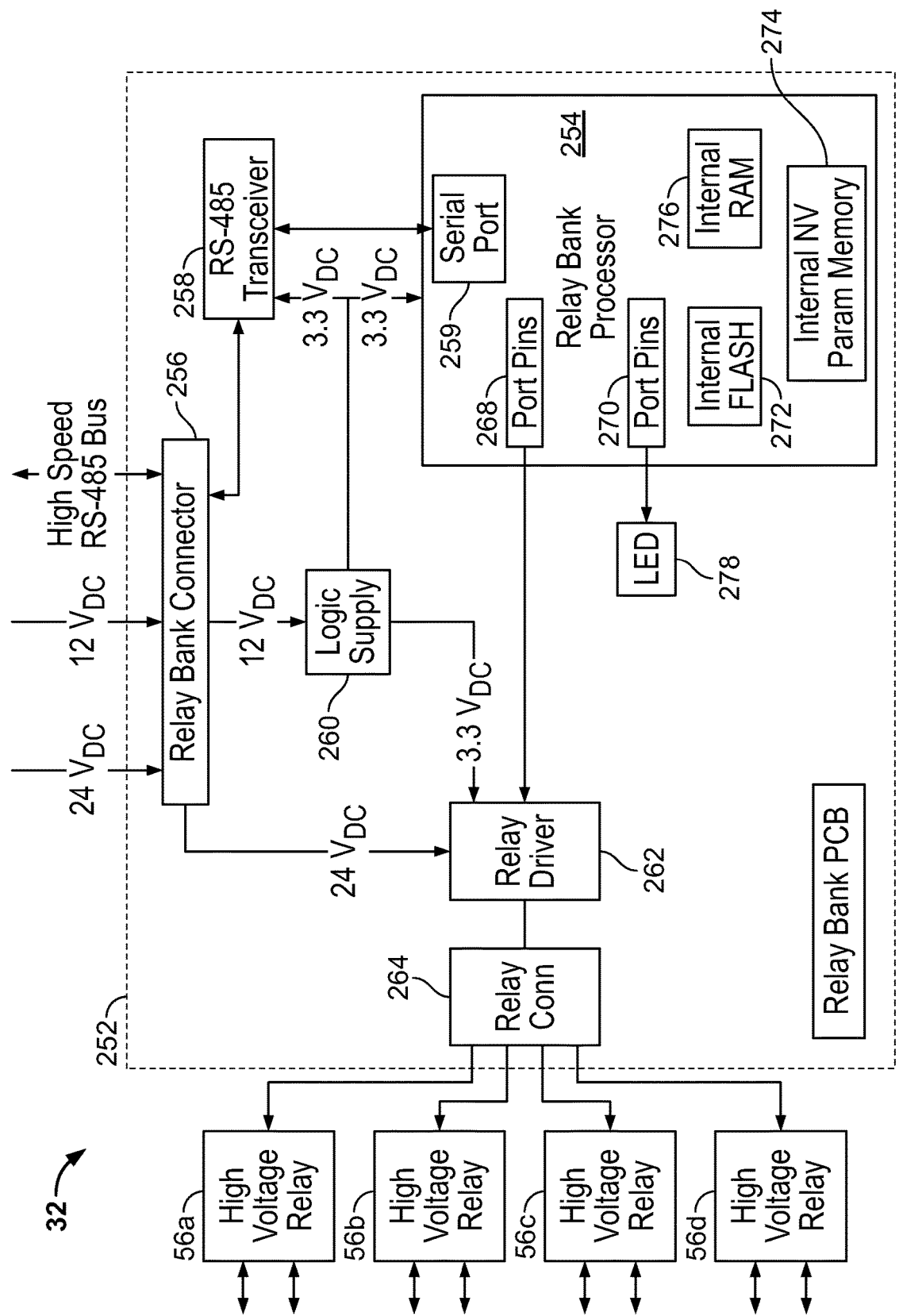
FIG. 5 is a block diagram showing electrical components of the modular programmable relay pack of the present disclosure.

FIG. 5 is a block diagram illustrating the modular relay packs 32 of the present disclosure. As discussed previously, the modular relay packs 32 each include a plurality of relays that allow various devices to be connected thereto. The modular relay packs 32 are connectable to the main control panel 4 and the expansion panel 54, such that the central processor 8 of the main control panel 4 or the expansion panel processor 161 of the expansion panel 54 controls the functionality of each relay of the modular relay packs 32. The modular relay packs 32 are interchangeable.

The modular relay packs 32 include a relay bank printed circuit board (PCB) 252 that holds various components of the modular relay pack 32 and provides interconnectivity therebetween. The relay bank PCB 252 includes a relay bank processor 254 and a relay bank connector 256. The relay bank connector 256 allows the modular relay packs 32 to be connected with the relay bank socket 16 of the main control panel 4 or the relay bank sockets 192, 194 of the expansion panel 54. The relay bank connector 256 not only provides a physical connection but also an electrical connection with wiring of the relay bank sockets 16, 192, 194 so that data and power can be transmitted therebetween. Furthermore, when the modular relay packs 32 are connected to either the main control panel 4 or the expansion panel 54, they are in communication with the internal RS-485 bus 10, 189 and thus the central processor 8 or the expansion processor 161.

The relay bank connector 256 is connected to an RS-485 transceiver 258 of the relay bank PCB 252, which interprets and process the signals received at the RS-485 bus for transmission to the relay bank processor 254. The RS-485 transceiver 258 is connected to a serial port 259 of the relay bank processor 254 and is in two-way electrical communication with the relay bank processor 254 via the serial port 259 connection. The relay bank connector 256 is also in communication with and provides 12 VDC power to a logic supply 260 that provides 3.3 VDC to the RS-485 transceiver 258, the relay bank processor 254, and a relay driver 262.

The relay driver 262 is in electrical connection with a relay connector 264 of the relay bank PCB 254, which allows for a plurality of high voltage relays 56a-56d to be connected to the relay connector 264. The relay driver 262 is connected to port pins 268 of the relay bank processor 254 which provides switching instructions to the relay driver 262. The relay driver 262 provides the switching instructions received from the relay bank processor 254 to each of the high voltage relays 56a-56d. Various devices can be connected to the high voltage relays 56a-56d and controlled by the relay bank processor 254, such as pumps, heaters, pH dispense units, etc. The high voltage relays 56a-56d can be arranged in a straight line or in a cubic orientation on the relay pack 32. Further, it is possible to change an individual relay 56a-56d of the relay pack 32 in the field, which can be done by removing the relay pack 32 from the relay bank socket 16, changing the relay 56a-56d, and inserting the relay pack 32 back into the relay bank socket 16. Each relay pack 32 includes a hole in the top cover that allows a technician to test the coil connections of each relay 56a-56d within the fully assembled relay pack 32.

The relay bank processor 154 could also include second port pins 270, internal flash memory 272, internal non-volatile parameter memory 274, and internal RAM 276. An LED 278 can be connected to the second port pins 270. The LED 278 can designate various operating conditions of the modular relay pack 32, devices connected thereto, and/or used to alert a user to warnings, occurrences of fault conditions, general operating conditions, etc.

As discussed above, each modular relay pack 32 is a smart device that can engage in an automatic handshake with the processor of the PCB to which it is connected, e.g., the central processor 8 of the main panel motherboard 6 or the expansion panel processor 161 of the expansion panel motherboard 160. As a result, the central processor 8 can immediately identify the characteristics of each relay of the relay packs 32 and allow a user to program each relay for a particular device. This functionality allows all of the relay packs 32 to be "plug-and-play."

Each of the smart components, e.g., devices connected to the relays of the modular relay packs 32, the main panel 4, or the expansion panel 54, or the modular relay packs themselves 32, can include field upgradeable firmware. That is, the control system 2 allows new firmware for any smart component to be uploaded to the central processor 8 via a USB memory stick inserted into the USB port, generally by a field technician, or downloaded to the central processor 8 from the Internet. The central processor 8 is capable of getting firmware revisions or updates for any smart component, and capable of implementing a file transfer to move the new firmware to the appropriate smart component. Each smart component can include enough memory to store two complete firmware images and a bootloader capable of activating the latest firmware image. In the event that the updated firmware image is corrupt or defective in any way the bootloader will activate the primary firmware image. Furthermore, each smart component will constantly monitor the communications stream from the central processor 8. If a loss of communication is ever detected by a smart component it will enter a known safe state where everything controlled by the component is turned off. The smart component will return to active operation when it receives a command from the central processor 8. The central processor 8 is also capable of resetting all of the connected smart components, either individually, in multicast groups, or all at once via a broadcast.

Figure 6:
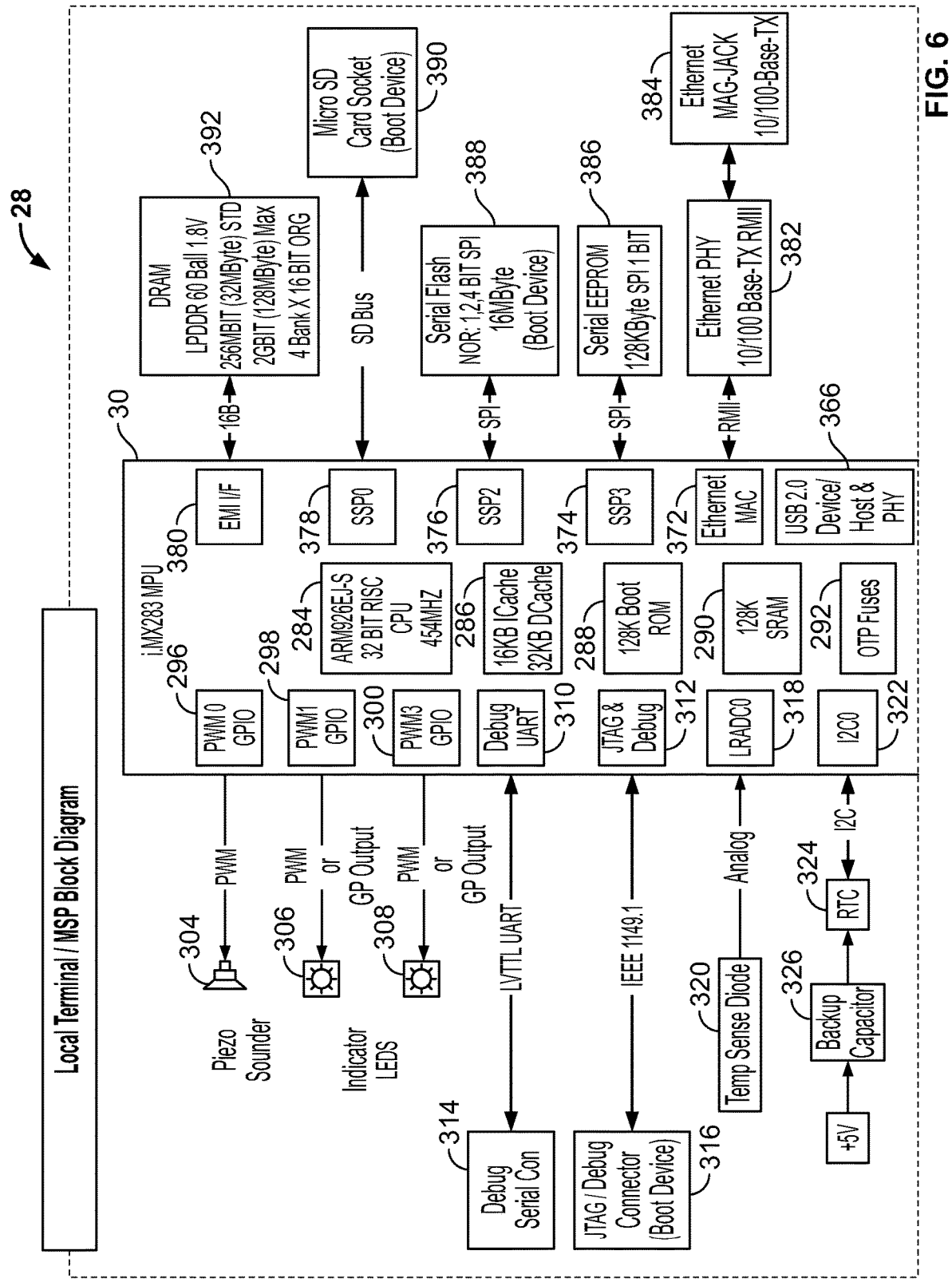
FIG. 6 is a block diagram showing electrical components of the local terminal of the present disclosure.
Figure 6:
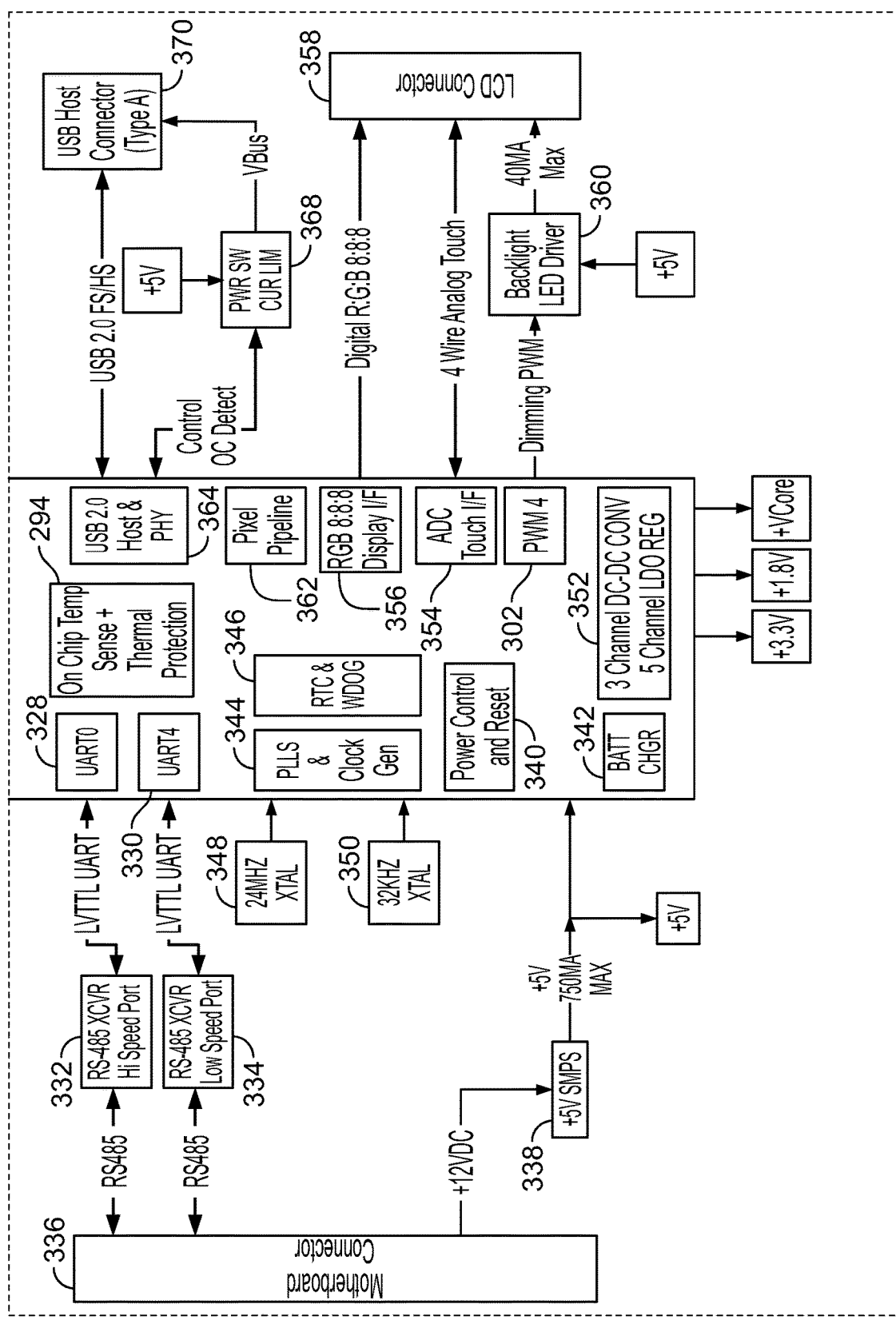

FIG. 6 is a block diagram illustrating components of the local terminal 28. As discussed above, the main control panel 4 includes a local terminal 28 for allowing user interaction with the system and programming of the modular relay packs 32. The local terminal 28 includes a local terminal master system processor (MSP) 30, which is a microprocessor unit. The MSP 30 includes a central processing unit (CPU) 284, a cache memory 286, a boot read-only memory (ROM) 288, static random-access memory (SRAM) 290, one-time programmable fuses 292, and an on-chip temperature sense and thermal protection unit 294. The MSP 30 additionally includes a first pulse-width modulation general purpose input/output (PWM GPIO) module 296, a second pulse-width modulation general purpose input/output module 298, a third pulse-width modulation general purpose input/output module 300, and a fourth pulse-width modulation general purpose input/output module 302. The PWM GPIOs 296, 298, 300, 302 allow for various devices to be connected thereto, and provide either a PWM signal or a general purpose output to the devices connected thereto. For example, a piezo sounder 304, indicator LEDs 306, 308, and a backlight LED driver 360 can be connected to the PWM GPIOs 296, 298, 300, 302 and receive signals therefrom.

The MSP 30 also includes a debug universal asynchronous receiver/transmitter port (UART) 310 and a joint test action group (JTAG) and debug port 312. The debug UART 310 is connected with a debug serial connection 314 that allows for a debugging device to be connected thereto. The JTAG and debug port 312 is connected with a JTAG and debug connector 316 that allows a debugging device to be connected thereto. A low-rate analog to digital converter (LRADC) 318 is included on the MSP 30, to which a temperature sensing diode 320 is attached. The temperature sensing diode 320 is an analog sensor that senses the temperature of the local terminal 28 and transmits the sensed temperature to the LRADC 318. Further, an inter-integrated circuit (I2C) 322 is provided on the MSP 30. A real-time clock (RTC) 324 is connected to the I2C 322. The RTC 324 is a computer clock that keeps track of time. A backup capacitor 326 is connected to the RTC 324 as an alternative power source for the RTC 324 so that the RTC 324 can keep track of time when the local terminal 28 is turned off.

A first UART 328 and a second UART 330 are included on the MSP 30 and connected, respectively, to an RS-485 transceiver hi-speed port 332 and an RS-485 transceiver low-speed port 334. The RS-485 transceiver hi-speed port 332 and the RS-485 transceiver low-speed port 334 are connected to a motherboard connector 336. The motherboard connector 336 is connected with a 5V switched mode power supply (SMPS) 338 that is connected to the MSP 30. The motherboard connector 336, and associated components that connect the motherboard connector 336 to the MSP 30, allow the local terminal 28 to be connected to the main panel motherboard 6. Specifically, the motherboard connector 336 is generally connected to the local terminal connector 18. This connection, e.g., the motherboard connector 336 engaged with the local terminal connector 18, allows the MSP 30 to receive data and commands from the MPP 8 by way of the RS-485 transceiver hi-speed port 332 and the RS-485 transceiver low-speed port 334, and power by way of the SMPS 338. The SMPS 338 transfers power provided by the MPP 6 to the MSP 30 and associated components. To this end, the MSP 30 also includes a power control and reset module 340 and a battery charger 342. The power control and reset module 340 manage the power of the MSP 28 and allows the power to be reset.

The MSP 30 also includes a phase locked loop system (PLLS) and clock generator 344 connected with a real-time clock and watchdog timer 346. A 24 MHz crystal oscillator 348 and a 32 KHz crystal oscillator 350 are connected to the PLLS and clock generator 344. The PLLS and clock generator 344 generates a clock signal from the 24 MHz crystal oscillator 348 and the 32 KHz crystal oscillator 350. The MSP 30 includes a 3 channel DC-DC converter and 5 channel low-dropout regulator 352.

An analog to digital converter touch interface (ADC touch I/F) 354 and an RGB 8:8:8 display interface 356 are included on the MSP 30 and connected to an LCD connector 358. The fourth PWM GPIO 302 is connected with a backlight LED driver 360 which, in turn, is connected with the LCD connector 358. This subsystem connecting the LCD connector 358 to the MSP 30 provides the proper interface and communication pathways for a touchscreen LCD to be connected to the LCD connector, such that the MSP 30 can control the display of an LCD connected to the LCD connector 358. The MSP 30 also includes a pixel pipeline 362 that processes pixel information of an LCD connected to the LCD connector 358. As mentioned, an LCD screen could include touchscreen functionality that provides input to the MSP 30 and the MPP 8, and allows a user to make various selections on the local terminal 28 and input various parameters into the local terminal 28.

The MSP 30 includes a USB host and physical port 364 and a USB device/host and physical port 366, which are connected to a power switch and current limiter 368 and a USB host connector 370. The power switch and current limiter 368 is connected with the USB host connector 370, and distributes the appropriate power and current to the USB host connector 370.

The MSP also includes an Ethernet media access controller (MAC) 372, a first synchronous serial port 374, a second synchronous serial port 376, a third synchronous serial port 378, and an external memory interface 380. The Ethernet MAC 372 is connected with an Ethernet physical layer 382 that is connected with an Ethernet mag-jack 384. The Ethernet mag-jack 384 allows an Ethernet cable to be connected thereto, while the Ethernet physical layer 382 encodes and decodes data that is received. A serial electrically erasable programmable read-only memory (EEPROM) 386 is connected with the first synchronous serial port 374, and is a non-volatile memory that is used to store data when the power to the local terminal 28 is removed. A serial flash memory 388, which can be serial NOR flash memory, can be connected to the second synchronous serial port 376 to provide memory storage capabilities. A microSD card socket 390 can be connected to the third synchronous serial port 378 and provides external memory storage capabilities. Dynamic random access memory (DRAM) 392 could be connected with the external memory interface 380 to provide additional memory storage capabilities.

Figure 7:
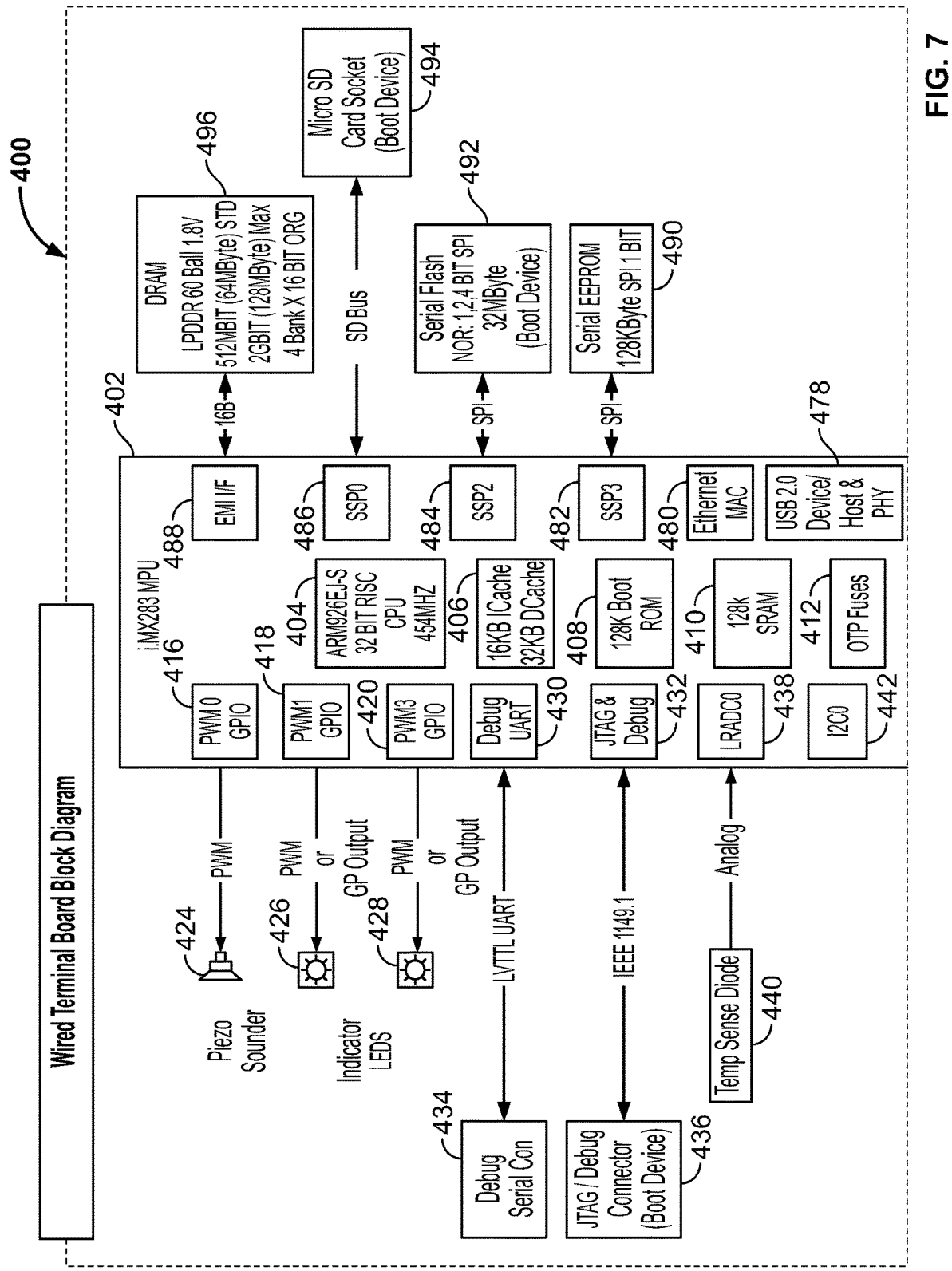
FIG. 7 is a block diagram showing electrical components of an optional wired terminal printed circuit board of the present disclosure.
Figure 7:
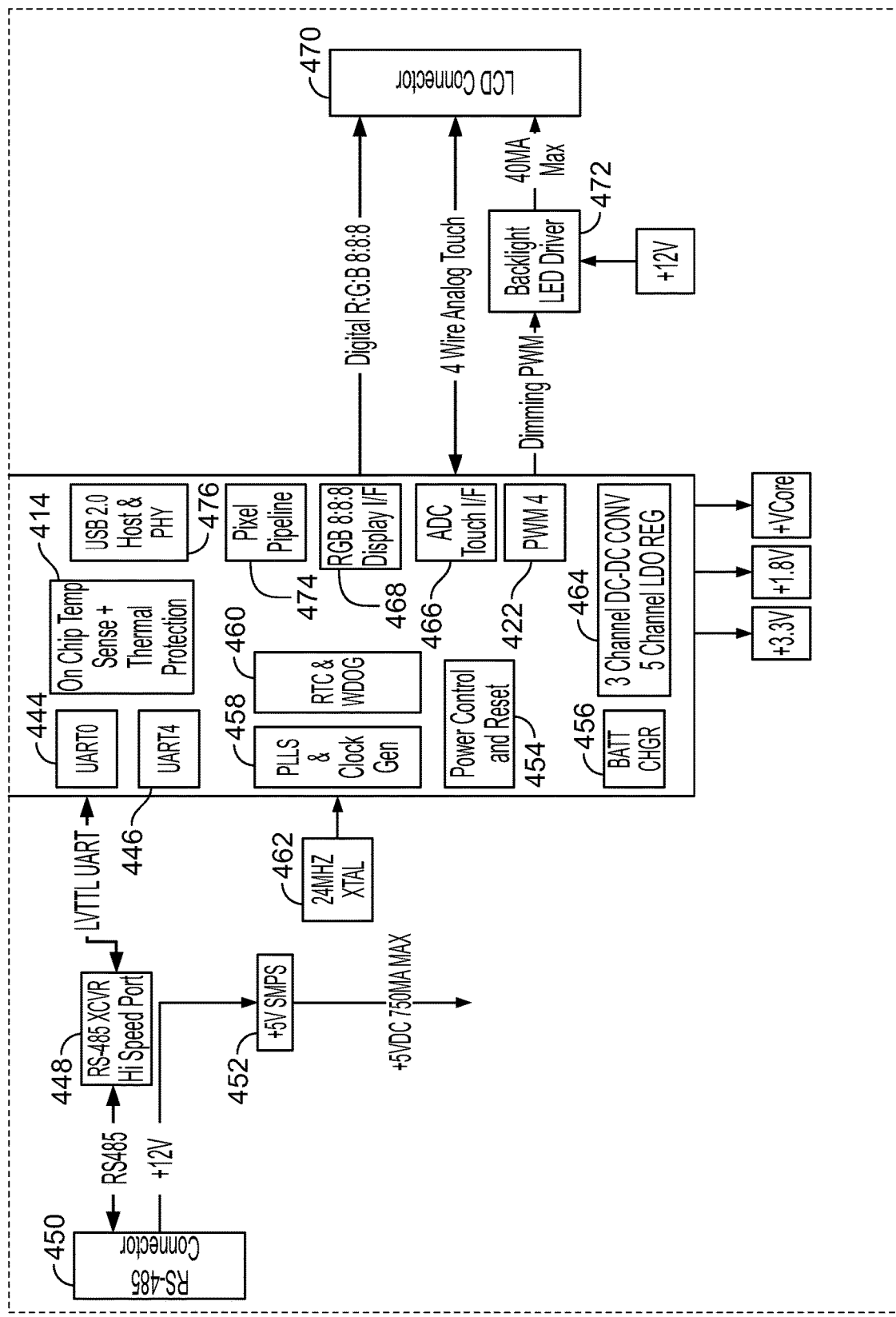

FIG. 7 is a block diagram illustrating a wired terminal printed circuit board (PCB) 400. The wired terminal includes the wired terminal PCB 400 that holds a terminal processor 402, which is a microprocessor unit. The terminal processor 402 includes a central processing unit (CPU) 404, a cache memory 406, a boot read-only memory (ROM) 408, static random-access memory (SRAM) 410, one-time programmable fuses 412, and an on-chip temperature sensing and thermal protection unit 414. The terminal processor 402 additionally includes a first pulse-width modulation general purpose input/output module (PWM GPIO) 416, a second pulse-width modulation general purpose input/output module 418, a third pulse-width modulation general purpose input/output module 420, and a fourth pulse-width modulation general purpose input/output module 422. The PWM GPIOs 416, 418, 420, 422 allow for various devices to be connected thereto, and provide either a PWM signal or a general purpose output to the devices connected thereto. For example, a piezo sounder 424, indicator LEDs 426, 428, and a backlight LED drive 472 can be connected to the PWM GPIOs 416, 418, 420, 422 and receive a signal therefrom.

The terminal processor 402 also includes a debug universal asynchronous receiver/transmitter port (UART) 430 and a joint test action group (JTAG) and debug port 432. The debug UART 430 is connected to a debug serial connection 434 that allows for a debugging device to be connected thereto. The JTAG and debug port 432 is connected with a JTAG and debug connector 436 that allows a debugging device to be connected thereto. A low-rate analog to digital converter (LRADC) 438 is included on the terminal processor 402, which a temperature sensing diode 440 is attached to. The temperature sensing diode 440 is an analog sensor that senses the temperature of the wired terminal PCB 28 and transmits the sensed temperature to the LRADC 438. Further, an inter-integrated circuit (I2C) 442 is provided on the terminal processor 402.

A first UART 444 and a second UART 446 are included on the terminal processor 402. The first UART 444 is connected with an RS-485 transceiver hi-speed port 448. The RS-485 transceiver hi-speed port 448 is connected to an RS-485 connector 450. The RS-485 connector 450 is connected with a 5V switched mode power supply (SMPS) 452. The RS-485 connector 450, and associated components that connect the RS-485 connector 450 to the terminal processor 402, allow the wired terminal PCB 28 to be connected to the main panel motherboard 6. Specifically, the RS-485 connector 450 is generally connected to the external high-speed RS-485 bus connector 14 by a wire. This connection, e.g., the RS-485 connector 450 engaged with the external RS-485 bus connector 14, allows the terminal processor 402 to receive data and commands from the MPP 8 by way of the RS-485 transceiver hi-speed port 448, and power by way of the SMPS 338. The SMPS 338 provides power from the MPP 6 to the terminal processor 402 and associated components. To this end, the terminal processor 402 also includes a power control and reset module 454 and a battery charger 456. The power control and reset module 454 manage the power of the terminal processor 402 and allow the power to be reset.

The terminal processor 402 also includes a phase locked loop system (PLLS) and clock generator 458 connected with a real-time clock and watchdog timer 460. A 24 MHz crystal oscillator 462 is connected to the PLLS and clock generator 458. The PLLS and clock generator 458 generates a clock signal from the 24 MHz crystal oscillator 462. The terminal processor 402 includes a 3 channel DC-DC converter and 5 channel low-dropout regulator 464.

An analog to digital converter touch interface (ADC touch I/F) 466 and an RGB 8:8:8 display interface 468 are included on the terminal processor 402 and connected to an LCD connector 470. The fourth PWM GPIO 422 is connected with a backlight LED driver 472 that is connected with the LCD connector 470. This subsystem connecting the LCD connector 470 to the terminal processor 402 provides the proper interface and communication pathways for a touchscreen LCD to be connected to the LCD connector, such that the terminal processor 402 can control the display of an LCD connected to the LCD connector 470. The terminal processor 402 also includes a pixel pipeline 474 that processes pixel information of an LCD connected to the LCD connector 470. As mentioned, an LCD screen could include touchscreen functionality that provide input to the terminal processor 402, the MSP 30, and the MPP 8, and allows a user to make various selections on the wired terminal and input various parameters into the wired terminal. The terminal processor 402 includes a USB host and physical port 476 and a USB device/host and physical port 478. The terminal processor 402 is positioned within the handheld remote control unit 58a, 58b, which could be located external to, and/or remotely from, the main panel 4.

The terminal processor 402 also includes an Ethernet media access controller (MAC) 480, a first synchronous serial port 482, a second synchronous serial port 484, a third synchronous serial port 486, and an external memory interface 488. A serial electrically erasable programmable read-only memory (EEPROM) 490 is connected with the first synchronous serial port 482, and is a non-volatile memory that is used to store data when the power to the handheld terminal is removed. A serial flash 492 memory, which can be serial NOR flash memory, can be connected to the second synchronous serial port 484 to provide memory storage capabilities. A microSD card socket 494 can be connected to the third synchronous serial port 486 and provides external memory storage capabilities. Dynamic random access memory (DRAM) 496 could be connected with the external memory interface 488 to provide additional memory storage capabilities.

Figure 8A:
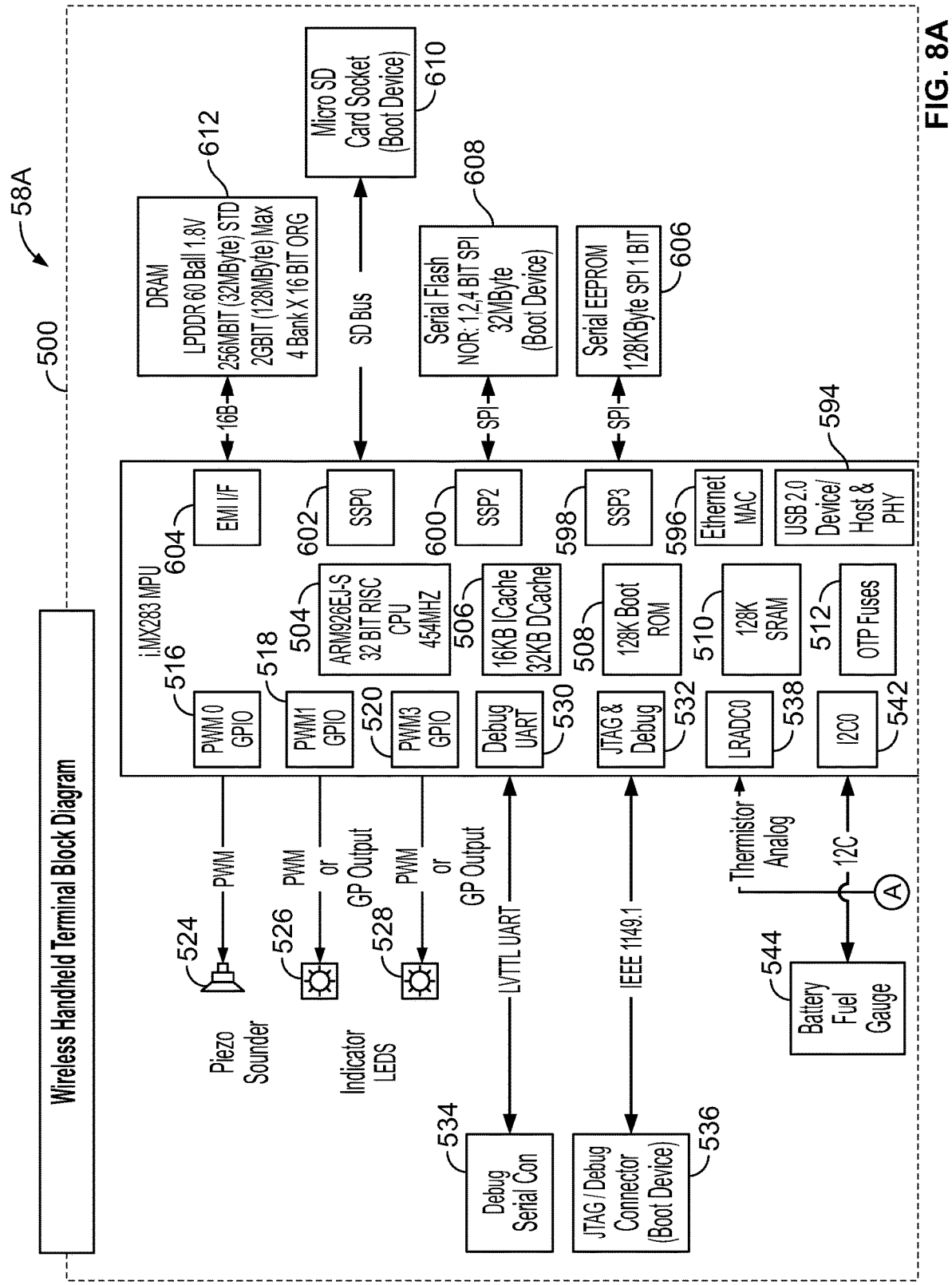
FIG. 8A is a block diagram showing electrical components of an optional wireless terminal of the present disclosure including a radio module.
Figure 8A:
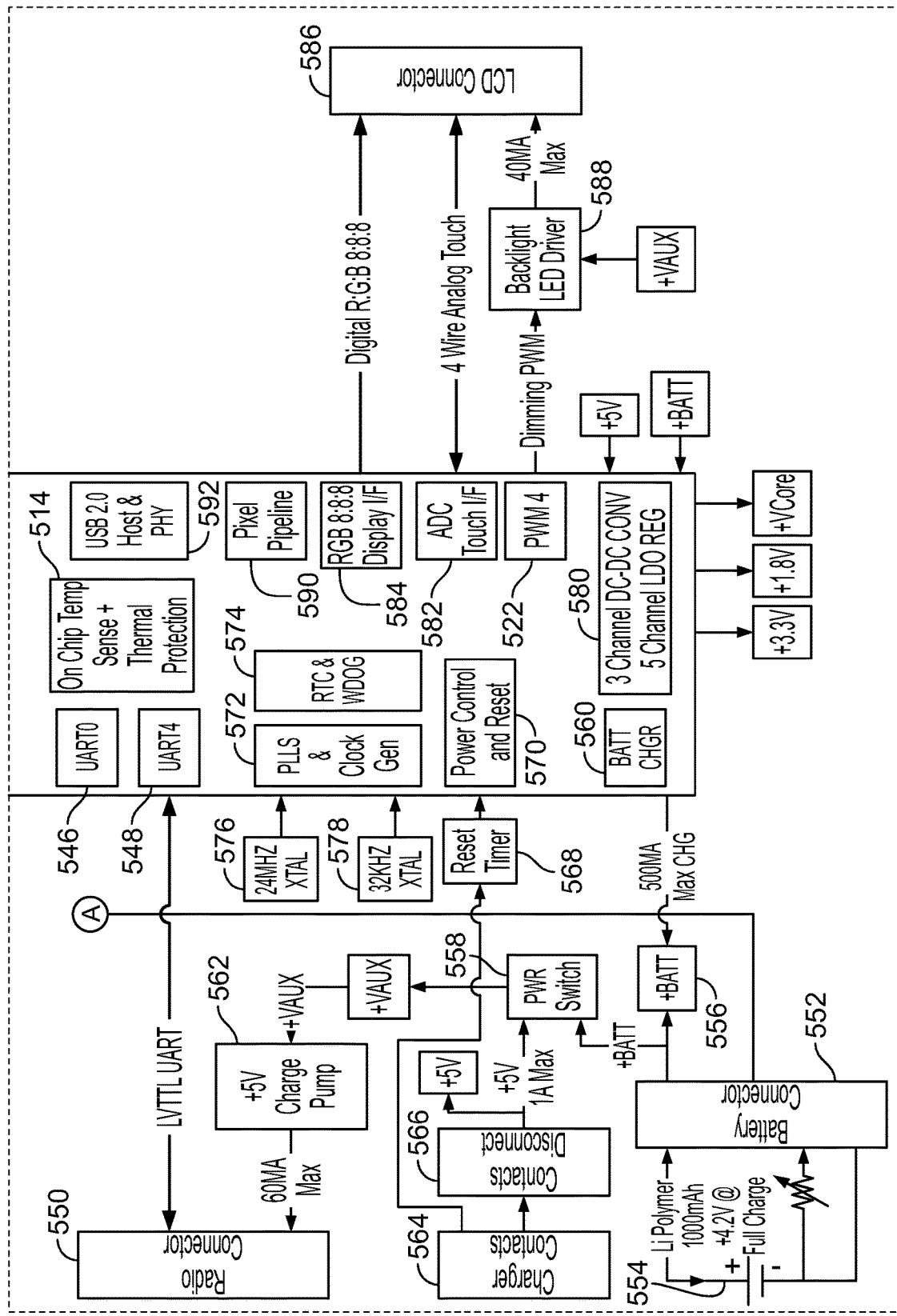

FIG. 8A is a block diagram illustrating electrical components of an optional wireless terminal 58a of the present disclosure including a radio module. The wireless terminal 58a provides the identical functionality provided by the wired terminal, e.g., allowing a user to interact with the system and program the modular relay packs 32. The wireless terminal 58a includes the wireless terminal PCB 500 that holds a terminal processor 502, which is a microprocessor unit. The terminal processor 502 includes a central processing unit (CPU) 504, a cache memory 506, a boot read-only memory (ROM) 508, static random-access memory (SRAM) 510, one-time programmable fuses 512, and an on-chip temperature sensing and thermal protection unit 514. The terminal processor 502 additionally includes a first pulse-width modulation general purpose input/output module (PWM GPIO) 516, a second pulse-width modulation general purpose input/output module 518, a third pulse-width modulation general purpose input/output module 520, and a fourth pulse-width modulation general purpose input/output module 522. The PWM GPIOs 516, 518, 520, 522 allow for various devices to be connected thereto, and provide either a PWM signal or a general purpose output to the devices connected thereto. For example, a piezo sounder 524, indicator LEDs 526, 528, and a backlight LED driver 588 can be connected to the PWM GPIOs 516, 518, 520, 522 and receive signals therefrom.

The terminal processor 502 also includes a debug universal asynchronous receiver/transmitter port (UART) 530 and a joint test action group (JTAG) and debug port 432. The debug UART 530 is connected to a debug serial connection 534 that allows for a debugging device to be connected thereto. The JTAG and debug port 532 is connected with a JTAG and debug connector 536 that allows a debugging device to be connected thereto. A low-rate analog to digital converter (LRADC) 538 is included on the terminal processor 502, which a battery connector 440 is attached to, and discussed in greater detail below. Further, an inter-integrated circuit (I2C) 542 is provided on the terminal processor 502, and connected with a battery fuel gauge 544. The battery fuel gauge 544 provides a graphical representation of the battery power that is remaining for the wireless terminal 58*a*.

A first UART 546 and a second UART 548 are included on the terminal processor 502. The second UART 548 is connected with radio connector 550. The radio connector 550 allows a radio module to be connected to the wireless terminal PCB 500. This connection allows the wireless terminal 58*a* to wirelessly communicate with the main panel motherboard 6. Specifically, a third party radio module engaged with the radio connector 550 allows the wireless terminal processor 504 to receive data and commands from, and send data to, the MPP 8 when a radio frequency base station is engaged with the external RS-485 bus connector 14 of the main panel 12. Thus, the terminal processor 502 can receive data and commands from the MPP 8 and the MSP 30 by way of radio frequency communication. The wireless terminal PCB 550 includes a battery connector 552 that can have a battery 554 attached thereto. The battery 554 may be a lithium polymer rechargeable battery and/or may be removeable. The battery connector 552 is connected with a battery power connector 556 and a power switch 558. The battery power connector 556 is connected with a battery charger 560 on the terminal processor 502. The power switch 558 determines when power is to be provided to a charge pump 562, which provides power to the radio connector 550. Charger contacts 564 are included on the wireless terminal PCB 500 and are in communication with a contacts disconnect circuit 566 and a reset timer 568. The contacts disconnect circuit 566 is in communication with the power switch 558, and the disconnect circuit 566 could be actuated to disconnect the charger contacts 564. The reset timer 568 is connected with a power control and reset module 570 that manages the power of the terminal processor 502 and allows the power to be reset.

The terminal processor 502 also includes a phase locked loop system (PLLS) and clock generator 572 connected with a real-time clock and watchdog timer 574. A 24 MHz crystal oscillator 576 and a 32 KHz crystal oscillator 578 are connected to the PLLS and clock generator 572. The PLLS and clock generator 572 generates a clock signal from the 24 MHz crystal oscillator 576 and the 32 KHz crystal oscillator 578. The terminal processor 502 includes a 3 channel DC-DC converter and 5 channel low-dropout regulator 580.

An analog to digital converter touch interface (ADC touch I/F) 582 and an RGB 8:8:8 display interface 584 are included on the terminal processor 502 and connected to an LCD connector 586. The fourth PWM GPIO 522 is connected with a backlight LED driver 588 that is connected with the LCD connector 586. This subsystem connecting the LCD connector 586 to the terminal processor 502 provides the proper interface and communication pathways for a touchscreen LCD to be connected to the LCD connector, such that the terminal processor 502 can control the display of an LCD connected to the LCD connector 586. The terminal processor 502 also includes a pixel pipeline 590 that processes pixel information of an LCD connected to the LCD connector 586. As mentioned, an LCD screen could include touchscreen functionality that provide input to the terminal processor 502, the MSP 30, and the MPP 8, and allows a user to make various selections on the wireless terminal 58*a* and input various parameters into the wireless terminal 58*a*. The terminal processor 502 includes a USB host and physical port 592 and a USB device/host and physical port 594.

The terminal processor 502 also includes an Ethernet media access controller (MAC) 596, a first synchronous serial port 598, a second synchronous serial port 600, a third synchronous serial port 602, and an external memory interface 604. A serial electrically erasable programmable read-only memory (EEPROM) 606 is connected with the first synchronous serial port 598, and is a non-volatile memory that is used to store data when the power to the handheld terminal is removed. A serial flash 608, which can be serial NOR flash, can be connected to the second synchronous serial port 600 to provide memory storage capabilities. A microSD card socket 610 can be connected to the third synchronous serial port 602 and provides external memory storage capabilities. Dynamic random access memory (DRAM) 612 could be connected with the external memory interface 604 to provide additional memory storage capabilities.

Figure 8B:
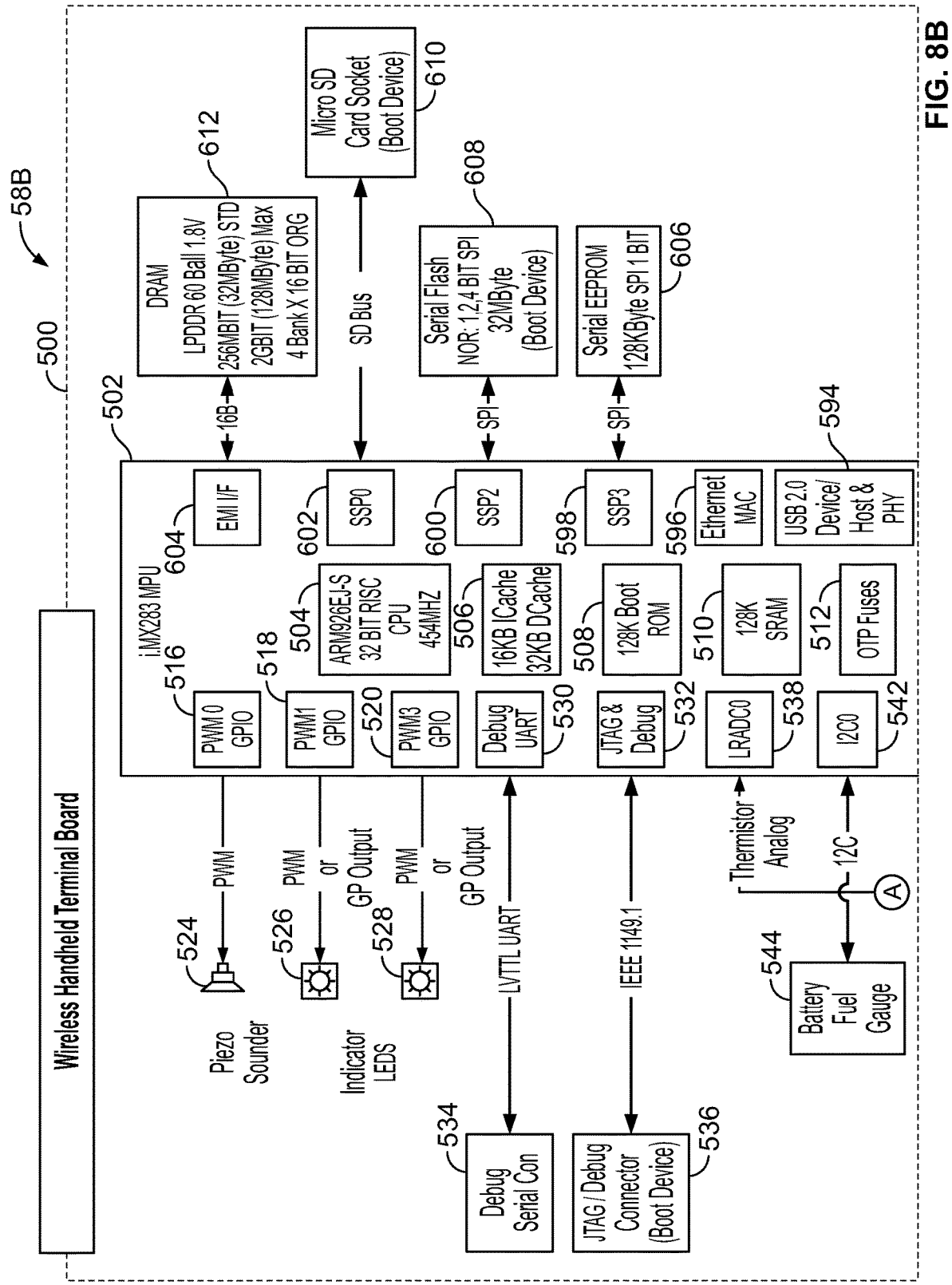
FIG. 8B is a block diagram showing electrical components of an optional wireless terminal of the present disclosure including a WiFi (802.11) radio module.
Figure 8B:
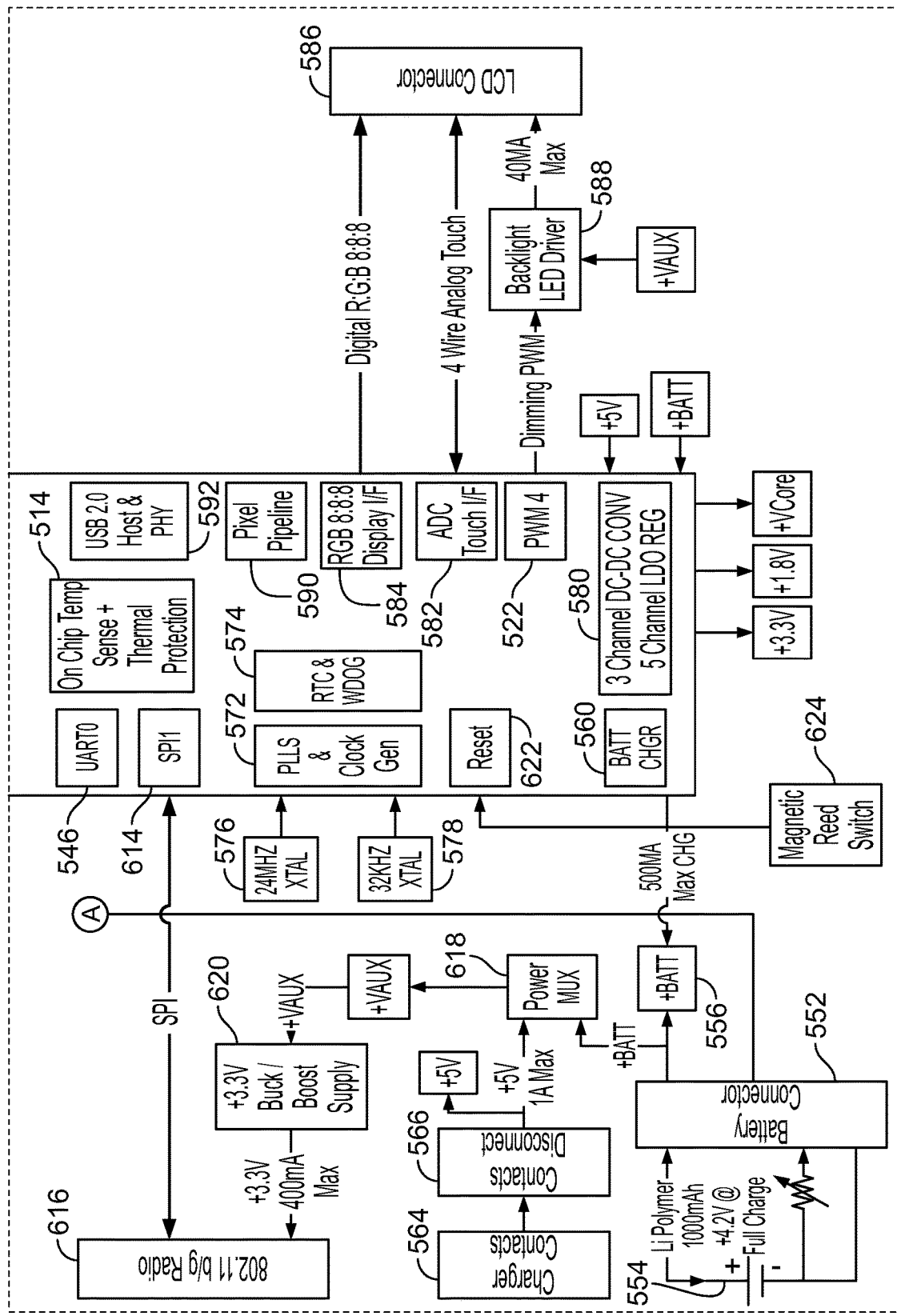

FIG. 8B is a block diagram showing electrical components of an optional wireless terminal 58*b* of the present disclosure including a "WiFi" (IEEE 802.11) radio module 616. The wireless terminal 58*b* of FIG. 8B is substantially similar to that of the wireless terminal 58*a* of FIG. 8A, but a WiFi radio is provided, as discussed below. In this regard, only the differences between the wireless terminal 58*b* of FIG. 8B and the wireless terminal 58*a* of FIG. 8A will be discussed. Similar components that have been discussed previously in connection with FIG. 8A are not repeated, but instead, reference is made to FIG. 8A for discussion of these like components which are labeled with like element numbers.

The terminal processor 502 of the wireless terminal 58*b* includes a serial peripheral interface (SPI) bus 614. The SPI bus 614 is connected with the radio module 616, which could comply with IEEE standards 802.11b, 802.11g, and/or 802.11n. The radio 616 allows the wireless terminal 58*b* to wirelessly communicate with the main panel motherboard 6, such that the wireless terminal processor 504 can receive data and commands from, and send data to, the MPP 8 when a radio frequency base station is engaged with the external RS-485 bus connector 14 of the main panel 12. Thus, the terminal processor 502 can receive data and commands from the MPP 8 and the MSP 30 by way of radio frequency communication. The wireless terminal PCB 550 includes a battery connector 552 that can have a battery 554 attached thereto. The battery 554 may be a lithium polymer rechargeable battery and/or may be removeable. The battery connector 552 is connected with a battery power connection 556 and a power multiplexer 618. The battery power connection 556 is connected with a battery charger 560 on the terminal processor 502. The power multiplexer 618 determines which power source should be utilized to power the radio 616, e.g., the battery 55 or a power supply connected to the charger contacts 564. The power mux 618 provides power to a buck/boost power supply converter 620, which directs power to the radio 616. The terminal processor 502 includes a reset 622 that is connected to a magnetic reed switch 624.

Figure 9:
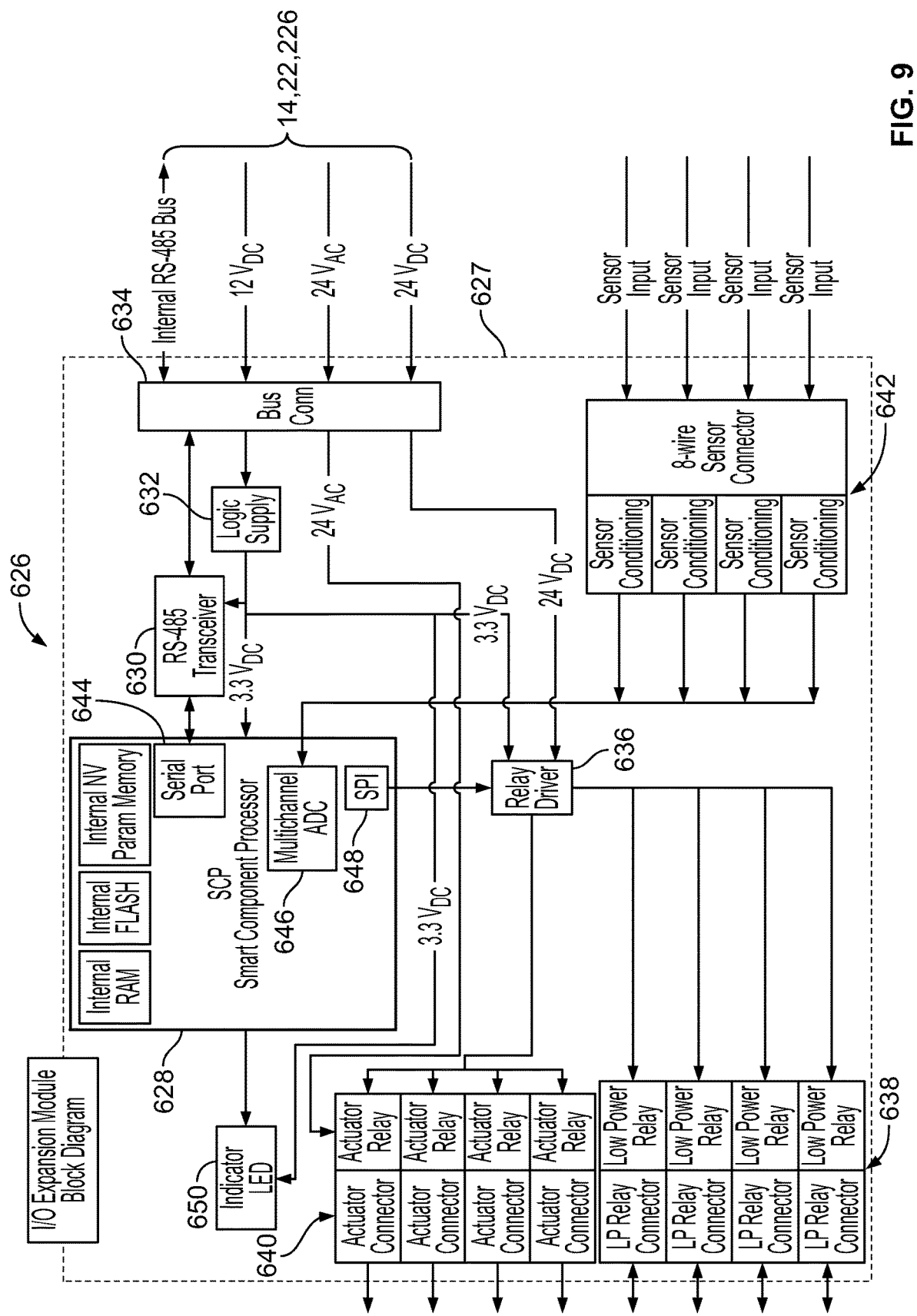
FIG. 9 is a block diagram showing electrical components of an input/output (I/O) expansion module of the present disclosure.

FIG. 9 is a block diagram of an input/output (I/O) expansion module 626 of the present disclosure. The I/O expansion module 626 is one sample expansion module that can be utilized with the system. The expansion modules are typically installed to upgrade the overall functionality of the control system 2. To this extent, the expansion modules can contain functionality that supplements functionality of the main control panel 4. For example, in some embodiments, the I/O expansion module 626 can provide an interface between legacy devices and the control system 2, third party manufacture's devices and the control system 2, an automatic pool cover and the control system 2, weather stations and the control system 2, etc. The I/O expansion module 626 could also provide communication bus expansion. The I/O expansion module 626 includes an I/O PCB 382 holding a smart component processor 628. The I/O PCB 627 includes an RS-485 transceiver 630 that is connected to a serial port 644 of the smart component processor 629. The RS-486 transceiver 630 receives 3.3 VDC from a logic supply 632, and is in two-way communication with the smart component processor 628 and a bus connector 634. The bus connector 634 allows the I/O PCB 627 to be connected to the expansion slot 20 of the main panel motherboard 6 or one of the expansion slots 188*a*-188*n* of the expansion panel motherboard 160, such that the bus connector 634 is in electrical communication with the wires 190*a*-190*n* of same. The bus connector 634 provides the logic supply 632 with 12 VDC, a relay driver 636 with 24 VDC, and the actuator relays of an actuator interface 640 with 24 VAC. The I/O expansion module 626 can include plastic supports or guides that facilitate connection with an expansion slot 20, 188*a*-188*n*. Generally, the expansion modules, e.g., I/O expansion module 626, will connect to a single expansion slot 20, 188*a*-188*n*, however, it is contemplated that particular expansion modules can be larger in size and/or can require additional wiring, and, as such, can be double-width expansion modules. These double-width expansion modules can connect to two expansion slots 20, 188*a*-188*n* in some instances, or simply can be larger such that they take up the space of multiple expansion slots 20, 188*a*-188*n*, but only connect to a single expansion slot 20, 188*a*-188*n*.

The relay driver 636 receives 24 VDC from the bus connector 634 and 3.3 VDC from the logic supply 632. The relay driver 636 is connected to a plurality of relay units 638 and the actuator interface 640. Each relay unit 638 includes a low power relay connector and a low power relay. The relay units 638 permit various low power devices to be connected to the low power relay connector such that the relay unit 638 switches operation of the connected device, e.g., a heater. The actuator interface 640 includes a plurality of actuator connectors and actuator relays, e.g., for operating valves, the actuator relays receiving 24 VAC from the bus connector 634. The actuator interface 640 permits various types of actuators to be connected to each actuator connector and controlled by the smart component processor 628. For example, the actuator can be a valve actuator. The relay driver 636 is in communication with a serial peripheral interface 648 of the smart component processor 628.

The I/O PCB 627 also includes a sensor interface 642 that includes at least one sensor connector, which can be 2-wire, 8-wire (as shown in FIG. 9), 10-wire, or 12-wire sensor connectors, receiving input from a sensor input. Each sensor connector is connected to a sensor conditioning unit that provides sensor signal conditioning, e.g., amplification and error correction, prior to transmitting the signal to a multi-channel analog to digital converter 646 of the smart component processor 628. Furthermore, the I/O PCB 627 could also include an indicator LED 650 that can designate various status/operating conditions of the I/O PCB 627 or devices connected thereto. The indicator LED 650 can be used to alert a user to warnings, occurrence of fault conditions, or general operating conditions, etc. Additionally, the smart component processor 628 could include internal non-volatile parameter memory, internal flash memory and internal RAM. The I/O expansion module 626 allows the number of actuators, relays and sensors connected to the main control panel 4 to be expanded. Specifically, the I/O expansion module 626 is connectable to the main control panel 4, thus adding additional actuator, relay, sensor, and other capabilities.

The I/O expansion module 626 can utilize the assignable relays 638, the actuator relays 640, and the sensors 642, to determine and effectuate an appropriate pool water turnover. For example, the control system 2 can calculate, e.g., from gallons or pool dimensions, a desired number of water changes and then control the pumps and valves connected to any of the relays 638 or the actuator relays 640 to deliver the desired water turnovers with the lowest power consumption/power cost. Additionally, the control system 2 can utilize user input or Internet downloads to determine variable power rates and determine if it is cheaper to turnover the water at night. Furthermore, the I/O expansion module 626 can include a smart grid feature where if the power company on the demand side can shut down filtration at a peak demand period the user will be alarmed to the situation.

The expansion modules are not limited to just an I/O expansion module 626, but instead, could be a chlorinator expansion module that allows for the further expansion of the chlorination capabilities of the control system 2. For example, a chlorinator expansion module can allow for an additional chlorinator ("T-cell") to be attached to the system. Alternatively, the expansion module can be an energy management module that includes an algorithm to operate connected devices in a "green mode" to optimize multiple sources of energy or sources of heat based on environmental sensing, Internet forecasting, wind magnitude and direction, electric or gas rates retrieved from the internet, user input, target temperatures, etc. The energy management module can determine pump speeds to minimize pump costs, but retain appropriate functionality, automatically shutoff devices when not used, or determine an energy bill alert for over usage of heaters or other features. In this regard, the energy management module can monitor or compute the electrical consumption of various connected devices based on known consumption and run time, and can provide real-time energy and periodic/historical usage of the devices. Alternatively, the energy management module can sense the mains wiring and determine actual load calculations therefrom. From these calculations the energy management module could learn the individual relay load based on calibration procedure or continuous calibration. Further, the energy management module can be used for increased filtration efficiency by taking the chlorination requirements, gallons of pool water, and hours entered, and calculate the turnover rate at the lowest possible speed to achieve the turnover rate. Additionally, the energy management module can send pool cover advice to the pool owner, shut down a water feature in high wind, select a best skimmer to utilize, or turn on a cleaner at a cost efficient time. The expansion modules can also be an SVRS expansion module where a non-SVRS pump is retrofit with an SVRS accessory, and the SVRS expansion module operates the SVRS accessory.

Additionally, the expansion module can be an auto-fill module that functions to keep the pool or spa full automatically and prevents the pool or spa from over-filling and any resulting cover damage. The auto-fill module can include a water level sensor and an attached water supply valve, such that the auto-fill module controls the valve based on the water level sensor and a predetermined upper and lower water level threshold. Further, the auto-fill module can be connected to an alarm that notifies the user, e.g., through an on-site alarm, wireless remote, mobile application, etc., when an over-fill or leaking pool is detected. To this extent, the auto-fill module can include trend monitoring that can show water usage trends over time, which can demonstrate that a leak is present, e.g., the auto-fill module is pumping in water more frequently than could normally occur due to water loss from evaporation, etc.

In another embodiment, the expansion module can be a music synchronization module that synchronizes associated lights, with an audio channel. Additionally, the pool or lights can include a microphone connected to the music synchronization module that allows the lights to be responsive to swimmer activity in the water. Further, the expansion module can be a water feature animation module that is connectable with fast-acting solenoid valves that can be used to drive a fountain, water jet, or other water feature. The water feature animation module includes software that is capable of sequencing the opening and closing, as well as volume and speed, of the solenoids based on a program. This can be a user-defined program, or can be responsive to or synchronized with a light show and/or sounds.

In still another embodiment, the expansion module can be a robotic cleaner management module that allows a robotic cleaner to be controlled by the control system 2.

Figure 10:
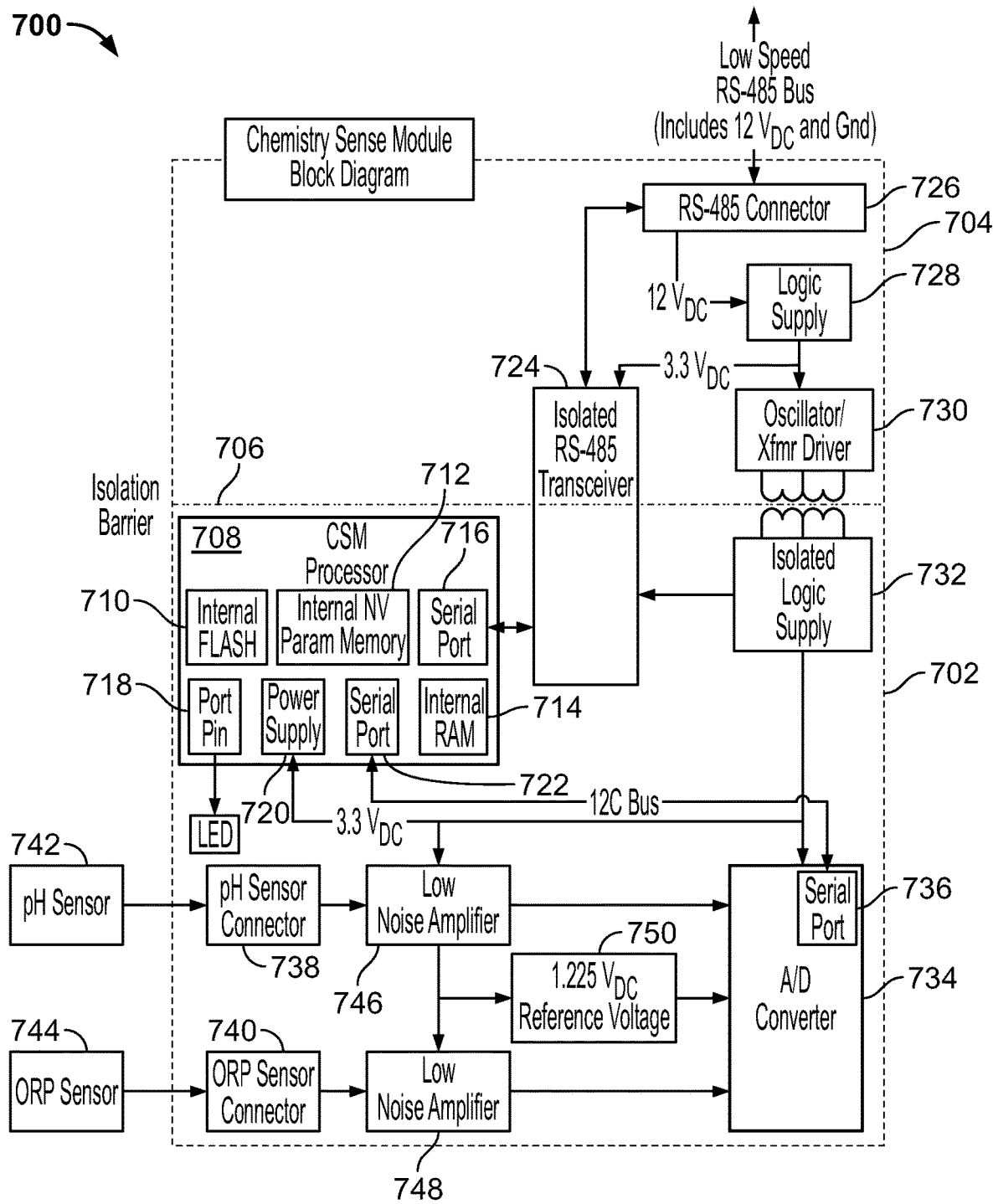
FIG. 10 is a block diagram showing electrical components of a chemistry sense module of the present disclosure.

FIG. 10 is a block diagram of a chemistry sense module 700 of the present disclosure. The chemistry sense module 700 can monitor/sense pool/spa chlorine and pH levels, and can adjust chemical feeding. The chemistry sense module 700 can be connected to, but located remotely from, the main panel 4. The chemistry sense module 700 is divided into a first section 702 and a second section 704 by an isolation barrier 706. The first section 702 includes a chemistry sense module processor 708. The chemistry sense module processor 708 includes internal FLASH memory 710, internal nonvolatile memory 712, and internal RAM 714. The chemistry sense module processor 708 also includes a first serial port 716, a port pin 718, a power supply port 720, and a second serial port 722. The first serial port 716 is connected with an isolated RS-485 transceiver 724 that extends across the first section 702 and the second section 704. The RS-485 transceiver 724 is connected with an RS-485 connector 726 and a logic supply 728, both located in the second section. The RS-485 connector 726 allows the chemistry sense module 700 to be connected to the low-speed RS-485 bus connector 22 of the main control panel 4. Thus, data, including instructions, and power can be transmitted between the chemistry sense module 700 and the main control panel 4. The logic supply 728 is connected with the RS-485 bus connector 726 and receives 12 VDC therefrom. The logic supply 728 provides 3.3 VDC to the RS-485 transceiver 724 and an oscillator/transformer driver 730. The RS-485 transceiver 724 sends and receives information from and between the chemistry sense module processor 708 and the RS-485 connector 726. The oscillator/transformer driver 730 receives 3.3 VDC from the logic supply 728 and inductively couples with an isolated logic supply 732 across the isolation barrier 706. The isolated logic supply 732 provides 3.3 VDC to the RS-485 transceiver 724, the power supply 720, and an analog-to-digital (A/D) converter 734. The analog-to-digital converter 735 includes a serial port 736 that connects with the serial port 722 provided on the chemistry sense module processor 708. This connection allows data to be transferred from the A/D converter 734 to the chemistry sense module processor 708. The first section 702 further includes a pH sensor connector 738, and an ORP sensor connector 740. A pH sensor 742 can be connected to the pH sensor connector 738, while an ORP sensor 744 can be connected to the ORP sensor connector 740. The pH sensor connector 738 is connected with a first low noise amplifier 746, which is provided with 3.3 VDC by the isolated logic supply 732. The first low noise amplifier 746 amplifies the signal provided by the pH sensor, and provides this amplified signal to the A/D converter 734. The first low noise amplifier is also connected with a second low noise amplifier 748 and a 1.225 VDC reference voltage 750. The second low noise amplifier 748 receives and amplifies a signal provided by the ORP sensor, and provides this amplified signal to the A/D converter 734. The 2.335 VDC reference voltage 750 provides a fixed voltage to the A/D converter 734. The parameters sensed by the pH sensor 742 and the ORP sensor 744 can be provided to the main control panel 4.

Figure 11:
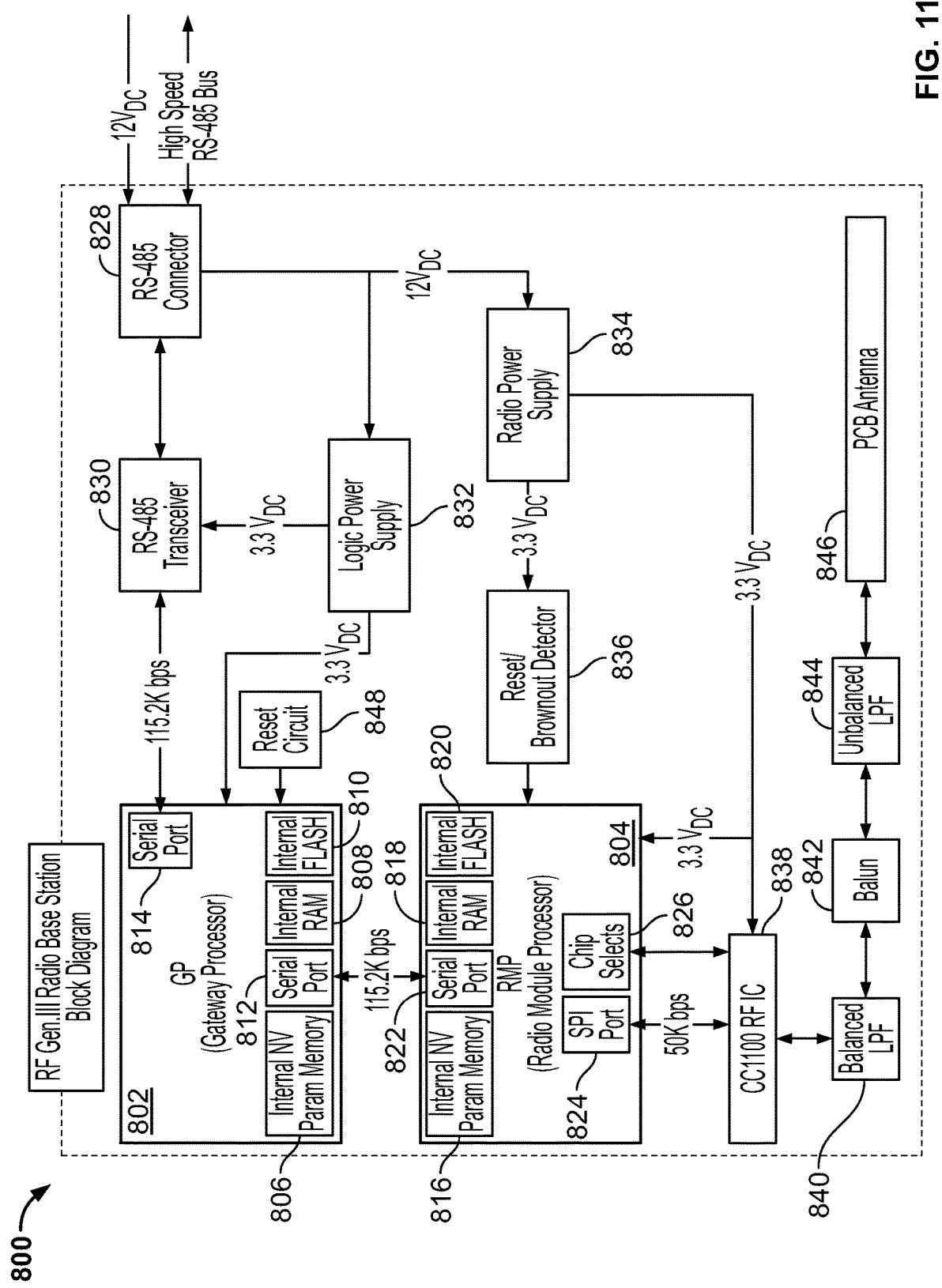
FIG. 11 is a block diagram showing electrical components of a radio base station of the present disclosure.

FIG. 11 is a block diagram of a radio frequency (RF) base station 800 of the present disclosure. The RF base station 800 is connectable to a panel, e.g., a main panel 4 or an expansion panel 54, and allows the connected panel to communicate with a wireless communication device. The RF base station 800 includes a gateway processor 802 and a radio module processor 804. The gateway processor 802 includes internal nonvolatile memory 806, internal RAM 808, and internal FLASH memory 810. The gateway processor 802 also includes a first serial port 812 and a second serial port 814.

The radio module processor 804 includes internal nonvolatile memory 816, internal RAM 818, and internal FLASH memory 820. The radio module processor 804 also includes a serial port 822, a serial peripheral interface (SPI) bus port 824, and a chip select control line 826. The first serial port 812 of the gateway processor 812 is connected with the serial port 822 of the radio module processor 804, such that the gateway processor 812 and the radio module processor 804 are in communication.

The RF base station 800 includes an RS-485 connector 828 that is connected with an RS-485 transceiver 830, a logic power supply 832, and a radio power supply 834. The RS-485 connector 828 allows the RF base station 800 to be connected to the external high-speed RS-485 bus connector 14 of the main control panel 12, such that the RF base station 800 can communicate with the MPP 8. RS-485 transceiver 830 sends and receives information from and between the gateway processor 814 and the MPP 8. The RS-485 connector receives 12 VDC from the external high-speed RS-485 bus connector 14, and provides the logic power supply 832 and the radio power supply 834 with 12 VDC. The logic power supply 832 provides the gateway processor 812 and the RS-485 transceiver 830 with 3.3 VDC. The radio power supply 834 provides the radio module processor 804, a reset/brownout detector 836, and a radio frequency integrated circuit 838 with 3.3 VDC. The reset/brownout detector 836 is connected with the radio module processor 804 and detects a drop in voltage being provided to the radio frequency base station 800. The radio frequency integrated circuit 838 is connected with the SPI bus port 824 and the chip select control line 826 of the radio module processor 804. The radio frequency integrated circuit 838 is connected with a balanced low-pass filter 840. The balanced low-pass filter 840 is connected with a balun 842, which is connected with an unbalanced low-pass filter 844. The unbalanced low-pass filter 844 is connected with a PCB antenna 846. The PCB antenna 846 transmits and receives information utilizing radio waves. The PCB antenna 846 can transmit and receive information from, for example, the wireless terminal 58a of FIG. 8A that incorporates a radio module or the wireless terminal 58b of FIG. 8B that incorporates an 802.11 radio module. When the radio base station 800 is connected with the main control panel 12, the main control panel 12 can receive and transmit information from external wireless sources. This information can be control information, but can also be status updates, sensor information, and programming instructions.

The RF base station 800 could be a radio frequency hopping spread spectrum radio operating in a suitable band of 902 MHz to 928 MHz. Further, the processing power of the wired interface, which connects to the system bus and allows the RF base station 800 to be discovered and communicate as a smart component, can be increased to accommodate an increased capacity of the RF interface if desired.

Figure 12:
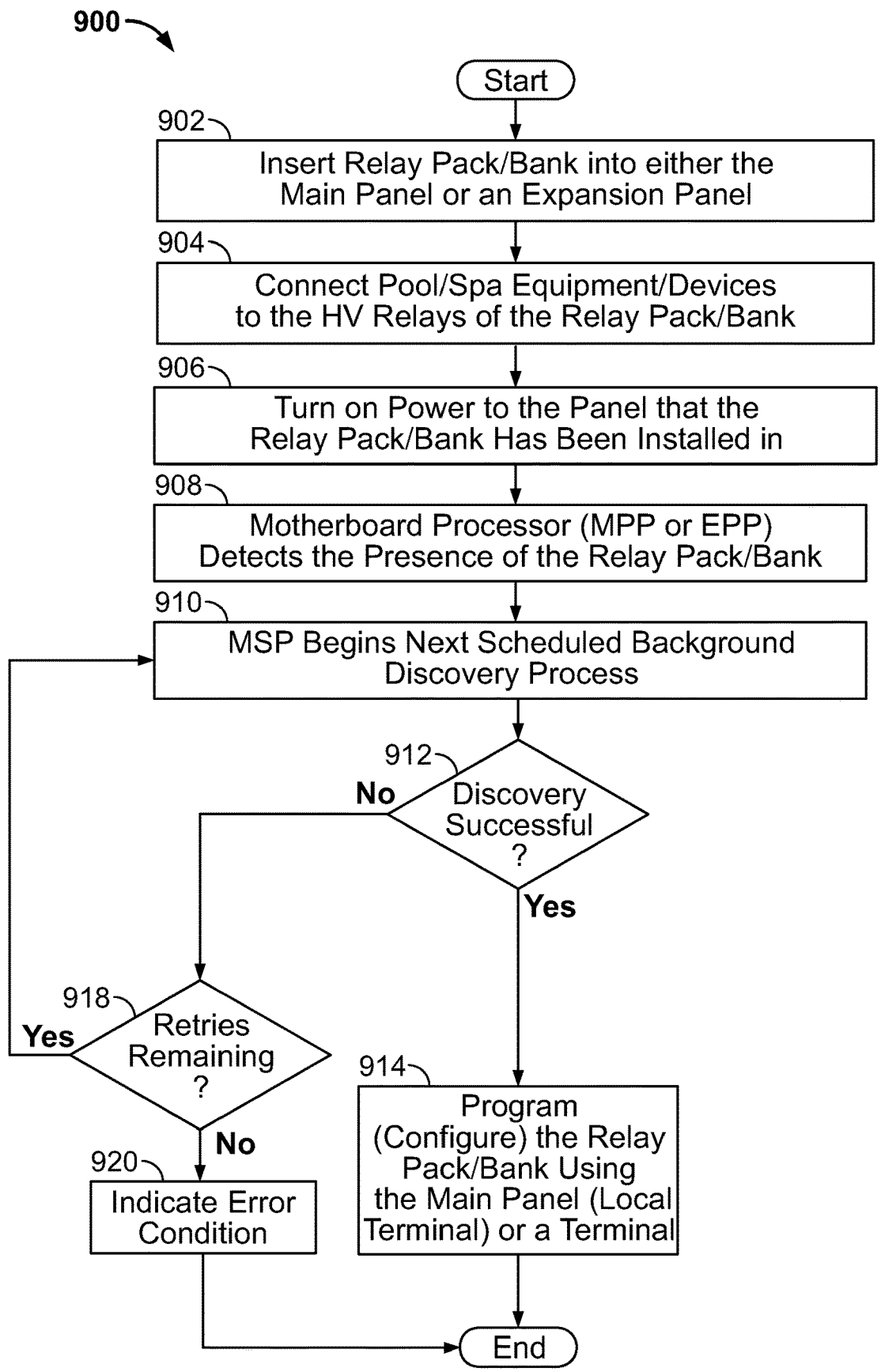
FIG. 12 is a flow chart showing steps for installing and programming a programmable modular relay pack of the present disclosure.

FIGS. 12-16 are flow charts showing the steps for installing and programming programmable modular relay packs/banks, smart components, and expansion panels of the present disclosure. FIG. 12 shows a modular relay pack installation flow chart 900 indicating steps for installing and configuring a relay pack/bank. In step 902, a relay pack/bank is inserted into a relay pack/bank socket of the main panel, or the expansion panel, to incorporate the programmable modular relay pack/bank into the pool or spa system controller when the control panel is powered down. In step 904, pool/spa equipment and devices are connected to the high voltage relays of the relay pack/bank. The control panel that the relay pack/bank has been inserted into is turned on in step 906. In step 908, the respective panel processor, e.g., the main panel processor or the expansion panel processor, detects the presence of the relay pack/bank. In step 910, the MSP begins the next scheduled background discovery process to discover the relay pack/bank. In step 912, it is determined if the discovery was successful, e.g., if the relay pack/bank was successfully discovered. If the relay pack/bank is discovered, then in step 914 the relay pack/bank, e.g., each relay of the relay pack/bank, is programmed and/or configured for particular operations using the local terminal, handheld remote control unit, wired control unit, wireless device, and/or the remote terminal. During programming in step 914, the relays are mapped to the devices such that a user can easily determine what relay is associated with what device. Alternatively, if during step 912 the relay pack/bank is not discovered, the MSP determines if there are remaining discovery retries at step 918. If there are remaining retries, the system returns to step 910 and reattempts discovery. However, if there are no remaining retries, the discovery process moves to step 920 where an error condition is indicated and the installation procedure ends. The amount of times the MSP retries discovery can be factory set, or can be a setting that a user can alter at the local terminal.

Figure 13:
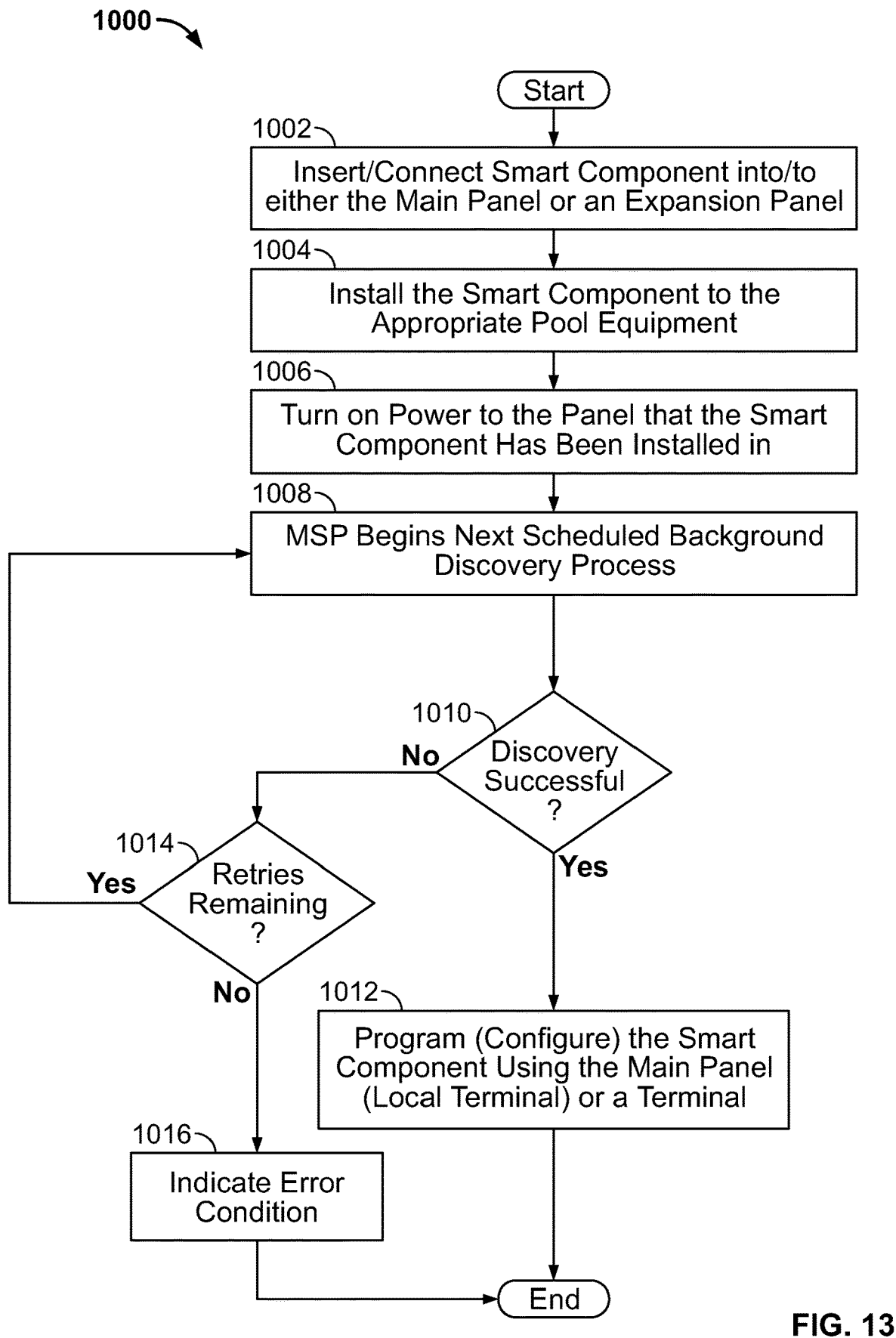
FIG. 13 is a flowchart showing steps for installing and programming a smart component of the present disclosure.

FIG. 13 is a flow chart 1000 showing steps for installing and integrating a smart component with the main panel or the expansion panel. In step 1002, a smart component is inserted into or connected to either the main panel, or the expansion panel, to incorporate the smart component into the pool or spa system controller when the control panel is powered down. The smart component can, for example, be connected with the low-speed external RS-485 bus connector 22 of the main control panel 4. In step 1004, the smart component is installed to the appropriate pool equipment and secures the component to a pool pad if necessary. For example, if the smart component is a variable speed pump, the pump may be connected to the necessary piping and bolted to the pool pad. In step 1006, the control panel into which the smart component has been inserted is turned on. In step 1008, the MSP begins the next scheduled background discovery process. In step 1010, it is determined whether the discovery was successful, e.g., if the smart component was successfully discovered. If the smart component is discovered, then in step 1012 the smart component is programmed and/or configured for particular operations using the local terminal, handheld remote control unit, wired control unit, wireless device, and/or the remote terminal. Alternatively, if during step 1010 the smart component is not discovered, the MSP determines if there are remaining discovery retries at step 1014. If there are remaining retries, the system returns to step 1008 and reattempts discovery. However, if there are no remaining retries, the discovery process moves to step 1016 where an error condition is indicated and the installation procedure ends. The amount of times the MSP retries discovery can be factory set, or can be a setting that a user can alter at the local terminal.

Figure 14:
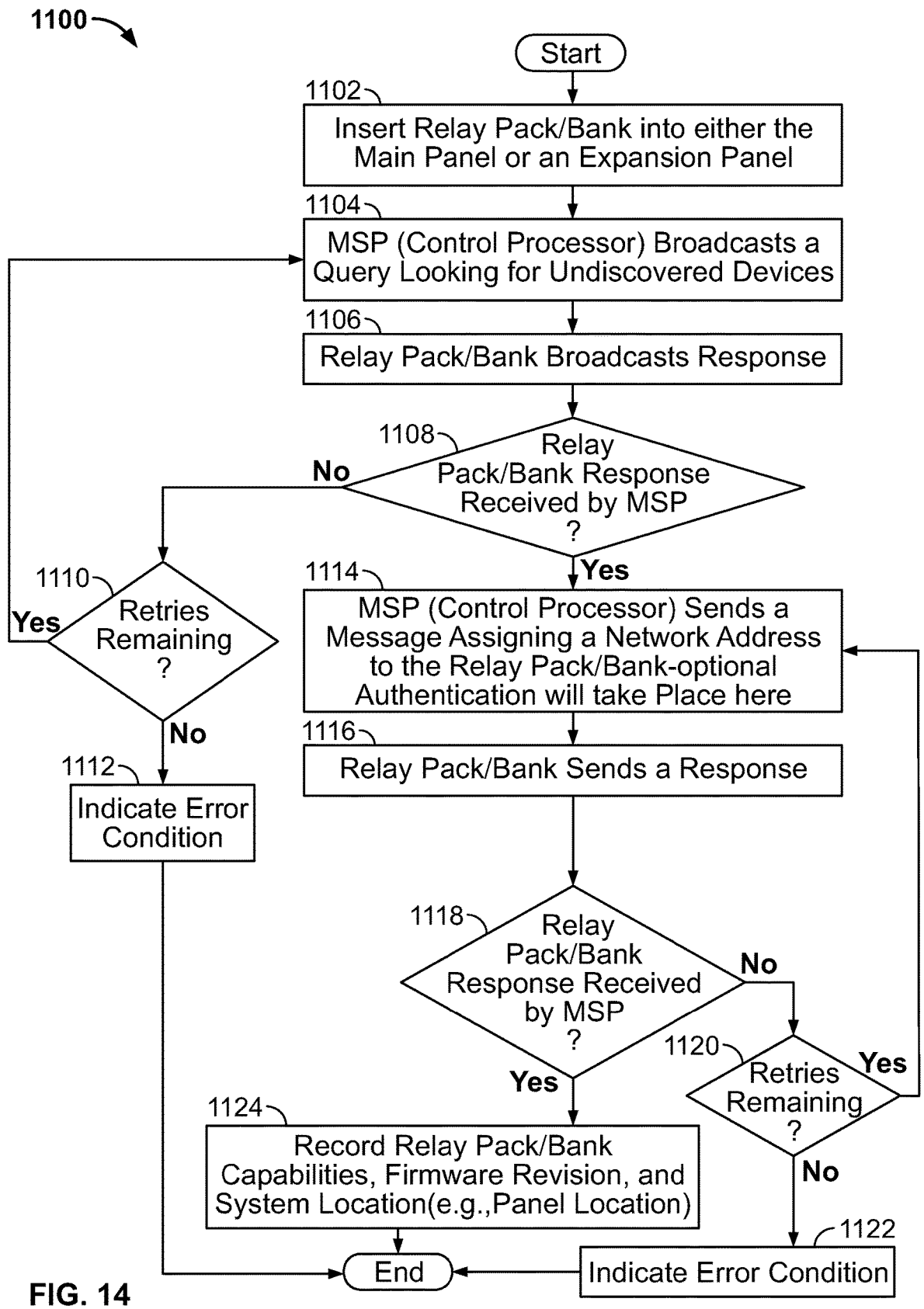
FIG. 14 is a flowchart showing steps for discovering a single relay bank of the present disclosure.

FIG. 14 is a flow chart 1100 showing the installation of a relay pack/bank to a main panel or an expansion panel of an existing system. In step 1102, a relay pack/bank is inserted into a relay pack/bank socket of the main panel, or the expansion panel, to incorporate the programmable modular relay pack/bank into the pool or spa system controller. When inserted, the MSP can detect the presence of the relay pack/bank. In step 1104, the MSP broadcasts a query across the system looking for undiscovered devices. In step 1106, the newly inserted relay pack/bank broadcasts a response. In step 1108, it is determined if the relay pack/bank response broadcast was received by the MSP. If the relay pack/bank response broadcast is not received by the MSP, then the MSP determines if there are remaining discovery retries at step 1110. If there are remaining retries, the system returns to step 1104 and rebroadcasts the query for undiscovered devices. If there are no remaining retries, the discovery process moves to step 1112 where an error condition is indicated and the discovery procedure ends. The amount of times the MSP retries discovery can be factory set, or can be a setting that a user can alter at the local terminal. However, if the MSP receives the response from the relay pack/bank in step 1108, the process moves to step 1114 where the MSP sends a message to the relay pack/bank assigning it a network address. Additionally, in step 1114, the MSP can authenticate the relay pack/bank that was discovered. In step 1116, the relay pack/bank sends a response message to the MSP. The relay pack/bank response message can include affirmation of network address assignment as well as a information regarding the relay pack/bank, e.g., capabilities, firmware revision, location, etc. In step 1118, it is determined if the relay pack/bank response broadcast was received by the MSP. If the relay pack/bank response broadcast is not received by the MSP, then the MSP determines if there are remaining discovery retries at step 1120. If there are remaining retries, the system returns to step 1114 and resends the message to the relay pack/bank. If there are no remaining retries, the discovery process moves to step 1122 where an error condition is indicated and the discovery procedure ends. If the relay pack/bank response broadcast is received by the MSP begins to record the information received from the relay pack/bank. That is, in step 1124 the MSP records the relay pack/bank capabilities, firmware revision, and system location, e.g., which panel the relay pack/bank is physically located in. The relay pack/bank is now fully functional and programmable using the local terminal, handheld remote control unit, wired control unit, wireless device, and/or the remote terminal.

Figure 15:
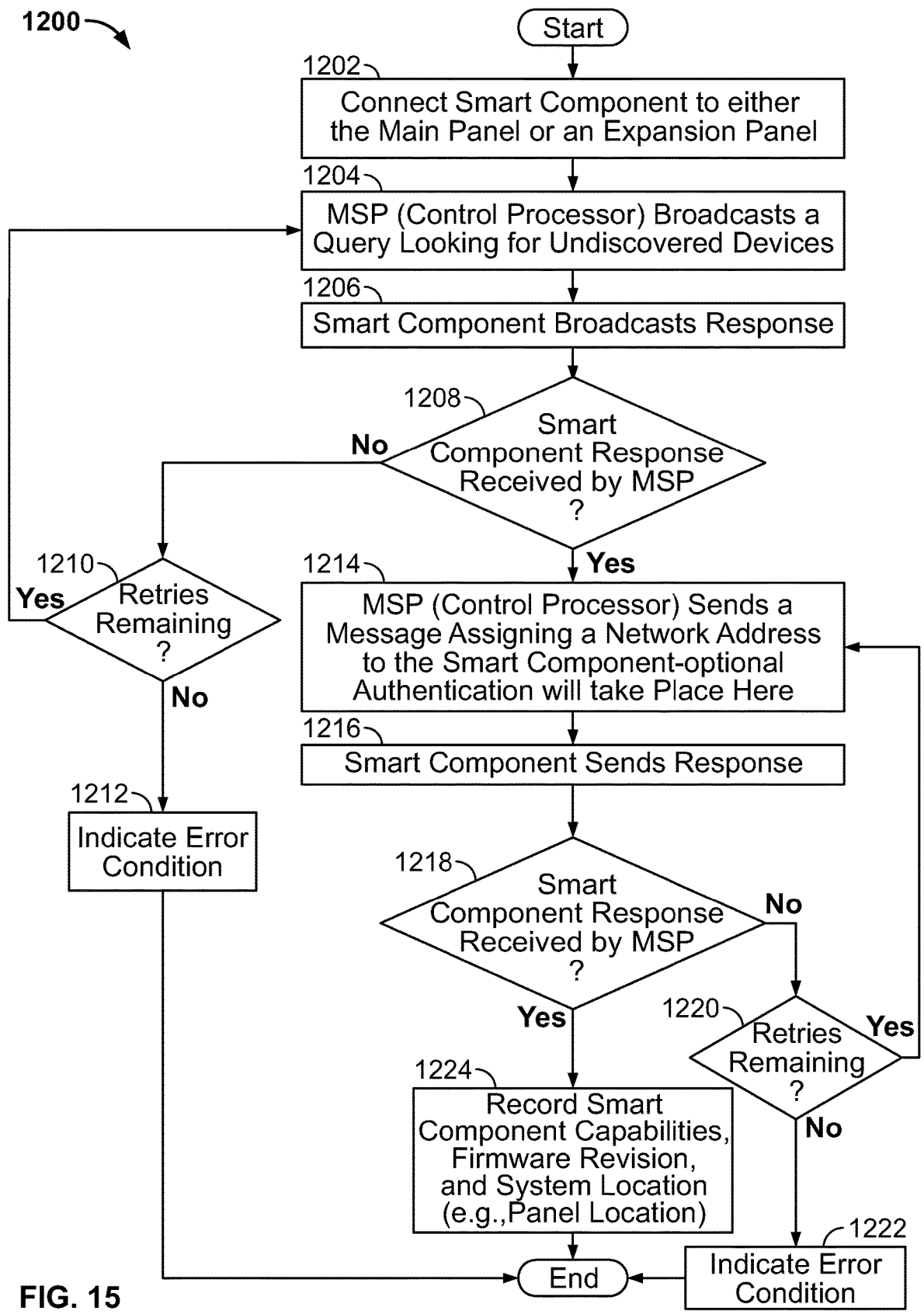
FIG. 15 is a flowchart showing steps for discovering a single smart component of the present disclosure.

FIG. 15 is a flow chart 1200 showing steps for installing a smart component to a main panel or an expansion panel of an existing system. In step 1202, a smart component is inserted into or connected to either the main panel, or the expansion panel, to incorporate the smart component into the pool or spa system controller. In step 1204, the MSP broadcasts a query across the system looking for undiscovered devices. In step 1206, the newly connected smart component broadcasts a response. In step 1208, it is determined if the smart component response broadcast was received by the MSP. If the smart component response broadcast is not received by the MSP, then the MSP determines if there are remaining discovery retries at step 1210. If there are remaining retries, the system returns to step 1204 and rebroadcasts the query for undiscovered devices. If there are no remaining retries, the discovery process moves to step 1212 where an error condition is indicated and the discovery procedure ends. The amount of times the MSP retries discovery can be factory set, or can be a setting that a user can alter at the local terminal. If the MSP receives the response from the smart component in step 1208, the process moves to step 1214 where the MSP sends a message to the smart component assigning it a network address. Additionally, in step 1214, the MSP can authenticate the smart component that was discovered. In step 1216, the smart component sends a response message to the MSP. The smart component response message can include affirmation of network address assignment as well as a information regarding the smart component, e.g., capabilities, firmware revision, location, etc. In step 1218, it is determined if the smart component response broadcast was received by the MSP. If the smart component response broadcast is not received by the MSP, then the MSP determines if there are remaining discovery retries at step 1220. If there are remaining retries, the system returns to step 1214 and resends the message to the smart component. If there are no remaining retries, the discovery process moves to step 1222 where an error condition is indicated and the discovery procedure ends. However, if the relay smart component broadcast is received by the MSP begins to record the information received from the smart component. That is, in step 1224 the MSP records the smart component capabilities, firmware revision, and system location, e.g., which panel the relay pack/bank is physically located in. The smart component is now fully functional and programmable using the local terminal, handheld remote control unit, wired control unit, wireless device, and/or the remote terminal.

Figure 16:
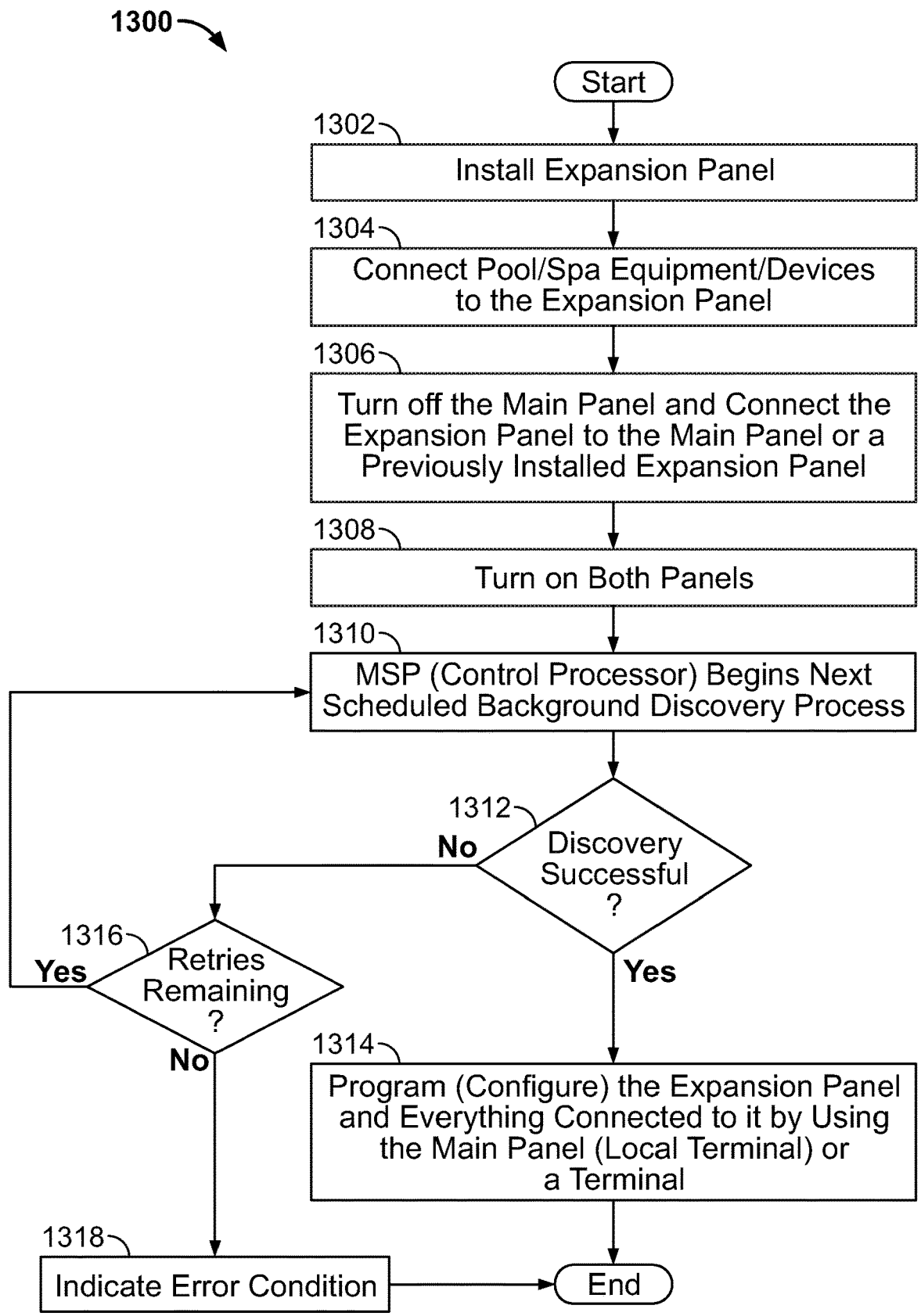
FIG. 16 is a flowchart showing steps for installing and programming an expansion panel of the present disclosure.

FIG. 16 is a flow chart 1300 showing steps for installing an expansion panel. In step 1302, an expansion panel is installed at a desired and/or appropriate location, e.g., in the vicinity of a pool or on a pool pad. In step 1304, the desired pool/spa equipment/devices are connected to the expansion panel. In step 1306, the main panel is turned off and the expansion panel is connected to the main panel or a previously installed expansion panel. The expansion panel can be connected to, for example, the external high-speed R-485 bus connector 14 of the main control panel 4. In step 1308, the control panel that the smart component has been connected to is turned on. When connected, the MPP can detect the presence of the expansion panel. In step 1310, the MSP begins the next scheduled background discovery process. In step 1312, it is determined if the discovery was successful, e.g., if the expansion panel was successfully discovered. If the expansion panel is discovered, then in step 1314 the expansion panel and all equipment/devices connected thereto are programmed and/or configured for particular operations using the local terminal, handheld remote control unit, wired control unit, wireless device, and/or the remote terminal. At this point, installation is complete. Alternatively, if during step 1312 the expansion panel is not discovered, the MSP determines if there are remaining discovery retries at step 1316. If there are remaining retries, the system returns to step 1310 and reattempts discovery. However, if there are no remaining retries, the discovery process moves to step 1318 where an error condition is indicated and the installation procedure ends. The amount of times the MSP retries discovery can be pre-set, or can be a setting that a user can alter at the local terminal.

Once a relay pack/bank, smart component, and/or expansion panel is successfully installed, the central processor stores all information related thereto, e.g., network addresses, locations, capabilities, firmware, etc., so that the installed relay pack/banks, smart components, and expansion panels do not need to be re-discovered each time the control system 2 is turned off or experiences a fault condition.

The control system 2 can be configured to control multiple bodies of water, with each body of water having its own associated equipment such as a filter, pump, chlorinator, chemistry sense unit, and multiple dedicated heaters, for example. For example, a recreational facility can have five bodies of water to be controlled, each of which is capable of being programmed into the control system 2. Further, multiple bodies of water can be grouped as a dual equipment subset, e.g., a baby pool and a wading pool at a recreational facility. Additionally, multiple configurations of a pool/spa arrangement can be set up. Sample configurations include: pool only, spa only, pool and spa sharing single equipment, pool and spa with separate equipment and separate heaters, pool and spa with separate equipment and shared heaters, etc. Various permutations of the above configurations are also possible for those situations where there are 3 or more bodies of water. The pool configurations can be specified by a user through the GUI and the control system 2 itself, or can be prepared on the manufacturer website and downloaded to the control system 2 via the Internet or a USB memory stick. In all instances, the pool configuration file can be stored in persistent memory in the control panel 4.

To the extent that there are multiple bodies of water, there can be a requirement for multiple separate chlorinators with each chlorinator servicing an individual body of water. In these situations, a user could provide a plurality of expansion panels 54 in electrical connection with the main control panel 4 with each chlorinator connected to a respective expansion panel 54. For example, if a pool/spa has 5 independent bodies of water, a user can provide a main control panel 4, a first expansion panel 54 connected to the expansion slot 20 of the main control panel 4, and three additional expansion panels 54 connected to each one of the expansion slots 188a-188c of the first expansion panel 54. In this arrangement, the main control panel 4 allows for one chlorinator to be attached thereto, while each of the four additional expansion panels 54 allow one chlorinator to be attached to each, resulting in 5 chlorinators for the entire system. Furthermore, where a body of water is sufficiently large enough, a user can program multiple chlorinators to operate on the single body of water.

A user can also name each relay that is discovered by the main panel processor 8, or each relay can be named from a pre-defined list of names. Also, a user can set-up timer operations that can be assigned to any relay, valve, light show, group, or mode of the system. Each device can have multiple on/off timers assigned thereto, with each timer allowing for the specification of standard settings (e.g., every day, weekday only, weekend only, etc.), a list of days of the week, and/or time-periods (e.g., 6 a.m. to 6 p.m., dusk to dawn, dusk to countdown, dawn to countdown, etc.). The timers can have a 1 minute resolution such that the user can specify the timer in increments of 1 minute.

As discussed previously, the control system 2 is capable of controlling various devices associated with a pool/spa, including, but not limited to: heaters, chemistry sense and dispense systems, variable speed pumps, and lights. When a heater is connected to the control system 2 along with a variable speed pump, the control system 2 will permit a user to specify a minimum pump speed for optimal heater functionality. Alternatively, where sensors are installed with the system, including at the input and output of the heater and the variable speed pump, the control system 2 could determine the minimum pump speed for optimal heater functionality and could vary the speed of the pump to maintain an efficient temperature rise in the pool/spa. This could be presented as an option to the user. The control system 2 can also include energy management algorithms, as discussed previously, and heater control algorithms that can prioritize heating elements. For example, where there are solar collectors connected to the pool/spa system for solar heating, the control system 2 can execute an algorithm that will give priority to solar heating, and pump pool water through the solar collectors, when possible. This solar heat control can involve the control system 2 controlling a valve to send water to the solar collectors and/or the selection of a relay to operate a booster pump to send water to the panels. Additionally, the control system 2 can be programmed to determine the minimum flow requirements for the solar collectors, and operate a variable speed pump at the required speed. The control system 2 can also be able to operate the solar collectors in a nocturnal cooling mode where water is pumped through the solar collectors at night if the temperature in the solar collectors is less than the pool temperature by a specified minimum temperature difference. Similarly, the control system 2 can be utilized for pool cooling. This operation could involve the control system 2 automatically controlling an aerator, which can be done as a timed control of a valve and control of a heat pump that supports cooling. Where a heat pump is utilized, it can be switched from heating to cooling mode.

The control system 2 permits separate and independent chemistry sense or chemistry sense and dispense systems for each body of water that can be configured in the pool/spa system. The chemistry sense system can be implemented via a chemistry sense module, discussed previously, which includes two probe inputs, namely, a pH probe and an oxidation reduction potential probe. The chemistry dispense system can be implemented via a high voltage relay that could be used to control a $CO_2$ gas flow or an acid pump. For a body of water that includes a chemistry sense module, a chlorinator, and a pH dispense, the firmware of the control system 2 could allow configuration of a pH control mode (e.g., disabled, automatic, forced on with a time limit) and an oxidation reduction potential control mode (e.g., automatic or timed percentage). Additionally, the firmware could allow the user to select both a pH and an oxidation reduction potential set point and high/low alarms. Alternatively, for a body of water that includes a chemistry sense module, and a chlorinator, but not a pH dispense feature, the firmware of the control system 2 could display the pH reading when there is flow, and allow configuration of an oxidation reduction potential control mode (e.g., automatic or timed percentage). Additionally, the firmware could allow the user to select an oxidation reduction potential set point and high/low alarms. The control system 2 can also allow the user to input different set points, alarm levels, and timeout levels for each body of water that safeguard against making the water too acidic or too highly chlorinated.

The control system 2 is capable of communicating with the main panel RS-485 bus connectors 14, 22, the expansion panel RS-485 bus connectors 226, and/or the relay pack relays 56a-56d. The control system 2 firmware is capable of controlling the operation speed of a variable speed pump, and can provide a menu for the variable speed pump that could be displayed on the GUI of the local terminal 28, a handheld remote control unit 58a, 58b, or a wireless device 61. The menu can show various operating parameters of the variable speed pump, such as operating speed (both in revolutions per minute (RPM) and percentage of maximum), current power output, current power usage, etc. Furthermore, the firmware can display all alarm indications generated by the pump on the GUI of the local terminal 28, a handheld remote control unit 58a, 58b, or a wireless device 61.

The control system 2 is capable of controlling various lights and lighting protocols, e.g., COLORLOGIC underwater pool/spa lights produced by Hayward Industries, Inc., including both networked and non-networked lights. The control system 2 can control the lights by automating the power sequencing of the control relay to which the lights are connected. Multiple lights can be connected to a single relay such that the control system 2 controls a plurality of lights through the single relay. The control system 2 firmware is capable of providing a simple control system that can include a menu system. The simple control and or menu system can be displayed on the GUI of the local terminal 28, a handheld remote control unit 58a, 58b, or a wireless device 61, and can implement sliders and other graphical representations to allow a user to more easily select custom colors and lighting schemes.

The firmware of the control system 2 can also provide interlocks and freeze protection to a variety of devices that can be connected thereto. The firmware allows the user to select and configure interlocks that prevent any output from changing state unless the interlocking condition is corrected. The firmware provides an interface that allows the user to configure a freeze protect temperature for the system.

The control system 2 includes a GUI that can be replicated at each device connected to the control system 2 (e.g., a local terminal 28, a handheld remote control unit 58a, 58b (wireless or wired), a wireless device 61 (smart phone/table), a website accessible by the Internet, or a locally-served web page accessible by a computer) and used for controlling the control system 2. The GUI can include a "home page" having multiple icons representing different actions, or predefined controls, of the pool/spa system. These icons can represent individual devices, e.g., lights or valves, or can be a full pre-defined set of actions/control parameters, e.g., a full light and water fountain show. A user can create custom icons/buttons representing his/her "favorites" or most utilized actions. The user can place these favorite icons on the home page and rearrange the icons so that they are placed in a desired location on the screen. Additionally, the GUI can include alarm notification capabilities, such that when an alarm condition occurs, the appropriate icon representing the device producing the alarm condition can be moved to a more visible location on the GUI so that it is viewed by the user. The alarm notification can be a blinking red (representing an alarm condition) or orange (representing a warning condition) light or glow surrounding the icon, and/or can be a red or orange glow surrounding the perimeter of the GUI or on a single side of the GUI. Additionally, a user can customize the alarm notification system so that the control system 2, when connected to the Internet, e-mails the user the alarm notification or posts the alarm notification on a social networking (e.g., Twitter) account owned by the user. The firmware can also include a diagnostics menu that illustrates any failed components diagnostics, e.g., which relay, actuator, board, sensor, etc. failed.

Figure 17A:
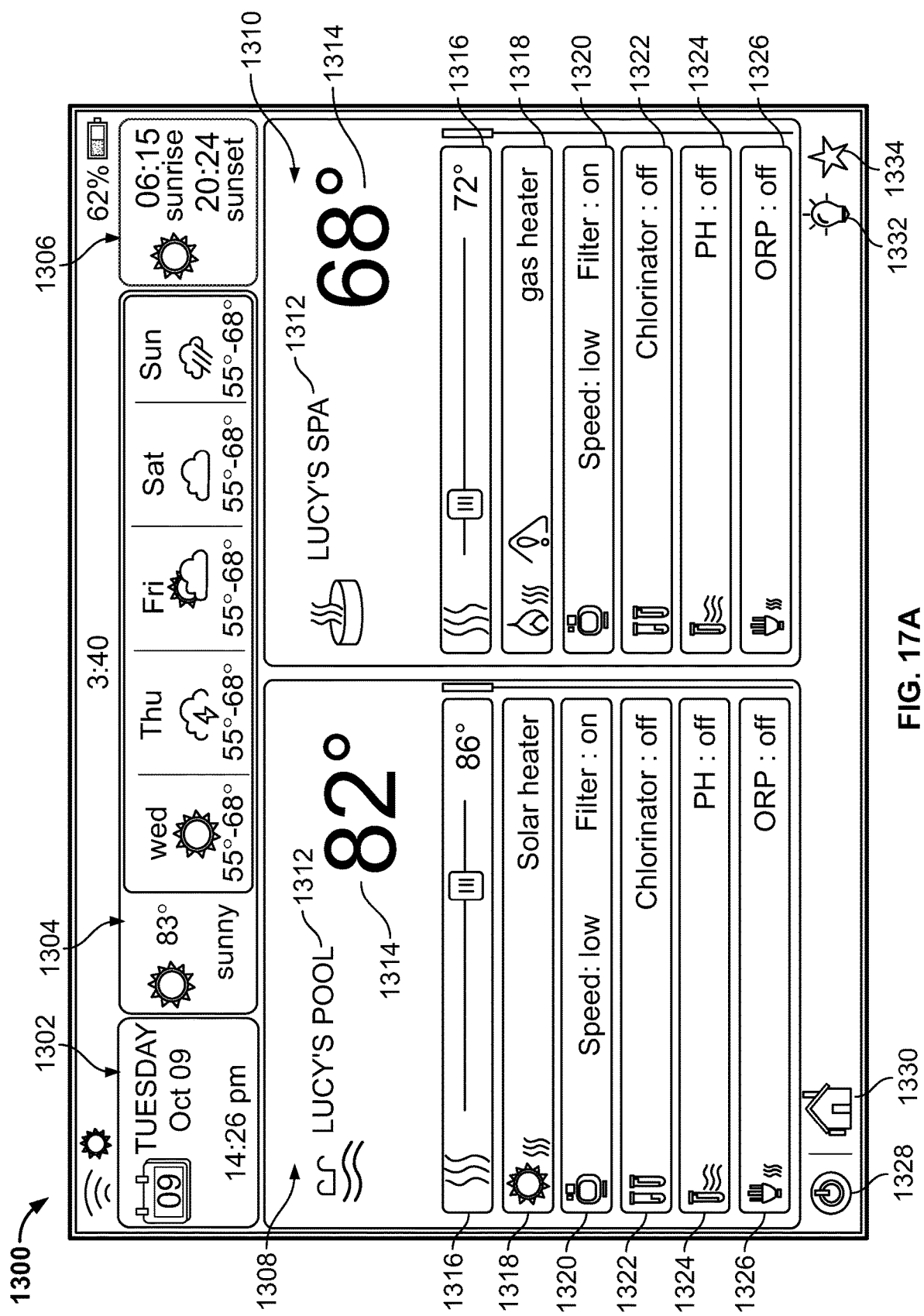
FIG. 17A is a graphical user interface (GUI) "home" screen generated by the system for allowing a user to control multiple pool/spa systems.

FIG. 17A is a GUI 1300 generated by the system for allowing a user to control multiple pool/spa systems, using a home screen. The GUI 1300 is divided into a plurality of sections including a date and time section 1302, a weather report section 1304, a sunrise/sunset section 1306, a first body of water control section 1308, and a second body of water control section 1310. The first and second body of water control section 1308, 1310 represent the pool/spa systems that are connected with a main control panel. The control sections 1308, 1310 include a title 1312 that is user-assignable during configuration and denotes what system each control section respectively controls. Here, the first body of water control section 1308 is titled "LUCY'S POOL" while the second body of water control section 1310 is titled "LUCY'S SPA." The control sections 1308, 1310 also include a current water temperature 1314 of the respectively controlled system. Further, the control sections 1308, 1310 include a plurality of control bars that allow control of various devices connected to each respective system. The control bars include, for example, a temperature control slide bar 1316, a heater source control bar 1318, a filter control bar 1320, a chlorinator control bar 1322, a pH control bar 1324, and an ORP control bar 1326. The temperature control bars 1316 allow a user to the temperature they want the respective body of water to be. As shown in FIG. 17A, the temperature control bars 1316 can be a slide bar; however, they may also be in the form of up/down arrows, or a value input box. The heater source control bar 1318 allows a user to select between a plurality of heater sources that are connected to the system. For example, the heater source control bar 1318 for the first body of water control section 1308 is set for a solar heater, while the heater source control bar 1318 for the second body of water control section 1310 is set for a gas heater. When a user clicks on the heater source control bar 1318, a drop down menu may appear that allows the user to select from all of the heat sources connected to the system. This drop down menu can be automatically updated each time the system discovers a new heat source. The filter control bar 1320 allows a user to set the speed of a filter pump as well as turn the filter on/off. Similarly, the chlorinator control bar 1322, pH control bar 1324, and ORP control bar 1326 allow a user to turn on or off a respective chlorinator, pH dispense system, and ORP system that is connected with the main control panel. When a device is powered off, the respective control bar may turn a different color, or fade to gray, to allow quick recognition of which devices are off. The GUI 1300 can also include a power button 1328, a home button 1330, a pool light control button 1332, and an alarm viewing button 1334. The power button 1328 allows a user to close the GUI 1300 and return to the normal device screen, while the home button 1330 allows a user to return to the home GUI screen, which may be the screen illustrated in FIG. 17A.

Figure 17B:
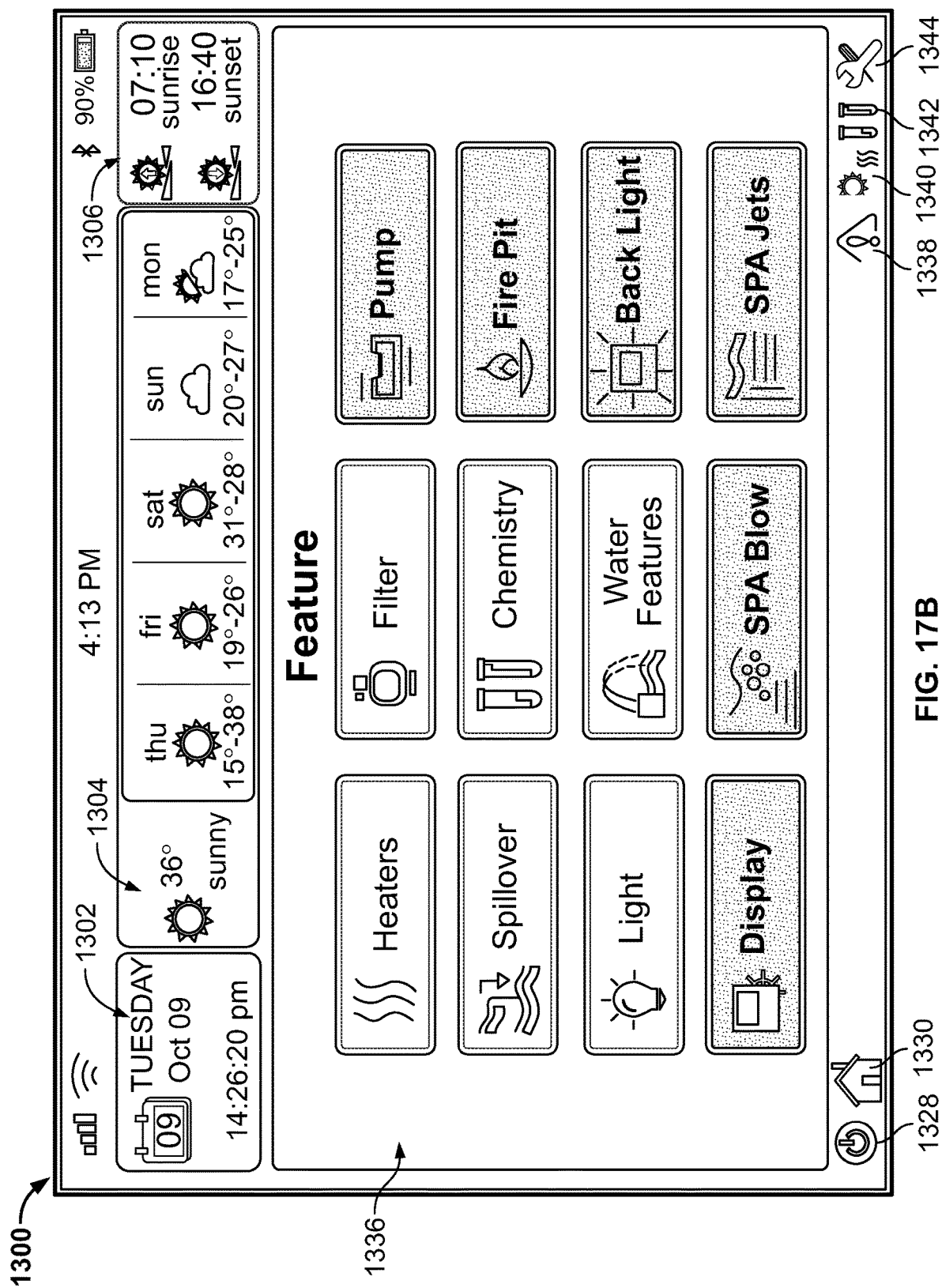
FIG. 17B is a GUI generated by the system and displaying a feature screen for selecting various smart components associated with the system.

FIG. 17B shows the GUI 1300 generated by the system and configured for allowing a user to control multiple pool/spa systems using a feature screen. The GUI 1300 includes the date and time section 1302, weather report section 1304, and sunrise/sunset section 1306 as shown in FIG. 17A; however, as shown in FIG. 17B, a "feature" menu. The feature menu includes a selection screen 1336 that lists all of the features of a user's pool/spa system, e.g., all of the devices that are connected to, installed with, and recognized by the main control panel. These devices can be, for example, heaters, filters, pumps, sensors, chemistry dispense systems, fire pits, lights, water features (e.g., fountains), displays, spa blowers, and/or spa jets, among others. Each of the listed features is a clickable button that will take the user to a screen specific to that feature, allowing the user to alter that feature's parameters and options. This is discussed in greater detail with regard to FIG. 17C below. The GUI 1300 also includes a plurality of quick option icons that may illustrate error/warning notifications, devices that require attention, or settings. For example, the GUI 1300 includes an error/warning notification icon 1338, a heater source icon 1340, a chemistry dispense system icon 1342, and a settings icon 1344. Accordingly, a user may click on any one of the icons 1338, 1340, 1342, 1344 to quickly pull-up a screen that informs the user of the notification message, or brings the user to a screen where the user can rectify the error that prompted the notification. Devices that are not incorporated into the system may be a different color than those that are installed, for example, they may be darker or grayed out.

Figure 17C:
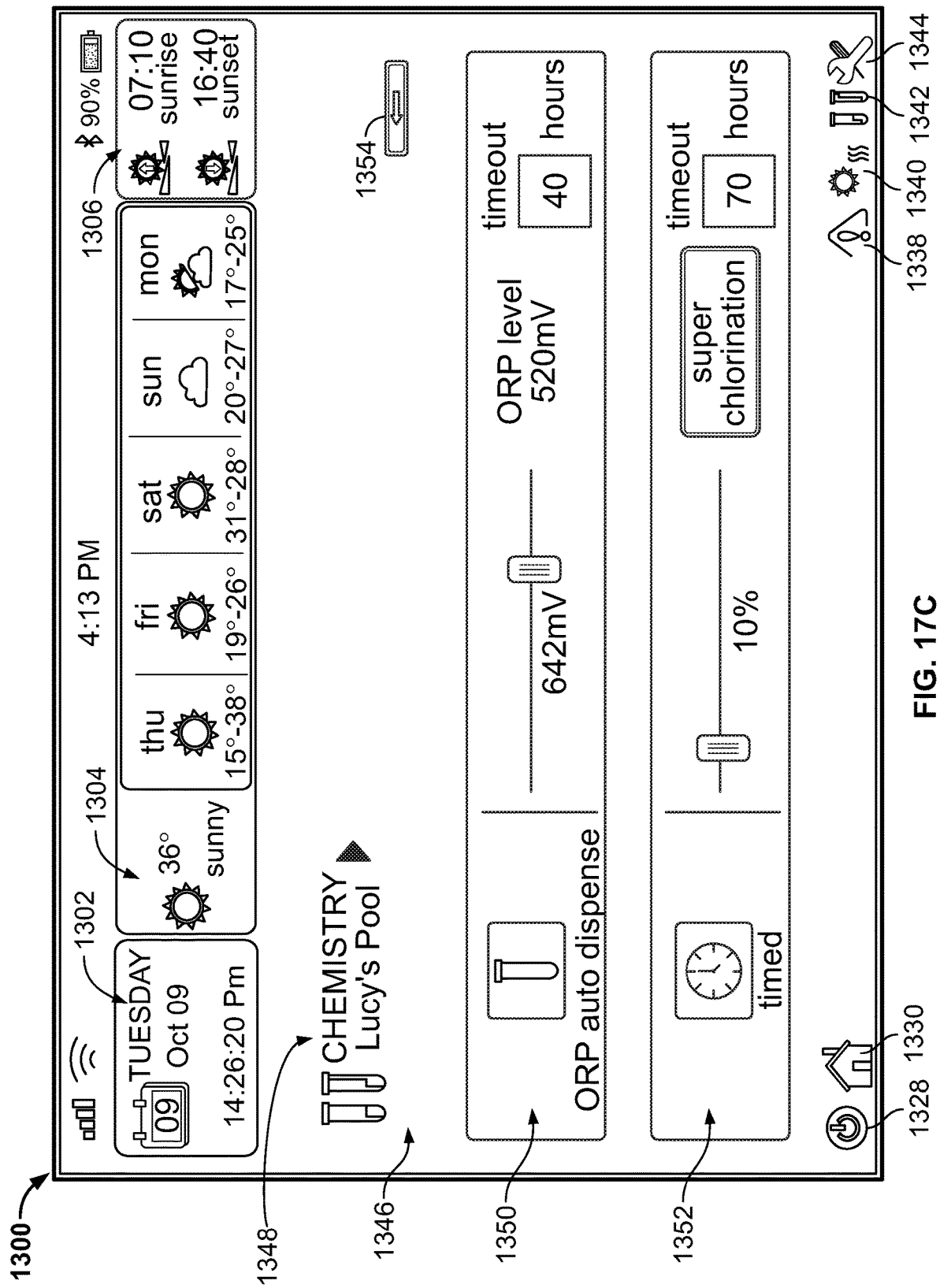
FIG. 17C is a GUI generated by the system displaying a screen for controlling a chemistry dispense sub-system.

FIG. 17C shows the GUI 1300 displaying a screen for controlling a chemistry dispense system. Specifically, after a user clicks on the chemistry button from FIG. 17B, the GUI 1300 pulls up a device screen 1346 that is specific to the device selected at the feature menu selection screen 1336, here, the chemistry dispense system. The device screen 1346 includes a title 1348 that lists that device name and the body of water that the device is for. The device screen 1346 includes a plurality of parameter/option sections 1350, 1352. The number of parameter sections and their purpose is dependent on the device selected. Here, the device screen 1346 includes an ORP settings section 1350 and a chlorination settings section 1352 that each include various settings that can be altered. For example, the ORP settings section 1350 includes a slide bar for altering the ORP level and a timeout timer, while the chlorination settings section 1352 includes a slide bar for altering the chlorination level, a super chlorination button, and a timeout timer.

Additionally, the GUI 1300 can include a background colored to represent the status of the pool/spa system and/or an error condition. For example, the background can be blue when the pool/spa system selected is running normally, yellow when there is a warning condition, or red when there is an error condition. Similarly, the first body of water control section 1308 and the second body of water control section 1310 of the GUI 1300 can each have colored background that can similarly indicate the status of the respective pool/spa system. This functionality allows a user to easily and quickly identify if a pool/spa system is functioning properly. Alternatively, or additionally, the GUI 1300 can include an outer frame that can be colored to represent the operating status and/or an error condition of the selected pool/spa systems.

Figure 18A:
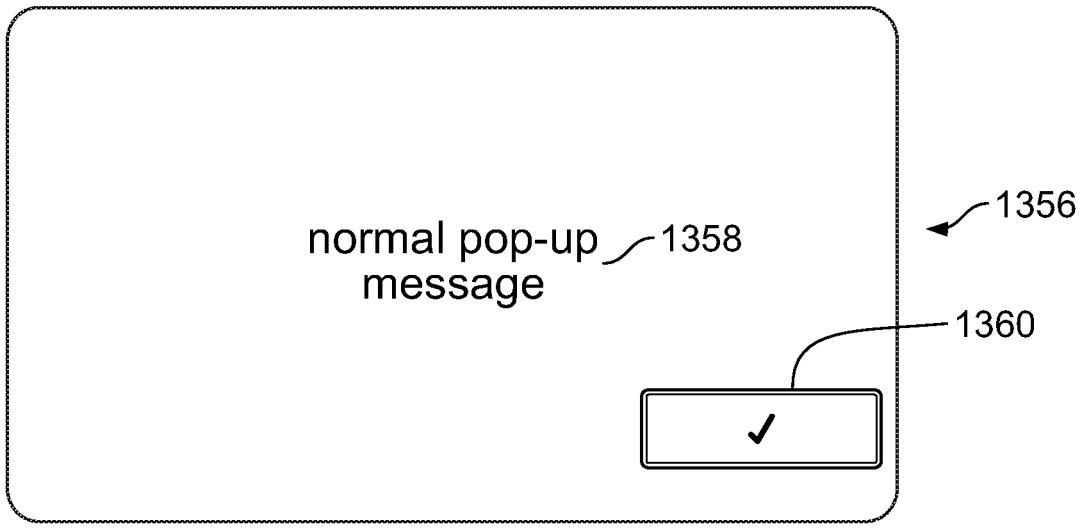
FIG. 18A is a normal notification pop-up message generated by the system.
Figure 18B:
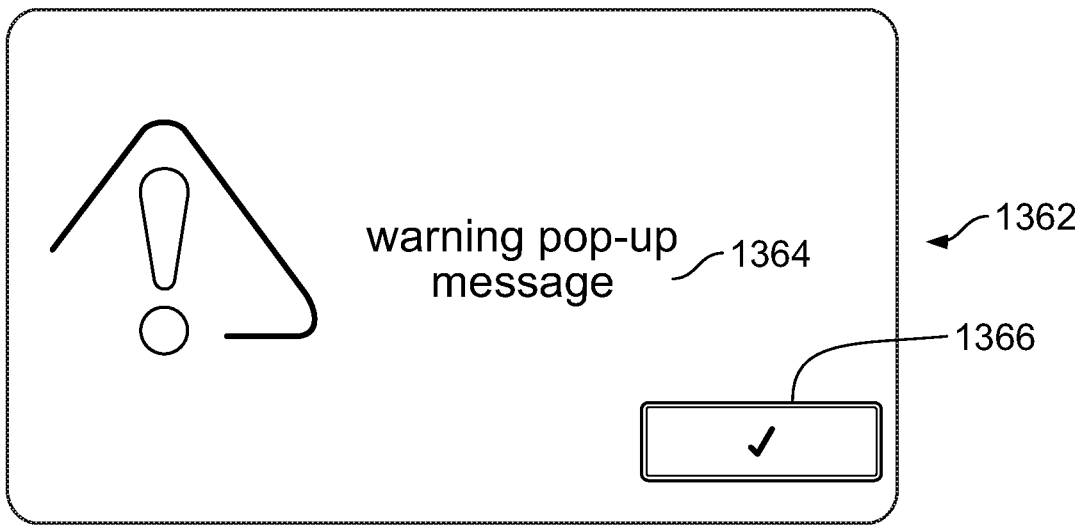
FIG. 18B is a warning notification pop-up message generated by the system.
Figure 18C:
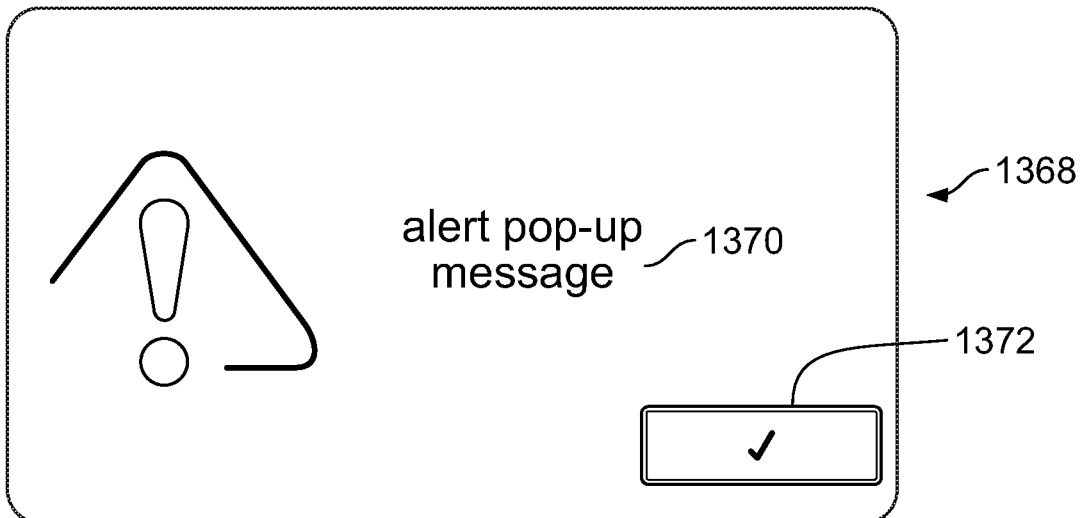
FIG. 18C is an alert notification pop-up message generated by the system.

FIGS. 18A-18C are sample notification pop-up messages that can be generated by the system. When an event occurs in a device of the control system, a pop-up message may appear in the GUI that is displayed on a user's control device. FIG. 18A shows a sample normal pop-up 1356. The normal pop-up 1356 includes a message 1358 and an acknowledge button 1360. The message 1358 for the normal pop-up 1356 can alert a user to various standard operating occurrences, such as the switching on of a device, or can let a user know that a scheduled event has begun. To close the normal pop-up 1356 a user can click on the acknowledge button 1360. FIG. 18B shows a sample warning pop-up 1362. The normal pop-up 1362 includes a warning message 1364 and an acknowledge button 1366. The warning message 1364 for the warning pop-up 1362 can alert a user to a condition that has occurred in the system, but is not serious. For example, the warning pop-up 1362 can notify a user that using a specified heat source will be less efficient than another available heat source. To close the warning pop-up 1362 a user can click on the acknowledge button 1366. FIG. 18C shows a sample alert pop-up message 1368. The alert pop-up 1368 includes a message 1370 and an acknowledge button 1372. The alert message 1370 for the alert pop-up 1368 can alert a user to a series or dangerous condition that has occurred in the system that must be attended to immediately. For example, the alert pop-up 1368 can notify a user that a connected chlorination system is not functioning properly and the water is not chlorinated proper, or that a particular connected device is overheating, is broken, or is not responding. To close the alert pop-up 1368 a user can click on the acknowledge button 1372. The normal pop-up 1356, the warning pop-up 1362, and the alert pop-up 1368 can each have a different background color that represents the severity of the message. For example, the normal pop-up 1356 can have a blue background, the warning pop-up 1362 can have a yellow background, and the alert pop-up 1368 can have a red background. This allows a user to quickly identify the severity of the condition that or message that they are being alerted to. Further, the pop-ups 1356, 1362, 1368 can flash to get a user's attention when necessary.

Figure 19A:
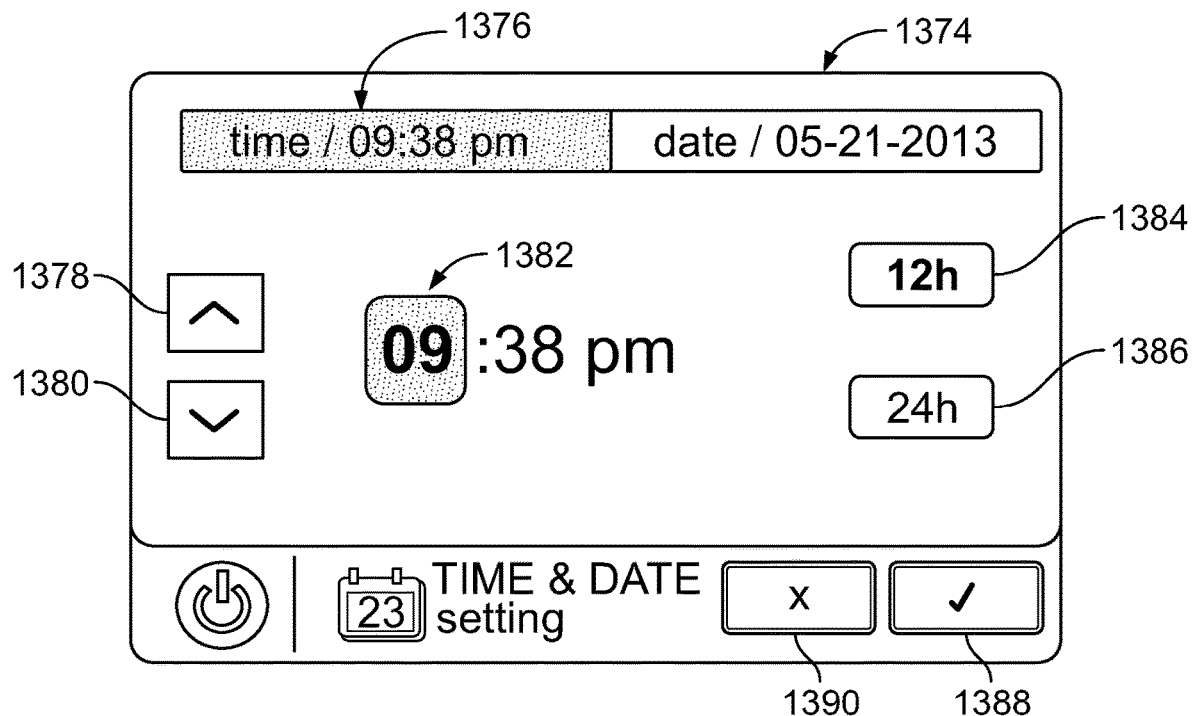
FIG. 19A is a sample pop-up screen generated by the system for changing the time of the system clock.
Figure 19B:
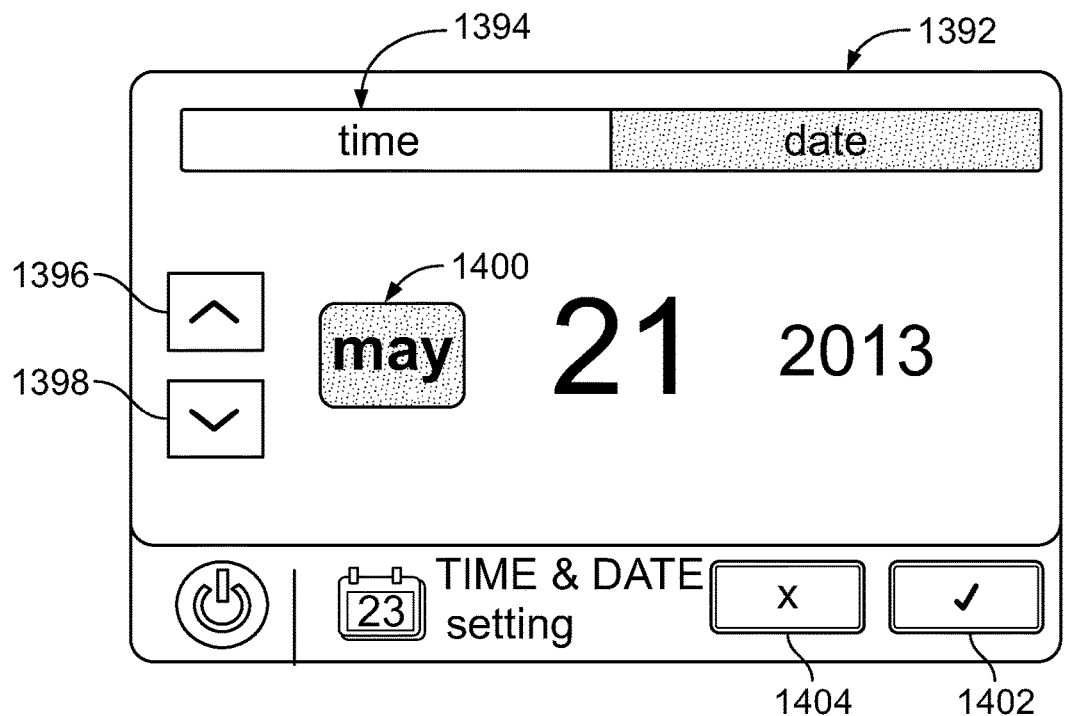
FIG. 19B is a sample pop-up screen generated by the system for changing the date of the system clock.

FIGS. 19A-19B are pop-up screens generated by the system for changing the time and date of the system. FIG. 19A is a screenshot of a time change pop-up 1374 that includes a selection bar 1376 allowing a user to choose between altering the time or the date. The time change pop-up 1374 includes an up-arrow 1378 and a down-arrow 1380 that alter the selected time element 1382, e.g., hour, minute, and meridiem antecedent. A user can click on the hour value, minute value, or meridiem antecedent, and subsequently click on the up-arrow 1378 or the down-arrow 1380 to adjust the selected element to the correct value. Further, the time change pop-up 1374 includes a 12H button 1384 and a 24H button 1386 that allows a user to switch the clock from a 12-hour clock to a 24-hour clock. The user can then click the accept button 1388 to accept the changes and close the pop-up 1374, or the reject button 1390 to reject the changes and close the pop-up 1374. FIG. 19B is a screenshot of a date change pop-up 1392 that includes a selection bar 1394 allowing a user to choose between altering the time or the date. The date change pop-up 1392 includes an up-arrow 1396 and a down-arrow 1398 that alter the selected date element 1400, e.g., month, day, and year. A user can click on the date, day value, or year value, and subsequently click on the up-arrow 1396 or the down-arrow 1398 to adjust the selected element to the correct value. The user can then click the accept button 1402 to accept the changes and close the pop-up 1392, or the reject button 1404 to reject the changes and close the pop-up 1392.

Figure 20A:
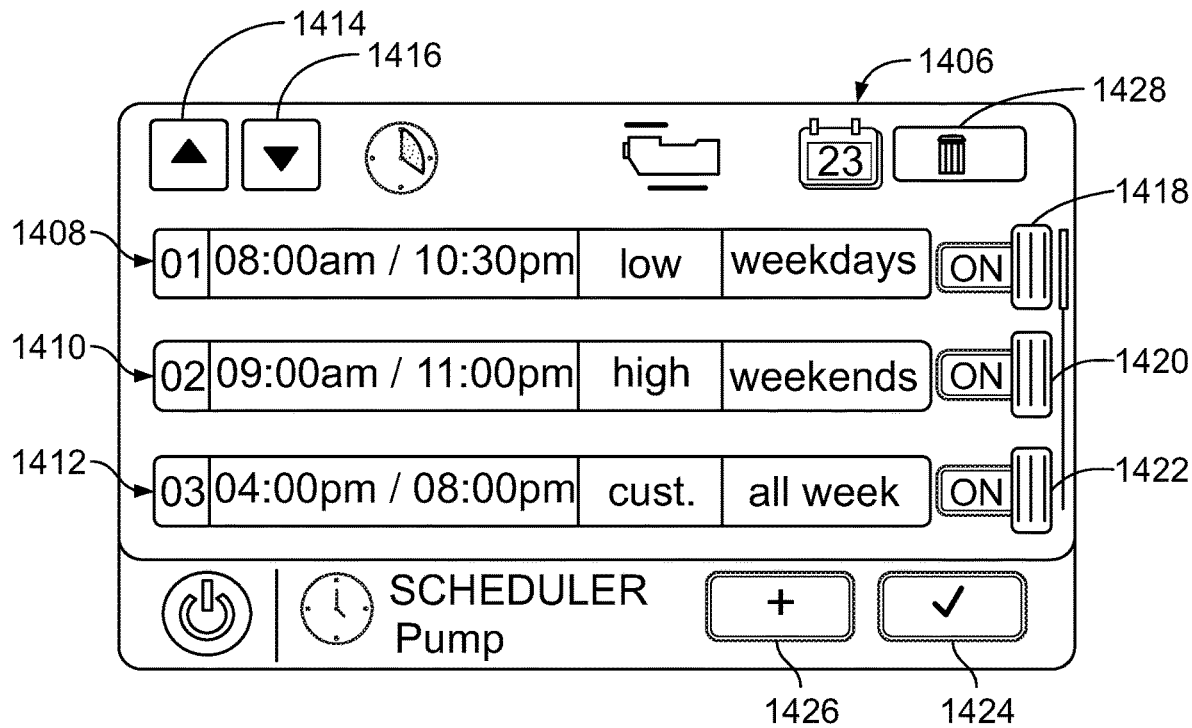
FIG. 20A is a sample scheduler pop-up screen generated by the system for altering a device schedule and turning a scheduled event on or off.
Figure 20B:
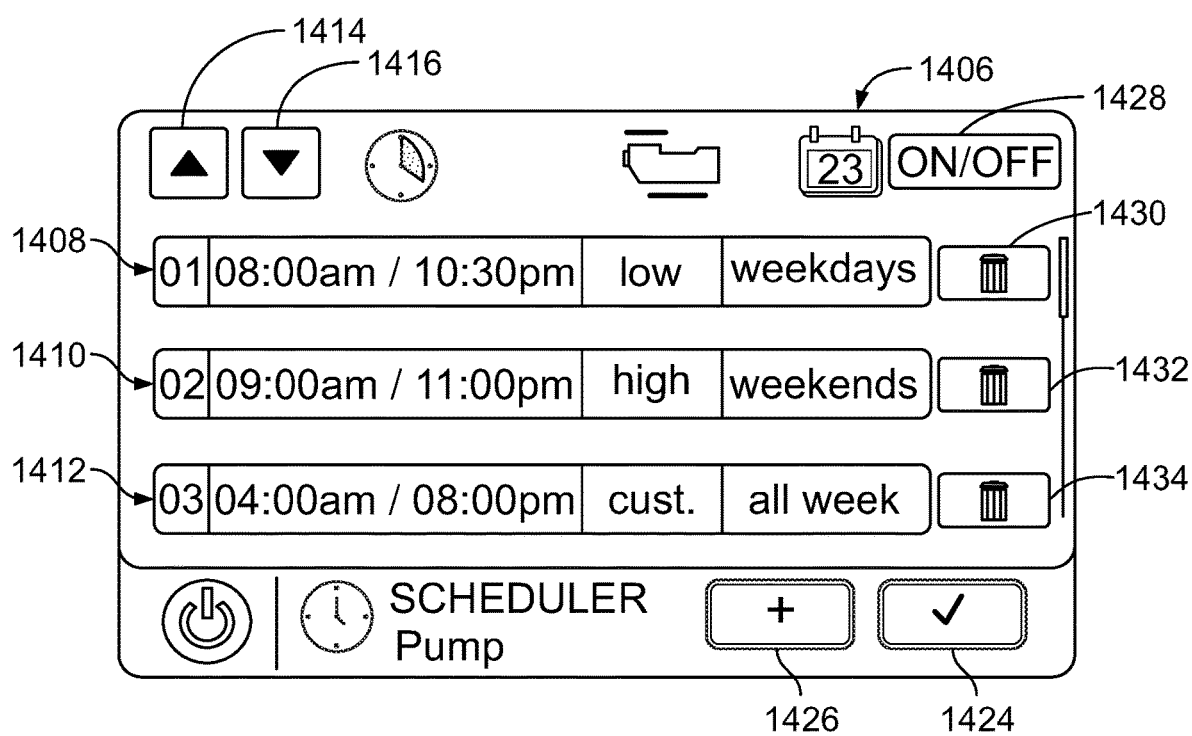
FIG. 20B is a sample scheduler pop-up screen generated by the system for deleting a scheduled event.

FIGS. 20A-20B are scheduler pop-up screens generated by the system for changing a device schedule. FIG. 20A shows a scheduler pop-up 1406 that allows a user to schedule operations for a pump. The scheduler pop-up 1406 includes a first scheduled event 1408, a second scheduled event 1410, and a third scheduled event 1412. Each scheduled event 1408, 1410, 1412 includes a plurality of parameters that a user can adjust for scheduling purposes. For example, the user can schedule the time that the pump turns on and turns off, the speed that the pump operates at, and the repeat schedule for the timer (e.g., weekdays, weekends, all week, etc.). Accordingly, a user can schedule at least three operations for a pump that will occur automatically. As shown in FIG. 20A, the first scheduled event 1408 has the pump turning on at 8:00 A.M. at low-speed on every weekday and running until 10:30 P.M. The second scheduled event 1410 has the pump turning on and operating at high-speed from 9:00 A.M. until 11:00 P.M. every weekend. The third scheduled event 1412 has the pump switching to a custom speed everyday at 4:00 P.M. and running at this custom speed until 8:00 P.M. The scheduler pop-up 1406 also includes an up-arrow 1414 and a down-arrow 1416 that allow a user to alter the scheduled events 1408, 1410, 1412. To alter any one of the scheduled events 1408, 1410, 1412, a user can click on the event parameter, e.g., start time, finish time, speed, repeat schedule, and then click the up-arrow 1414 or the down-arrow 1416 to adjust the parameter. The scheduler pop-up 1406 can also include an on/off switch 1418, 1420, 1422 for each scheduled event 1408, 1410, 1412 that allows a user to turn the scheduled event 1418, 1420, 1422 on or off. The user can then click an accept button 1424 to accept any alterations made to the scheduled events 1408, 1410, 1412 and close the scheduler pop-up 1406, or the reject button 1426 to reject the changes and close the scheduler pop-up 1406. The scheduler pop-up 1406 includes a switch button 1428 that allows a user to switch the on/off switches 1418, 1420, 1422 to discard buttons 1420, 1432, 1434, as shown in FIG. 20B. The discard buttons 1430, 1432, 1434 allow a user to discard scheduled events that he/she no longer wishes to save. FIGS. 20A-20B show three scheduled events, however, it should be understood by one of ordinary skill in the art that more than three events can be scheduled based on the needs of the overall system.

The control system 2 can provide special modes of operation depending upon local, state, and country regulations. Some sample special modes of operation include: an operational mode with shared heaters and freeze protection functionality that allows a homeowner to operate the spa during the winter while the pool is in freeze protect mode, a custom valve operation mode that operates automatic valves used for a pool and spa with shared heaters. In such mode, the automatic valves can change state when the spa pump turns on to connect the heaters to the spa, and can return heater operation to the pool when the spa pump turns off. Of course, other modes are possible.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention. What is desired to be protected by Letters Patent is set forth in the following claims.

What is claimed is:

1. A control system for a pool or spa installation, comprising:
   a housing mountable at a pool or spa installation, the housing including a high voltage compartment and a low voltage compartment;
   a processor positioned in the housing;
   a WiFi transceiver in communication with the processor and positioned in the housing;
   a relay positioned in the housing and controlled by the processor, the relay connectable to a power line that provides power to a first pool or spa component;
   a printed circuit board; and
   an RS-485 transceiver positioned in the housing and controlled by the processor, the RS-485 transceiver connectable to a second pool or spa component,
   wherein the relay is positioned in the high voltage compartment, the RS-485 transceiver is positioned in the low voltage compartment, and the processor controls operation of the first and second pool or spa components in response to a control command received by the WiFi transceiver, and
   wherein the processor, the relay, and the RS-485 transceiver are provided on the printed circuit board.

2. The control system of claim 1, comprising a second relay positioned in the high voltage compartment of the housing and controlled by the processor, the second relay connectable to a power line that provides power to a third pool or spa component.

3. The control system of claim 1, wherein the WiFi transceiver is connected to the RS-485 transceiver.

4. The control system of claim 1, wherein the WiFi transceiver wirelessly communicates with a home network.

5. The control system of claim 4, wherein the WiFi transceiver receives the control command for at least one of the first and second pool or spa components from a wireless remote control unit via the home network and transmits the received control command to the processor, the processor controlling the at least one first and second pool or spa component according to the control command.

6. The control system of claim 5, wherein the wireless remote control unit is a cellular device.

7. The control system of claim 1, wherein the WiFi transceiver wirelessly communicates with a cellular device.

8. The control system of claim 7, wherein the WiFi transceiver receives the control command for at least one of the first and second pool or spa components from the cellular device and transmits the received control command to the processor, and the processor controls the at least one first and second pool or spa component according to the control command.

9. The control system of claim 1, wherein the processor is configured to receive control commands from a power company on a demand side during a peak demand period.

10. A control system for a pool or spa installation, comprising:
    a housing mountable at a pool or spa installation, the housing including a high voltage compartment and a low voltage compartment;
    a processor positioned in the housing;
    a WiFi transceiver in communication with the processor and positioned in the housing;
    a relay positioned in the housing and controlled by the processor, the relay connectable to a power line that provides power to a first pool or spa component;
    a printed circuit board; and
    an RS-485 transceiver positioned in the housing and controlled by the processor, the RS-485 transceiver connectable to a second pool or spa component,
    wherein the relay is positioned in the high voltage compartment, the RS-485 transceiver is positioned in the low voltage compartment, and the processor (i) controls operation of the first and second pool or spa components in response to a control command received by the WiFi transceiver, and (ii) receives control commands from a power company on a demand side during a peak demand period, and
    wherein the processor, the relay, and the RS-485 transceiver are provided on the printed circuit board.

11. The control system of claim 10, comprising a second relay positioned in the housing and controlled by the processor, the second relay connectable to a power line that provides power to a third pool or spa component.

12. The control system of claim 10, wherein the WiFi transceiver is connected to the RS-485 transceiver.

13. The control system of claim 10, wherein the WiFi transceiver wirelessly communicates with a home network.

14. The control system of claim 13, wherein the WiFi transceiver receives the control command for at least one of the first and second pool or spa components from a wireless remote control unit via the home network and transmits the received control command to the processor, the processor controlling the at least one first and second pool or spa component according to the control command.

15. The control system of claim 14, wherein the wireless remote control unit is a cellular device.

16. The control system of claim 10, wherein the WiFi transceiver wirelessly communicates with a cellular device.

17. The control system of claim 16, wherein the WiFi transceiver receives the control command for at least one of the first and second pool or spa components from the cellular device and transmits the received control command to the processor, and the processor controls the at least one first and second pool or spa component according to the control command.

* * * * *